(12) United States Patent
Ikezoye et al.

(10) Patent No.: US 11,544,806 B2
(45) Date of Patent: Jan. 3, 2023

(54) AGGREGATED MEDIA RIGHTS PLATFORM

(71) Applicant: Audible Magic Corporation, Los Gatos, CA (US)

(72) Inventors: Vance Ikezoye, Los Gatos, CA (US); David Price Williams, Alton (GB); Michael Thomas Edwards, London (GB); Stephen John Grillos, Felton, CA (US); John R. Williams, San Jose, CA (US); James E. McNeill, Jr., Scotts Valley, CA (US); Jay Friedman, Monte Sereno, CA (US); Kuniyuki Takahashi, Emerald Hills, CA (US); Sergio Alberto Orozco Ramos, San Francisco, CA (US); Jesus Antonio Barajas Romero, Los Gatos, CA (US); Srinidhi Srinivasa Raghavan, San Jose, CA (US); Nancy Kang, San Jose, CA (US); Garen Levon Azizian, San Francisco, CA (US); Edgar Escobar Baez, Campbell, CA (US)

(73) Assignee: Audible Magic Corporation, Los Gatos, CA (US)

( * ) Notice: Subject to any disclaimer, the term of this patent is extended or adjusted under 35 U.S.C. 154(b) by 235 days.

(21) Appl. No.: 16/803,814

(22) Filed: Feb. 27, 2020

(65) Prior Publication Data
US 2020/0273123 A1 Aug. 27, 2020

Related U.S. Application Data

(60) Provisional application No. 62/811,467, filed on Feb. 27, 2019.

(51) Int. Cl.
*G06Q 20/00* (2012.01)
*G06Q 50/18* (2012.01)
(Continued)

(52) U.S. Cl.
CPC .......... *G06Q 50/184* (2013.01); *G06F 21/64* (2013.01); *G06N 20/00* (2019.01); *G06Q 10/10* (2013.01);
(Continued)

(58) Field of Classification Search
CPC .. G06Q 50/184; G06Q 10/10; G06Q 20/0855; G06Q 20/1235; G06Q 30/0607;
(Continued)

(56) References Cited

U.S. PATENT DOCUMENTS 5,918,223 A 6/1999 Blum et al.
6,834,308 B1 12/2004 Ikezoye et al.
(Continued)

FOREIGN PATENT DOCUMENTS

EP 2017827 A1 1/2009
WO 2006012241 A2 2/2006

*Primary Examiner* — Dante Ravetti
(74) *Attorney, Agent, or Firm* — Lowenstein Sandler LLP

(57) ABSTRACT

In one embodiment, a processing device receives a first digital fingerprint of a media item along with a first content management rule. The processing device separately receives a second digital fingerprint of the media item along with a second content management rule. The processing device determines that the received digital fingerprints are for the same media item based upon a match between the first digital fingerprint and the second digital fingerprint. The processing device determines that all rights to the media item have been accounted for, and then determines a set of actions to be performed for hosted media items comprising the media item based at least in part upon the first content management rule and the second content management rule. Processing logic may also perform a conflict resolution process for conflicting rights claims to the media item.

12 Claims, 24 Drawing Sheets

(51) Int. Cl.
    *G06N 20/00*     (2019.01)
    *G06Q 20/12*     (2012.01)
    *G06Q 30/06*     (2012.01)
    *G06Q 10/10*     (2012.01)
    *G06Q 20/08*     (2012.01)
    *H04L 9/40*     (2022.01)
    *G10L 25/51*     (2013.01)
    *G06F 21/64*     (2013.01)
    *H04N 21/8352*     (2011.01)
    *H04N 21/8355*     (2011.01)
    *H04N 21/8358*     (2011.01)
    *G06V 20/40*     (2022.01)

(52) U.S. Cl.
    CPC ..... *G06Q 20/0855* (2013.01); *G06Q 20/1235* (2013.01); *G06Q 30/0607* (2013.01); *G06Q 50/182* (2013.01); *G06V 20/46* (2022.01); *G10L 25/51* (2013.01); *H04L 63/0876* (2013.01); *H04L 63/101* (2013.01); *H04N 21/8352* (2013.01); *H04N 21/8355* (2013.01); *H04N 21/8358* (2013.01); *G06Q 2220/123* (2013.01); *G06Q 2220/18* (2013.01)

(58) Field of Classification Search
    CPC ........... G06Q 50/182; G06Q 2220/123; G06Q 2220/18; G06F 21/64; G06F 2221/0713; G06F 21/10; G06F 21/16; G06N 20/00; G06V 20/46; G06V 20/48; G10L 25/51; H04L 63/0876; H04L 63/101; H04L 2463/103; H04L 63/10; H04L 63/12; H04N 21/8352; H04N 21/8355; H04N 21/8358; H04N 21/2541; H04N 21/2547; H04N 21/2743; H04N 21/812; G06K 9/6215
    USPC .......................... 705/16, 21, 59; 380/44, 262
    See application file for complete search history.

(56) References Cited

U.S. PATENT DOCUMENTS

| | | |
|---|---|---|
| 6,968,337 B2 | 11/2005 | Wold |
| 7,363,278 B2 | 4/2008 | Schmelzer et al. |
| 7,562,012 B1 | 7/2009 | Wold et al. |
| 8,006,314 B2 | 8/2011 | Wold |
| 8,130,746 B2 | 3/2012 | Schrempp |
| 8,332,326 B2 | 12/2012 | Schrempp et al. |
| 8,972,481 B2 | 3/2015 | Schrempp et al. |
| 2006/0167881 A1* | 7/2006 | Aydar .................. G06Q 20/123 707/999.009 |
| 2008/0228733 A1 | 9/2008 | Davis et al. |
| 2010/0232765 A1 | 9/2010 | Suginohara et al. |
| 2010/0263020 A1 | 10/2010 | Harrison et al. |
| 2011/0225419 A1 | 9/2011 | Munger et al. |
| 2015/0120567 A1 | 4/2015 | Van Rooyen et al. |
| 2015/0234814 A1 | 8/2015 | Ikezoye et al. |
| 2016/0149956 A1 | 5/2016 | Birnbaum et al. |
| 2017/0201774 A1 | 7/2017 | Lindsay et al. |
| 2017/0323145 A1 | 11/2017 | Kenyon et al. |
| 2019/0108227 A1 | 4/2019 | Ikezoye et al. |
| 2020/0275167 A1 | 8/2020 | Ikezoye et al. |
| 2021/0110469 A1* | 4/2021 | Ross ....................... G06F 21/10 |

* cited by examiner

AGGREGATED MEDIA RIGHTS PLATFORM

RELATED APPLICATIONS

This patent application claims the benefit under 35 U.S.C. § 119(e) of U.S. Provisional Application No. 62/811,467, filed Feb. 27, 2019, which is herein incorporated by reference.

TECHNICAL FIELD

This disclosure relates to the field of media content identification, and in particular to an aggregated services platform that identifies media items across multiple online service providers (OSPs) and performs actions associated with media items across multiple OSPs.

BACKGROUND

There are many different OSPs that provide video hosting services. A video hosting service is a website or software that allows users to upload and distribute their own user generated content (UGC) and/or professionally generated content, which is often in the form of user generated video clips. Additionally, OSPs may provide file hosting services, image hosting services and/or social network services, which may also support video sharing. These and other services are referred to collectively as media sharing platforms herein. A few examples of the many OSPs that host video content and/or UGC include YouTube®, Facebook®, Vimeo®, Dailymotion®, Flickr®, and Twitch®.

Traditionally, users manually generate user accounts with each of the different OSPs to which they wish to upload content, and then separately upload content to each of the OSPs. Each of the OSPs then individually negotiates agreements with rights holders with regards to hosting and monetizing content. Additionally, each of the OSPs individually negotiates agreements with advertisers with respect to monetizing content. Rights holders and advertisers then receive disparate reports from the various OSPs with regards to content served, ads served, revenue earned, and so forth. Each OSP has its own data format and generates reports for rights holders with some periodicity that may not correspond to the periodicity at which other OSPs generate reports. Accordingly, it can be difficult for rights holders to compare the reports from disparate OSPs to assess those OSPs. Furthermore, when a rights holder identifies content that they wish to be removed from OSPs, they need to separately contact each of the OSPs to request that the content be removed from those OSPs.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

FIG. 6 is a flow diagram illustrating a method for determining matches between claimed media items, according to an embodiment.

DETAILED DESCRIPTION

Figure 1:
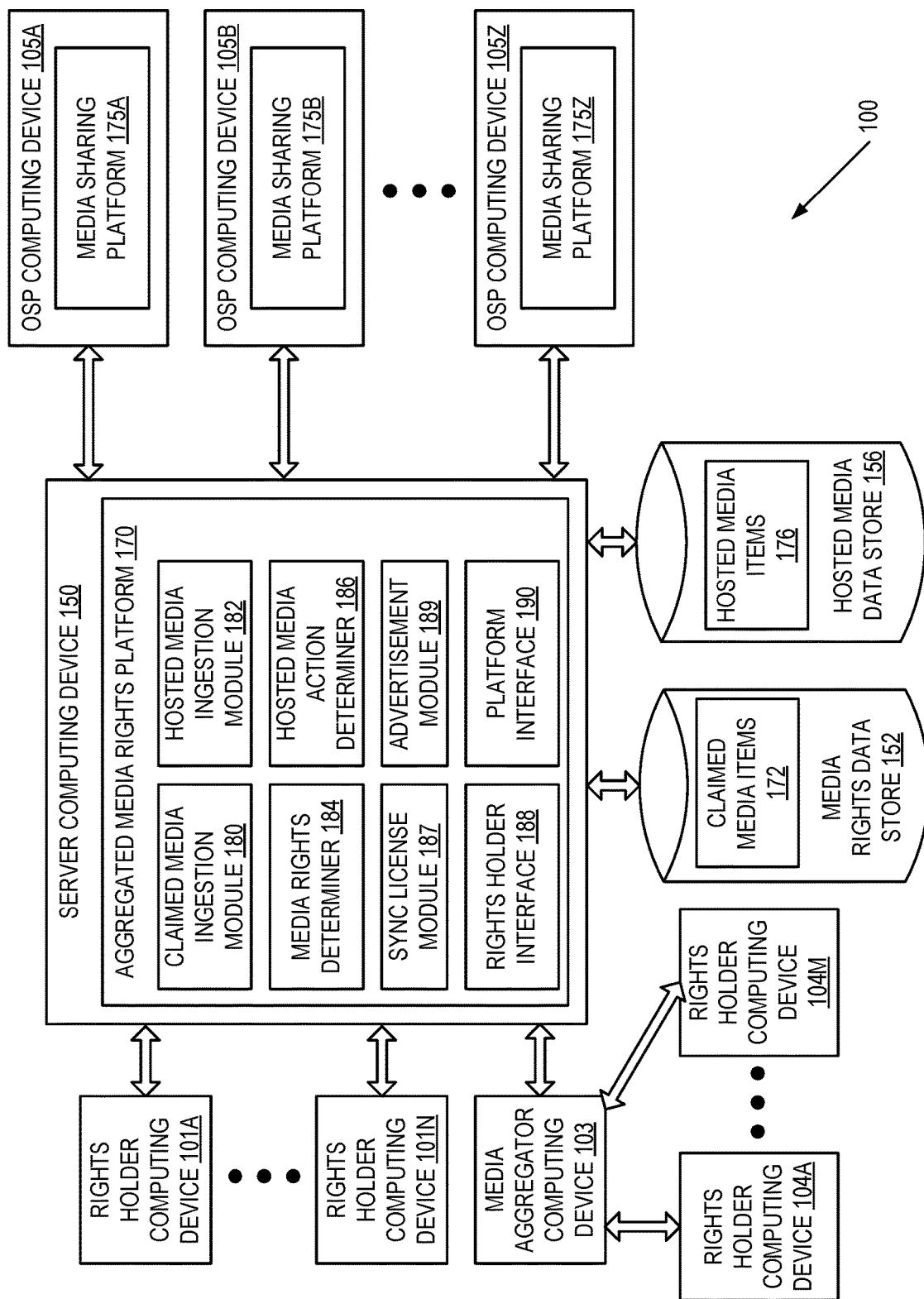
FIG. 1 is a block diagram illustrating an aggregated media rights platform, in accordance with embodiments of the present disclosure.

Embodiments are described with regards to an aggregated media rights platform. The aggregated media rights platform interfaces with rights holders and media aggregators to determine the sets of rights associated with claimed media items. In embodiments, the aggregated media rights platform determines sets of rights associated with music and/or with videos. Such rights may include publishing rights, composition rights, sound recording rights, performance rights, and so on for one or more territories, one or more media sharing platforms, etc. The aggregated media rights platform makes sure that all rights to a claimed media item are accounted for, and then determines one or more actions that are permitted by all of the rights holders. The aggregated media rights platform may then communicate such actions to multiple different media sharing platforms that include hosted media items that incorporate the claimed media items (e.g., videos that include claimed songs). The aggregated media rights platform is able to take actions that are leveraged across multiple media sharing platforms. For example, a rights holder may request an action to be performed with respect to media items on a first media sharing platform, and that same action may automatically be performed for similar media items on other media sharing platforms.

The aggregated media rights platform may additionally determine when multiple different parties have claimed the same rights to a claimed media item. For example, the aggregated media rights platform may determine that two different publishers have claimed the publishing rights for the same song in the same territory. When a rights conflict is identified, the aggregated media rights platform may perform actions to resolve the conflict. The aggregated media rights platform may perform one or more automated actions to resolve the rights conflict in an automated fashion without any input from either rights holder in some embodiments. For example, the aggregated media rights platform may determine that a similar rights conflict between the same two parties was resolved in favor of a particular rights holder, may determine that the facts associated with a current rights conflict align with facts of the already resolved rights conflict, and may automatically resolve the current rights conflict in the same manner that the other rights conflict between the two parties was resolved.

In embodiments, the aggregated media rights platform may identify, for each hosted media item hosted by multiple different media sharing platforms, the claimed media items that are incorporated into the hosted media items. A claimed media item may be a copyrighted media item such as a song. A hosted media item may be, for example, user generated content (e.g., user generated videos), which may incorporate one or more claimed media items. Additionally, the aggregated media rights platform may compare digital fingerprints of hosted media items to digital fingerprints of other hosted media items to identify copies of the same hosted media items across media sharing platforms. The aggregated media rights platform may then enable rights holders to select actions to perform for a particular hosted media item on multiple different media sharing platforms. For example, a user may select to take down a hosted media item from a first media sharing platform. The aggregated media rights platform may then identify copies of that hosted media item on other media sharing platforms, and may take that hosted media item down from each of the other media sharing platforms automatically.

Embodiments provide multiple advantages over existing systems. To date, different media sharing platforms each manage their own content. However, there is no way presently to track or manage hosted media items across multiple different media sharing platforms, much less to do so in an automated fashion. Embodiments enable rights holders to provide data feeds of their rights, and the aggregated media rights platform receives, parses, and records the rights to claimed media items from each of the feeds. The aggregated media rights platform additionally receives feeds of hosted media items from multiple different media sharing platforms. The aggregated media rights platform may compare all rights claims against all other rights claims, may compare hosted media items to claimed media items, and may compare hosted media items to other hosted media items, all across multiple rights holders and multiple media sharing platforms. Rights holders may then request actions to be taken against one or more hosted media items across many different media sharing platforms with the click of a button.

Embodiments make it easier, less resource intensive, and take less time for rights holders to manage their rights to media on many different media sharing platforms (e.g., OSPs). Additionally, embodiments reduce the amount of network bandwidth, amount of processor resources, and so on used to track and manage rights to claimed media items and hosted media items by providing a single service that contains all of the necessary data for the claimed media items, the hosted media items, and the relationships there between. Thus, rather than separately sending take down requests to each media sharing platform hosting a particular media item, for example, a rights holder may send a single take down request to the aggregated media rights platform, which may then ensure that the offending media item is taken down from all media sharing platforms.

Today many pieces of content are available to be viewed both offline and online through a diverse collection of media sharing platforms. In one common case, a media sharing platform will monetize a hosted media item during the presentation of the hosted media item to the end user. Monetization of hosted media items includes displaying other content such as advertisements and/or promotional media alongside, before, or after presenting the hosted media item. Interested parties, such as a media sharing platform, a user uploading a hosted media item, a rights holder (e.g., an artist, publisher, label, studio, etc.) may create accounts with an aggregated media rights platform to manage their content across multiple territories and/or multiple media sharing platforms.

Popularity of media sharing platforms is ever increasing. The user bases for popular media sharing platforms have already expanded to over a billion users. An active set of these users is uploading user generated content. User generated content (UGC) may include videos that incorporate claimed media items, a cover of the work of another that is subject to copyright protections (e.g., audio known works), the lyrics of the work of another that is subject to copyright protection, and so on. Every new instance of user generated content generally should be analyzed for copyright compliance against existing known works (claimed media items) that have been registered for protection and/or ownership. An aggregated media rights platform can receive billions of transactions each and every month, where each transaction involves the analysis of a hosted media item to determine whether that hosted media item incorporates portions of one or more claimed media items (i.e. portions of known works).

FIG. 1 is a block diagram illustrating a network environment 100 including an aggregated media rights platform 170, in which embodiments of the present disclosure. In one embodiment, network environment 100 includes one or more rights holder computing devices 101A-101N, one or more rights holder computing devices 104A-M, a media aggregator computing device 103, a server computing device 150, and multiple online service provider (OSP) computing devices 105A-Z. Any number of computing devices 101A-N, 103, 105A-Z can communicate with server computing device 150 through a network (not shown). Additionally, rights holder computing devices 104A-M may communicate with media aggregator computing device 103 via the network or another network. The network can include a local area network (LAN), a wireless network, a telephone network, a mobile communications network, a wide area network (WAN) (e.g., such as the Internet) and/or similar communication system. The network can include any number of networking and computing devices such as wired and wireless devices.

The computing devices 101A-N, 104A-M, 103, 150, 105A-Z may include one or more physical machines and/or virtual machines hosted by physical machines. The physical machines may include rackmount servers, desktop computers, and/or other computing devices. In one embodiment, any of the computing devices 101A-N, 104A-M, 103, 150, 145A-Z can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Server computing device 150 may include or be connected to a media rights data store 152 and a hosted media data store 156. The media rights data store 152 and hosted media data store 156 may each be arranged as a database, a data store service, or other data arrangement. Server computing device 150 may additionally include or be connected to a user account data store and/or other data stores, each of which may be database implementations in some embodiments. In embodiments, the media rights data store 152, hosted media data store 156 and/or other data stores may be implemented using a data storage service, such as Amazon S3®. The media rights data store 152 may store entries for claimed media items 172. Each entry (claimed media item 172) in the media rights data store 152 may include metadata associated with a claimed media item, one or more rights claims to the claimed media item, one or more digital fingerprints of the claimed media item and/or one or more content management rules for the claimed media item. The metadata may include data describing the claimed media items such as title, artist, album name, additional descriptive elements, international sound recording code (ISRC), and so on. The rights claims, digital fingerprints and/or content management rules may also be metadata in embodiments. The hosted media data store 156 may store entries for hosted media items 176 that are hosted on one or more media sharing platform 175A-Z. Each entry (hosted media item 176) may include metadata associated with a hosted media item, one or more digital fingerprints of the hosted media item, an identification of a user account that uploaded the hosted media item, an indication of a media sharing platform 175A-Z hosting the hosted media item, an identification of one or more claimed media items incorporated into the hosted media item, an identification of one or more other hosted media items that are copies of the hosted media item, and/or other information.

Rights holder computing devices 101A-N each provide a feed of claimed media items associated with a particular rights holder. Different rights feeds may include data in different formats. Claimed media ingestion module 180 may modify data from rights feeds and normalize the data across rights feeds. Examples of rights holders include labels, artists, publishers, studios, and so on. The feed may be a live stream of data, or may be a continuous or periodic stream of data. Each feed of claimed media items may include data for one or more claimed media items to which a particular rights holder is making a rights claim. A rights claim for a claimed media item may include a copy of the media item and/or a digital fingerprint of the media item. A rights claim may also include a set of rights associated with the claimed media item, which may identify a type of right (e.g., a publishing right, a composition right, a sound recording right, a performance right, etc.), one or more territories to which the right applies (e.g., the U.S., France, Germany, Japan, China, etc.), one or more media sharing platforms to which the right applies (e.g., YouTube, Facebook, Daily Motion, etc.), and/or one or more time periods for which the right applies. A rights claim may additionally include a content management rule associated with the claimed media item. The content management rule indicates one or more actions that are permitted and/or that are not permitted for the claimed media item. Some common content management rules include rules to monetize a claimed media item (e.g., via advertising revenue), rules to prohibit or block posting of the claimed media item, rules to limit posting of the claimed media item (e.g., to particular territories and/or media sharing platforms), rules to limit the type of videos that claimed audio media items can be posted with, rules to limit the type of audio that can be attached to claimed video media items, rules to track views (or other consumption) of claimed media items, and so on. Many different types of content management rules are possible. If a content management rule is not provided, then a default content management rule may be applied. Each rights holder may set up their own distinct content management rules in embodiments.

The media item may be audio (e.g., a song or album), a video, or other work that contains an audio portion. The media item may be a file (e.g., an audio file having a format such as WAV, AIFF, AU, FLAC, ALAC, MPEG-4, MP3, Opus, Vorbis, AAC, ATRAC, WMA, and so on, or a video file having a format such as WebM, Flash Video, F4V, Vob, Ogg, Dirac, AVI, QuickTime File Format, Windows Media Video, MPEG-4, MPEG-1, MPEG-2, M4V, SVI, MP4, FLV, and so on). The claimed media item may be provided to server computing device 150 as a single file or multiple files (e.g., as a portion of a larger file). Alternatively, one or more digital fingerprints (e.g., sets of features) of the claimed media item may be generated and provided to aggregated media rights platform 170. In one embodiment, a digital fingerprint generator divides a claimed media item into multiple segments, and one or more segments (or a digital fingerprint of one or more segments) are sent to server computing device 150. Alternatively, a digital fingerprint of the claimed media item may be determined from the whole of the claimed media item and transmitted to the server computing device 150.

The term digital fingerprint is often used in the singular herein. However, it should be understood that this term included embodiments in which a digital fingerprint may be considered a sequence of smaller digital fingerprints of segments of a media item. For example, an audio media item having a length of 1 minute may have a distinct set of features (e.g., a feature vector) for each 10 millisecond segment (or other lengths of equal or differing size) of the 1 minute audio media item, each of which could be considered a distinct digital fingerprint, and/or any number of which may be combined into a digital fingerprint of a larger segment of the media item. In addition to sending one or more digital fingerprints of a claimed media item and/or one or more segments of the claimed media item, the rights holder computing device 101A-Z or media aggregator computing device 103 may also send metadata associated with the claimed media item.

Each rights holder computing device 101A-N and media aggregator computing device 103 may include a digital fingerprint generator (not shown) provided by an operator of the aggregated media rights platform 170. The rights holder computing devices 101A-N and/or media aggregator computing device 103 may process claimed media items using the digital fingerprint generator to generate digital fingerprints of the claimed media items. The digital fingerprints may then be provided in a rights feed rather than the media item itself. A digital fingerprint of a media item is considerably smaller in file size than the media item itself. Accordingly, network bandwidth utilization may be reduced by having rights holder computing devices101A-N and media aggregator computing device 103 generate and provide digital fingerprints of claimed media items rather than the claimed media items themselves.

Aggregated media rights platform 170 may include one or more modules, which may include a claimed media ingestion module 180, a hosted media ingestion module 182, a media rights determiner 184, a hosted media action determiner 186, an advertisement module 189, a rights holder interface 188, a sync license module 187 and/or a platform interface 190. These modules may be divided into additional modules or combined into fewer modules. Additionally, the operations of the aggregated media rights platform 170 are discussed with reference to different modules for convenience in explanation and understanding. However, the discussed operations may be grouped and implemented in many different ways than those discussed herein.

Claimed media ingestion module 180 receives rights feeds from rights holder computing devices 101A-N and media aggregator computing device 103. A rights feed from media aggregator computing device 103 may include rights claims for multiple different rights holders (e.g., those associated with rights holder computing devices 104A-M). The media aggregator may or may not itself claim rights in any of the rights claims that it provides. For example, the media aggregator may license rights from individual rights holders, and provide bundles of rights claims that it has licensed. Alternatively, the media aggregator may simply aggregate rights claims of multiple different rights holders without itself having any media rights, and may provide bundles of such rights claims.

When a new rights claim is received, claimed media ingestion module 180 generates a digital fingerprint of a received claimed media item if no digital fingerprint was received. If a digital fingerprint was received, then claimed media ingestion module 180 may not generate a digital fingerprint. Claimed media ingestion module 180 then compares the digital fingerprint for the claimed media item to a library of digital fingerprints of claimed media items 172.

Digital fingerprints are compact digital representations of a media item (or a segment of a media item) extracted from a media item (audio or video) which represent characteristics or features of the media item with enough specificity to uniquely identify the media item. Original media items (e.g., claimed media items that are known works) may be registered to the aggregated media rights platform 170, which may include generating a plurality of segments of the original claimed media item in some instances. Digital fingerprints may be generated for each of a plurality of segments of the claimed media item (or a single digital fingerprint may be generated for the entire claimed media item) or for the entire claimed media item, unless such digital fingerprints were received. Fingerprinting algorithms encapsulate features such as frame snippets, motion and music changes, camera cuts, brightness level, object movements, loudness, pitch, brightness, spectral bandwidth, energy in one or more spectral bands, spectral steadiness, Mel-frequency cepstral coefficients (MFCCs), and so on. The fingerprinting algorithm that is used may be different for audio media items and video media items. Additionally, different fingerprinting algorithms may be used to generate digital fingerprints usable to identify a copy of a known work and to generate digital fingerprints usable to identify a cover of a known work.

For example, a fingerprinting algorithm used to generate digital fingerprints of audio data measures a variety of acoustical features of a sequence of segments of the audio data. The acoustical features may include loudness, pitch, bass, brightness, bandwidth, Mel-frequency cepstral coefficients (MFCCs), and so forth. The fingerprinting algorithm may also compute first and/or second derivatives of some or all of these features to determine changes in the features and rates of changes in the features. The fingerprinting algorithm may compute statistical measurements such as mean and standard deviations of each of these features over one or more segments as well. Some or all of these values may be included in the feature vector of the audio data. In one embodiment, a digital fingerprint of the audio data includes a sequence of smaller digital fingerprints, where each digital fingerprint is for a segment of the media item that overlaps with other segments of the media item. For example, a first digital fingerprint may be for a segment of seconds 1-6, a second digital fingerprint may be for a segment of seconds 2-6, and so on.

In another example, a fingerprinting algorithm used to generate digital fingerprints of video data may measure a variety of features such as frame snippets, motion changes, camera cuts, brightness level, object movements, and so on. Unlike audio, video is divided into frames. Accordingly, for video media items (or video portions of media items) features may be determined per frame. In one embodiment, extracted features for a video media content item are based on features such as intensity, moving objects (e.g., objects that move between frames), and other image based features. In one embodiment, each frame is divided into a grid, and a bit pattern is computed based on the grid. The fingerprinting algorithm may examine neighboring cells in the grid to determine if neighboring cells are brighter or darker than a given cell. Vectors may be computed for each cell that indicates the change in intensity to adjacent cells. A vector grid may be generated for each frame, and vector grids of adjacent in time frames may be compared. A gray scale difference between the vector grids may be determined to identify locations in the grid where objects have moved. Movement may be placed into quadrants. Accordingly, a feature that may be determined is motion between frames (e.g., using pixel values over an interval), which may include area that the motion has occurred in the screen, an amount of motion, and so on. Additionally, static features may be determined for each frame (e.g., may be actual pixel values in a frame).

In one embodiment, video is down sampled for feature extraction and fingerprint generation. For example, an original resolution may be down sampled to a 100×100 pixel resolution in embodiments. The frame rate may also be down sampled (e.g., from about 60 frames per second to about 5 frames per second).

Many other fingerprinting algorithms and techniques than those discussed herein may be used to generate digital fingerprints of audio data and of video data. Some example digital fingerprinting techniques and techniques for comparison of digital fingerprints between media items are discussed in U.S. patent application Ser. No. 15/726,278, filed Oct. 5, 2017, the entire contents of which are incorporated by reference herein.

Digital fingerprints generated for a registered work (a claimed media item) are stored along with content metadata in media rights data store 152. Digital fingerprints can be compared and used to identify hosted media items and claimed media items even in cases of content modification, alteration, or obfuscation (e.g., compression, aspect ratio changes, re-sampling, change in color, dimensions, format, bitrates, equalization) or content degradation (e.g., distortion due to conversion, loss in quality, blurring, cropping, addition of background noise, etc.) in embodiments. Additionally, or alternatively, digital fingerprints may be usable to identify covers of claimed media items. In some embodiments, multiple different digital fingerprints are generated for claimed media items. For example, a first digital fingerprint (or set of digital fingerprints) may be generated for determining exact matching and identification of copies of portions of the claimed media item and a second digital fingerprint (or set of digital fingerprints) may be generated for identifying covers of the claimed media item.

If a match is found between the digital fingerprint of the claimed media item and a digital fingerprint of a claimed media item that already has an entry in media rights data store 152, then the entry in the media rights data store 152 is updated to include the data from the rights claim. If no match is found between the digital fingerprint of the claimed media item and digital fingerprints of claimed media items 172 in the media rights data store 152, then a new entry is added for the claimed media item to the media rights data store 152. The new entry may include the rights claim (e.g., including the type of right, territories to which is applies, media sharing platforms to which it applies, a time period for which it applies, etc.), information about the rights holder, the digital fingerprint, other metadata associated with the claimed media item, and/or other information.

When a rights claim is added to an entry for a claimed media item 172 in the media rights data store 152, a "not for production" flag (also referred to as an "uncleared" flag) may be set for that rights claim. The "not for production" flag may then be removed once the new rights claim has been cleared of any possible rights conflicts. While the "not for production" flag is set, a rights claim (and its associated content management rule) will not apply to hosted media items that may contain portions of the claimed media item. However, if the "not for production" flag is not set, then the rights claim (and its associated content management rule) will apply to hosted media items that may contain portions of the claimed media item. Alternatively, data for new claimed media items may be initially added to a staging area, which may be a separate data store from the media rights data store. Content management rules and rights claims associated with claimed media items in the staging area may not be applied. Once a rights claim for a claimed media item with an entry in the staging area is cleared, then the data for the claimed media item may be moved from the staging area to the media rights data store 152. In other words, once the new claimed media items have their rights claims cleared of conflict, then they may be moved to the media rights data store.

Media rights determiner 184 determines rights associated with claimed media items 172, resolves conflicts between rights claims, and determines when claimed media items 172 can be used in hosted media items. As discussed above, data feeds may be received from multiple different rights holder computing devices 101A-N and/or a media aggregator computing device 103. Each data feed may include data for one or a set of claimed media items, including rights claims to those media items. In some instances, multiple different rights holders may claim the same right to a particular claimed media item 172.

The rights claims may be to the same claimed media item, may be for the same rights (e.g., publishing rights, composition rights, sound recording rights, performance rights, etc.), may be for the same territory, may be for the same media sharing platform, and so on. Rights conflicts may be identified at the metadata level (matching metadata between rights claims, such as claims to the same song by name) and/or fingerprint level (matching digital fingerprints). At the fingerprint level, full matches (e.g., 90% or greater match of the duration of one fingerprint against another digital fingerprint) and partial matches (e.g., less than 90% match in duration of one fingerprint against another fingerprint) may be determined. For example, minutes 2-10 of a first digital fingerprint may match minutes 1-9 of a second digital fingerprint, resulting in a 90% match in duration. Based on this information, the level of conflict between rights claims may be determined.

When multiple different overlapping rights claims are identified for a claimed media item, then media rights determiner 184 may determine that a rights conflict exists between the different rights holders claiming the overlapping rights and initiate a conflict resolution process between those rights holders. Media rights determiner 184 may then resolve the rights conflict based on feedback from one or more of the rights holders and/or based on an automated conflict resolution process that does not involve feedback from rights holders. Media rights determiner 184 may provide a threaded discussion platform with full history between all rights holders in conflict. A conversation history between rights holders may be tied to or grouped across similar conflicts between the same rights holders. The resolution of multiple rights conflicts between the same rights holders may be processed in a single communication exchange in embodiments. Once the rights conflict is resolved, media rights determiner 184 updates the claimed media item in question with the appropriate rights information. The conflict resolution process is discussed in greater detail below with reference to FIGS. 2-48.

As set forth above, each claimed media item may have multiple different rights associated with it (e.g., publishing rights, composition rights, sound recording rights, performance rights, etc.). Media rights determiner 184 may aggregate the various rights associated with a claimed media item and determine whether all rights are accounted for with regards to that claimed media item. Once all of the rights are accounted for with regards to the claimed media item, the media rights determiner 184 may then compare the content management rules provided by each of the rights holders that holds one or more of the rights to the claimed media item and determine from the comparison one or more actions that are permitted by each of the content management rules.

The set of actions permitted for a claimed media item may then be communicated to each media sharing platform. Different sets of rights may be sent to different media sharing platforms (e.g., if different actions are permitted on different media sharing platforms). For example, the same piece of content may be blocked on one media sharing platform but licensed on another media sharing platform. A set of actions may indicate for each territory the rules to follow with regards to streaming or otherwise showing content including the claimed media item.

Figure 5:
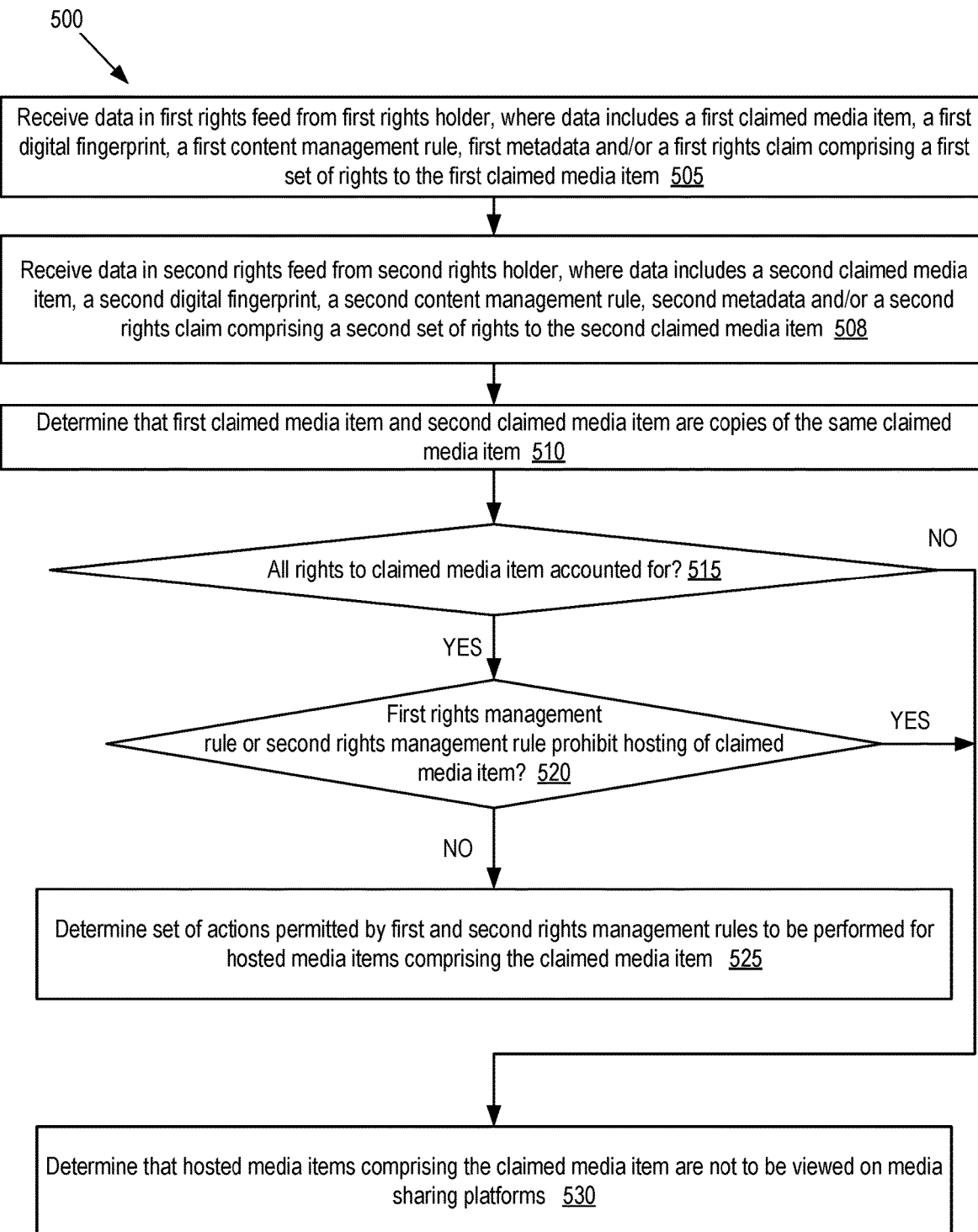
Figure 6:
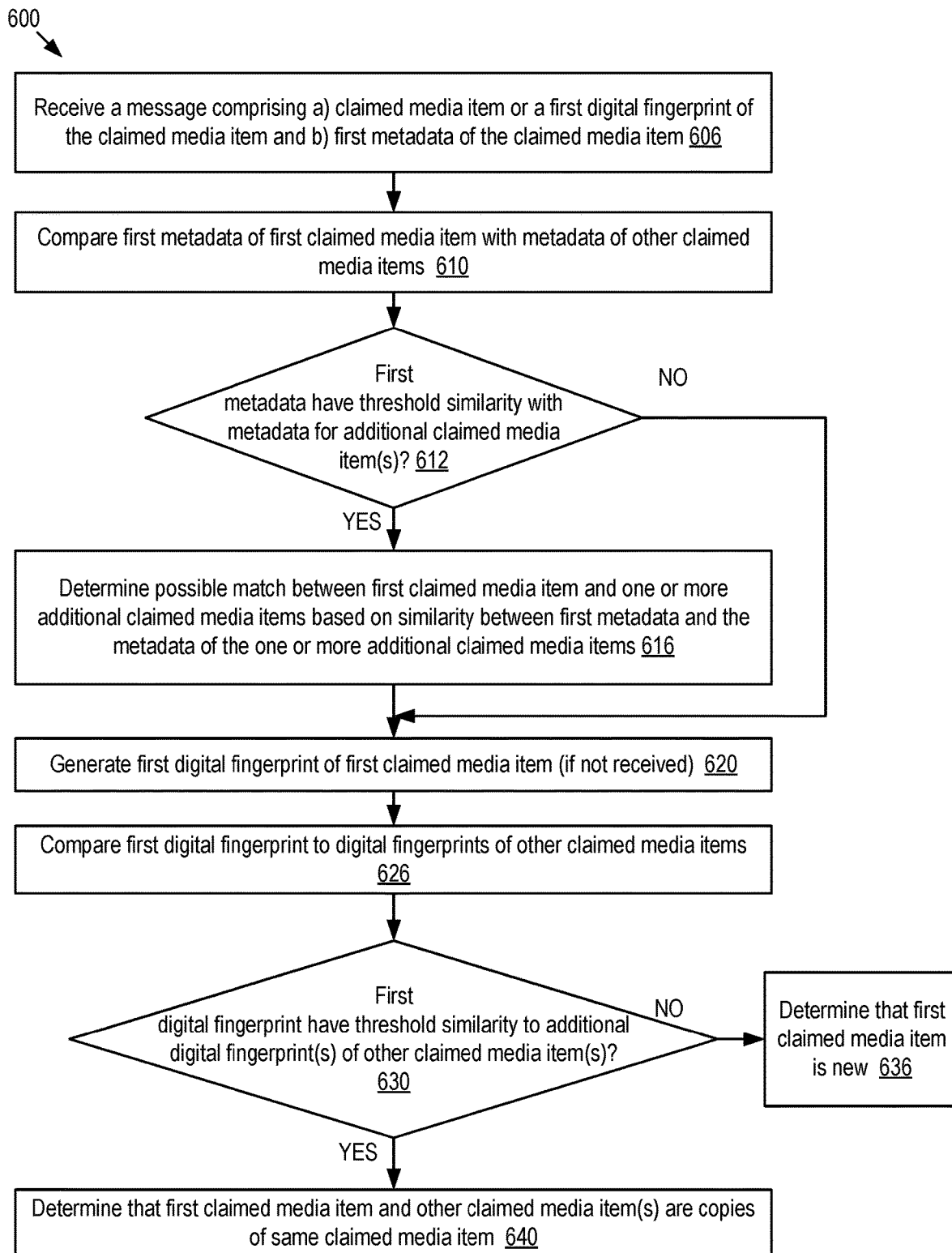
FIG. 6 is a flow diagram illustrating a method for determining a set of actions permitted for hosted media items that comprise a claimed media item, according to an embodiment.

In an example, if all of the content management rules state that the claimed media item may be monetized, then media rights determiner may determine a monetization policy for the claimed media item, and may notify media sharing platforms 175A-Z of the monetization policy. However, if one of the content management rules indicates that the claimed media item cannot be posted to media sharing platforms, then media rights determiner 184 may determine a takedown policy for the claimed media item and may notify the media sharing platforms 175A-Z of the takedown policy. At any time one or more of the rights holders may adjust their content management rule associated with a claimed media item, at which point the media rights determiner 104 may make a new determination as to which actions are permitted for that claimed media item. As a rights holder changes one or more parameters of a content management rule for a claimed media item, media rights determiner 184 may determine which media sharing platforms and/or territories are affected and notify one or more media sharing platforms of the change. The notification may be in regards to hosted media items on those media sharing platforms that contain the claimed media item with the changed content management rule. FIGS. 5-6 describe methods for determining the actions that are permissible for hosted media items that include portions or an entire content of claimed media items, in accordance with embodiments of the present disclosure.

OSP computing devices 105A-Z may each host a different media sharing platform 175A-Z. Examples of media sharing platforms 175A-Z include YouTube®, Vimeo®, Wistia®, Vidyard®, SproutVideo®, Daily Motion®, Facebook®. Media sharing platforms 175A-Z may receive user uploads of user generated content (UGC). Such user generated content may then be accessible to other users. User generated content includes hosted media items that have been uploaded to the media sharing platform 175A-Z. Such hosted media items may include copyrighted material in many instances (e.g., may incorporate content from one or more claimed media items). However, media sharing platforms 175A-Z generally do not know whether uploaded UGC includes copyrighted material (e.g., copies of claimed media items) when the UGC is uploaded. Accordingly, media sharing platforms 175A-Z rely on aggregated media rights platform 170 to identify UGC that incorporates copyrighted material (e.g., that includes portions of claimed media items).

OSP computing devices 105A-Z each provide a feed of hosted media items hosted by media sharing platforms 175A-Z on the OSP computing devices 105A-Z. The feed may be a live stream of data, or may be a continuous or periodic stream of data. Each feed of hosted media items may include data for one or more hosted media items that has been uploaded to a particular media sharing platform 175A-Z. A hosted media item may be audio (e.g., a song or album), a video, or other work that has been uploaded to a media sharing platform 175A-Z. The media item may be a file (e.g., an audio file having a format such as WAV, AIFF, AU, FLAC, ALAC, MPEG-4, MP3, Opus, Vorbis, AAC, ATRAC, WMA, and so on, or a video file having a format such as WebM, Flash Video, F4V, Vob, Ogg, Dirac, AVI, QuickTime File Format, Windows Media Video, MPEG-4, MPEG-1, MPEG-2, M4V, SVI, MP4, FLV, and so on). The hosted media item may be provided to server computing device 150 as a single file or multiple files (e.g., as a portion of a larger file). Alternatively, one or more digital fingerprints (e.g., sets of features) of the hosted media item may be generated and provided to aggregated media rights platform 170. In one embodiment, a digital fingerprint generator divides a hosted media item into multiple segments, and one or more segments (or a digital fingerprint of one or more segments) are sent to server computing device 150. Alternatively, a digital fingerprint of the hosted media item may be determined from the whole of the hosted media item and transmitted to the server computing device 150. In addition to sending one or more digital fingerprints of a hosted media item and/or one or more segments of the hosted media item, the media sharing platform 175A-Z may also send metadata associated with the hosted media item.

Each OSP computing device 105A-Z may include a digital fingerprint generator (not shown) provided by an operator of the aggregated media rights platform 170. The OSP computing devices 105A-Z may process hosted media items using the digital fingerprint generator to generate digital fingerprints of the hosted media items. In some embodiments hosted media items may include a video portion and an audio portion. Accordingly, OSP computing devices 105A-Z may include an audio fingerprint generator and a video fingerprint generator in some embodiments. The audio fingerprint generator may generate a fingerprint of audio data in a hosted media item, and the video fingerprint generator may generate a fingerprint of video data in a hosted media item. Alternatively, a single digital fingerprint generator may generate a digital fingerprint that include both an audio fingerprint portion and a video fingerprint portion. The digital fingerprints may then be provided in a hosted media data feed rather than the hosted media item itself. A digital fingerprint of a media item is considerably smaller in file size than the media item itself. Accordingly, network bandwidth utilization may be reduced by having OSP computing devices 105A-Z generate and provide digital fingerprints of hosted media items rather than the hosted media items themselves.

Hosted media ingestion module 182 processes feeds of hosted media items from OSP computing devices 105A-Z. Hosted media ingestion module 182 may be configured to determine whether a received hosted media item is or includes a copy of (or a copy of a portion of) a known claimed media item 172. In an embodiment, the hosted media ingestion module 182 may receive the hosted media item, segments of the hosted media item, and/or one or more digital fingerprints of the hosted media item from an OSP computing device 105A-Z. For example, the hosted media ingestion module 182 may receive an unidentified hosted media item from OSP computing device 105A and determine whether the unidentified hosted media item incorporates music from a claimed media item or incorporates video from a claimed media item.

The digital fingerprint (or multiple digital fingerprints) of the unknown hosted media item may be compared against the digital fingerprints of all known works registered with aggregated media rights platform 170 (e.g., against the digital fingerprints of all claimed media items 172). Once a match is found between a digital fingerprint of the hosted media item and a digital fingerprint of a portion of a claimed media item, a determination may be made that the hosted media item incorporates at least the portion of the claimed media item.

Aggregated media rights platform 170 may maintain a hosted media data store 156. Each entry in the hosted media data store 156 may be associated with a distinct hosted media item. A unique hosted media identifier (ID) may be generated for each hosted media item. An entry for a hosted media item may include a hosted media ID assigned by aggregated media rights platform 170, a unique ID assigned by the media sharing platform, one or more digital fingerprints of a hosted media item, other metadata of the hosted media item, and/or other information.

If a match is found between the digital fingerprint of the hosted media item and a digital fingerprint of a claimed media item, then the entry in the hosted media data store 156 is updated to include the data regarding the match (e.g., identifying the claimed media item incorporated into the hosted media item by a unique claimed media item ID).

In some embodiments, hosted media ingestion module 182 applies an unknown hosted media item, one or more segments of the unknown hosted media item, set of features of the unknown hosted media item, or digital fingerprint(s) of the unknown hosted media item to a trained machine learning profile. The trained machine learning profile may then classify the unknown hosted media item as music or as not music. If the unknown media content item is classified as containing music, the hosted media ingestion module 182 may compare digital fingerprints of the unknown hosted media item to digital fingerprints of known claimed media items 172 that also contain music. This may reduce the processing resources utilized to match the digital fingerprint. The entry for the hosted media item 176 may also be updated to indicate that it contains music. Once the digital fingerprint of the received hosted media item has matched an instance of a known claimed media item, the hosted media item is identified as being a copy of, or incorporating a portion of, the known claimed media item 172.

In one embodiment, hosted media ingestion module 182 classifies hosted media items using machine learning profiles and/or machine learning models (i.e., profiles and models produced using machine learning techniques). Server computing device 150 may receive a collection of hosted media items and/or claimed media items, which may be used to train a machine learning profile and/or model. The hosted media items and/or claimed media items may be provided as an input to a machine learning profiler as part of a training data set to generate the profiles and/or models. The machine learning profiler may perform supervised machine learning to identify a set of features that are indicative of a first classification and another set of features that are indicative of another classification. The first set of features indicative of the first classification (e.g., indicative of music) may be defined in a first model and a second set of features indicative of the second classification (e.g., lack of music) may be defined in a second model. Alternatively, profiles may be generated for more than two classifications.

The machine learning profiler may generate machine learning profiles for identifying one or more classes of hosted media items. For example, the machine learning profiler may generate a profile for identifying, for hosted media items having audio, whether the audio comprises music or does not comprise music. Similarly, the machine learning profiler may generate a profile for identifying, for audio, a classification wherein the audio comprises a particular categorization of music (e.g., a genre including rock, classical, pop, etc.; characteristics including instrumental, a cappella, etc., and so on). The machine learning profiler may generate a profile for identifying, for media content items including video, a classification wherein the video comprises a categorization of movie (e.g., a genre including action, anime, drama, comedy, etc.; characteristics including nature scenes, actor screen time, etc.; recognizable dialogue of famous movies, and so on). Hosted media items may also be classified through manual curation and/or other technologies.

In some embodiments, hosted media ingestion module 182 may determine whether an unidentified hosted media item is a cover version of a known claimed media item or whether the unidentified hosted media item is an original work itself. In an embodiment, the hosted media ingestion module 182 may extract one or more sets of audio features from the hosted media item, transform the audio features, and compare the transformed audio features to features of the known claimed media items. The transformed set of audio features may make up one or more digital fingerprints of the hosted media item. The hosted media ingestion module 182 may also identify metadata from the unidentified hosted media item and perform a comparison to the metadata associated with known claimed media items 172 in order to determine similarities between the metadata associated with the unidentified hosted media item and the metadata associated with known claimed media items.

Once a hosted media item is identified as a cover of a known claimed media item, that hosted media item may be linked to the known claimed media item in hosted media data store. For example, an entry for a hosted media item 176 may be updated to indicate that the hosted media item is a cover of a particular claimed media item. Covers may also link to other covers of the same known claimed media item.

Hosted media action determiner 186 determines one or more actions to take with regards to host media items. For example, a hosted media item may be tagged as containing a known claimed media item, advertising may be applied to the hosted media item and licensing revenues may be attributed to the owner(s) of the rights to the claimed media item, the hosted media item may be removed from the media content sharing platform, and so on. Once a determination has been made that a hosted media item incorporates one or more claimed media items, hosted media action determiner 186 may determine what actions are permitted for hosted media items that incorporate the one or more claimed media items. If each of the claimed media items that are incorporated into a hosted media item have at least one overlapping permitted action with each other, then hosted media action determiner 186 may determine that the overlapping permitted action is to be taken for the hosted media item. For example, if all of the rights holders of all of the claimed media items that are incorporated into a hosted media item provided content management rules that permitted revenue generation through advertising, then hosted media action determiner 186 may determine that the hosted media item may be posted, viewed, and shown with advertisements. If one or more of the content management rules associated with any of the claimed media items limits the types of advertisements that may be shown with the hosted media items that contain that claimed media item, then those limits are determined to apply to the hosted media item. For example, a content management rule may specify that no audio-containing advertisements are to be shown, or no political advertisements are to be shown, or no advertisements to particular products are to be shown, and so on. Additionally, if any of the claimed media items incorporated into a hosted media item has a takedown policy associated with it (e.g., because one of the rights holders indicated that the claimed media item should not be posted to media sharing platforms), then the takedown policy may apply to the hosted media item.

Hosted media action determiner 186 notifies the media sharing platform 175A-Z hosting a hosted media item of the permitted actions for that hosted media item. The notice may include a unique identifier (ID) assigned to the hosted media item by the media sharing platform and/or a unique ID assigned by the aggregated media rights platform 170 along with the set of actions. Hosted media action determiner 186 may notify the media sharing platform 175A-Z of the permitted actions responsive to receiving a notice from the media sharing platform 175A-Z that the media sharing platform is hosting that hosted media item (e.g., via a data feed of hosted media items from that media sharing platform). The permitted actions may include a set of actions, possibly including different actions for different territories. The set of actions may be actions that are permitted for that hosted media item on that particular media sharing platform. A different media sharing platform hosting a copy of the same hosted media item may receive the same set of actions or a different set of actions, depending on the content management rules associated with the claimed media items incorporated into the hosted media item.

Additionally, when a viewer attempts to view the hosted media item on a media sharing platform, the media sharing platform 175A-Z may send a notice to aggregated media rights platform 170. The notice may include one or more unique identifier (ID) associated with the hosted media item along with an indication of a territory in which the hosted media item will be viewed. Hosted media action determiner 186 may then again determine an appropriate action for that hosted media item on the particular media sharing platform viewed in the particular territory. If the hosted media item can be viewed on that media sharing platform in that territory, then hosted media action determiner 186 may notify the media sharing platform to permit the hosted media item to be viewed. If the hosted media item cannot be viewed on that media sharing platform in that territory (based on the set of actions permitted for that hosted media item at the time of viewing), then hosted media action determiner 186 may notify the media sharing platform 175A-Z not to allow the hosted media item to be viewed. In embodiments, rights holders may modify the content management rules associated with claimed media items at any time. Accordingly, hosted media action determiner 186 may determine permissible actions for hosted media items both at the time of upload to the media sharing platforms and at the time of viewing of the hosted media item by viewers.

The processing of hosted media items as well as determination of permissible actions for hosted media items is discussed in greater detail with reference to FIGS. 8A-13B.

In some embodiments, aggregated media rights platform includes a music synchronization (sync) license module 187. Sync license module may generate sync licenses for hosted media items, as described in greater detail with reference to FIG. 7.

In some embodiments, media rights determiner 184 stores licensor agreements of different media sharing platforms in a licensor agreement data store. Each media sharing platform may have different approvals, permissions, licenses, royalty rate agreements, etc. in place with rights holders with regards to claimed media items. Media rights determiner 184 may calculate royalty rates owed to rights holders based on a) view data of hosted media items received from media sharing platforms and b) stored licensor agreements.

In some embodiments, aggregated media rights platform 170 includes an advertisement module 189 that provides advertisements and/or other content displaying or playing along with a hosted media item. Further information about providing advertisements and/or other content for hosted media items to media sharing platforms is described with reference to FIGS. 15-16.

Aggregated media rights platform 170 may include a rights holder interface 188 and a platform interface 190. The rights holder interface 188 may provide a dashboard for a rights holder showing all of the claimed media items to which the rights holder has rights, the particular rights that the rights holder has to those claimed media items, the number of hosted media items that incorporate each of the claimed media items, the amount of views/plays of the claimed media items (e.g., of the hosted media items containing the claimed media items), the amount of revenue generated for the claimed media items, the amount of revenue generated by each media sharing platform, and/or other information. The rights holder interface 188 may provide aggregation and normalization of reporting across media sharing platforms. Via the rights holder interface 188, a rights holder may select a claimed media item, modify a content management rule of the claimed media item, update a rights claim to a claimed media item, and/or perform other actions. The rights holder interface 188 provides a simple dashboard in which the rights holder can see all of their information for all of their claimed media items aggregated across multiple different media sharing platforms.

Responsive to a rights holder modifying a content management rule for a claimed media item, hosted media action determiner 186 may determine all hosted media items that include that claimed media item, re-compute the sets of actions for those hosted media items, and notify the media sharing platforms hosting those hosted media items of the updated sets of actions. Rights holders may also manually claim media items incorporated into hosted media items via the rights holder interface 188. The media item may have been added to the media rights data store (with a unique ID, digital fingerprints, etc.), but without data on any rights holder. After the rights holder manually claims the media item, their ownership claim may be added to the entry for that media item.

Platform interface 190 may provide a dashboard for a media sharing platform showing all of the hosted media items hosted by the media sharing platform, the claimed media items incorporated into those hosted media items, the rights holders holding rights to the claimed media items, the amount of views/plays of the hosted media items, the amount of revenue due to each of the rights holders, and/or other information. The platform interface 190 provides a simple dashboard in which the media sharing platform can see all of their information for all of their hosted media items aggregated across multiple different rights holders. The dashboard may show information on hosted media items at a micro level, showing each view and the royalties due to each rights holder for that view. Billions of similar data elements may be aggregated to show total revenue for territories, rights holders, hosted media items, and so on.

Figure 14:
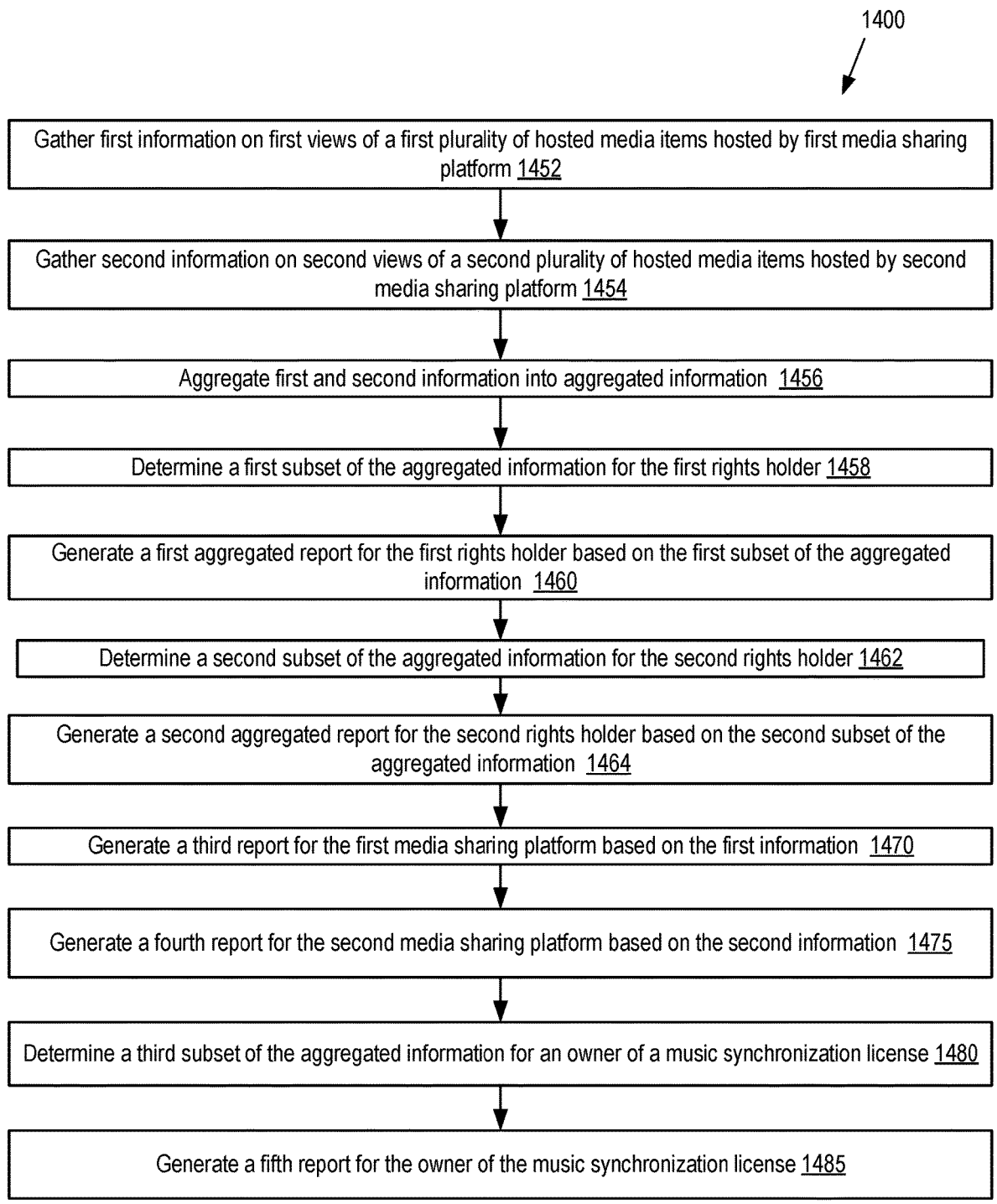
FIG. 14 is a flow diagram illustrating a method for reporting tailored information to different OSPs and rights holders, according to an embodiment.

A process for aggregating information on hosted media items and/or claimed media items and providing a dashboard interface of the aggregated information for rights holders and media sharing platforms is shown in FIG. 14.

In some embodiments, the aggregated media rights platform 170 may notify media sharing platforms to proceed with hosting or sharing hosted media items that incorporate claimed media items for which rights conflicts are pending. As long as a) all of the rights are accounted for with regards to a claimed media item and b) an aggregate of the content management rules of all of the rights holders (including those in conflict) permit the hosting or monetization, that claimed media item may still be monetized and/or hosted even if there is some conflict between the declared rights. In such an instance, aggregated media rights platform may receive reports from media sharing platforms on revenues raised in association with these hosted media items before the rights conflict is resolved. Aggregated media rights platform may additionally receive royalty payments from media sharing platforms. Aggregated media rights platform 170 may compute royalties owed to different rights holders and pay the royalties to those rights holders for which there is no rights conflict, as appropriate. Aggregated media rights platform 170 may additionally act as a cross-platform escrow service and store the royalties received from multiple media sharing platforms that is due to the rightful holder of the conflicting rights until the rights conflict is resolved. Once the rights conflict is resolved in favor of a particular rights holder, the royalties due to that particular rights holder may be paid.

In one embodiment, aggregated media rights platform may notify media sharing platforms to proceed with hosting or sharing hosted media items that incorporate claimed media items for which not all rights have been determined. This may be performed for particular territories such as Europe, for example. The aggregated media rights platform may collect and store the royalties due to an unknown rights holder or rights holders of the one or more claimed media items until the rights holder(s) is determined.

FIGS. 2-16 are flow diagrams illustrating various methods performed by an aggregated media rights platform 170. The methods may be performed by processing logic that comprises hardware (e.g., circuitry, dedicated logic, programmable logic, microcode, etc.), software (e.g., instructions run on a processor), firmware, or a combination thereof. The methods may be performed, for example, by server computing device 150 of FIG. 1 in embodiments.

Figure 2:
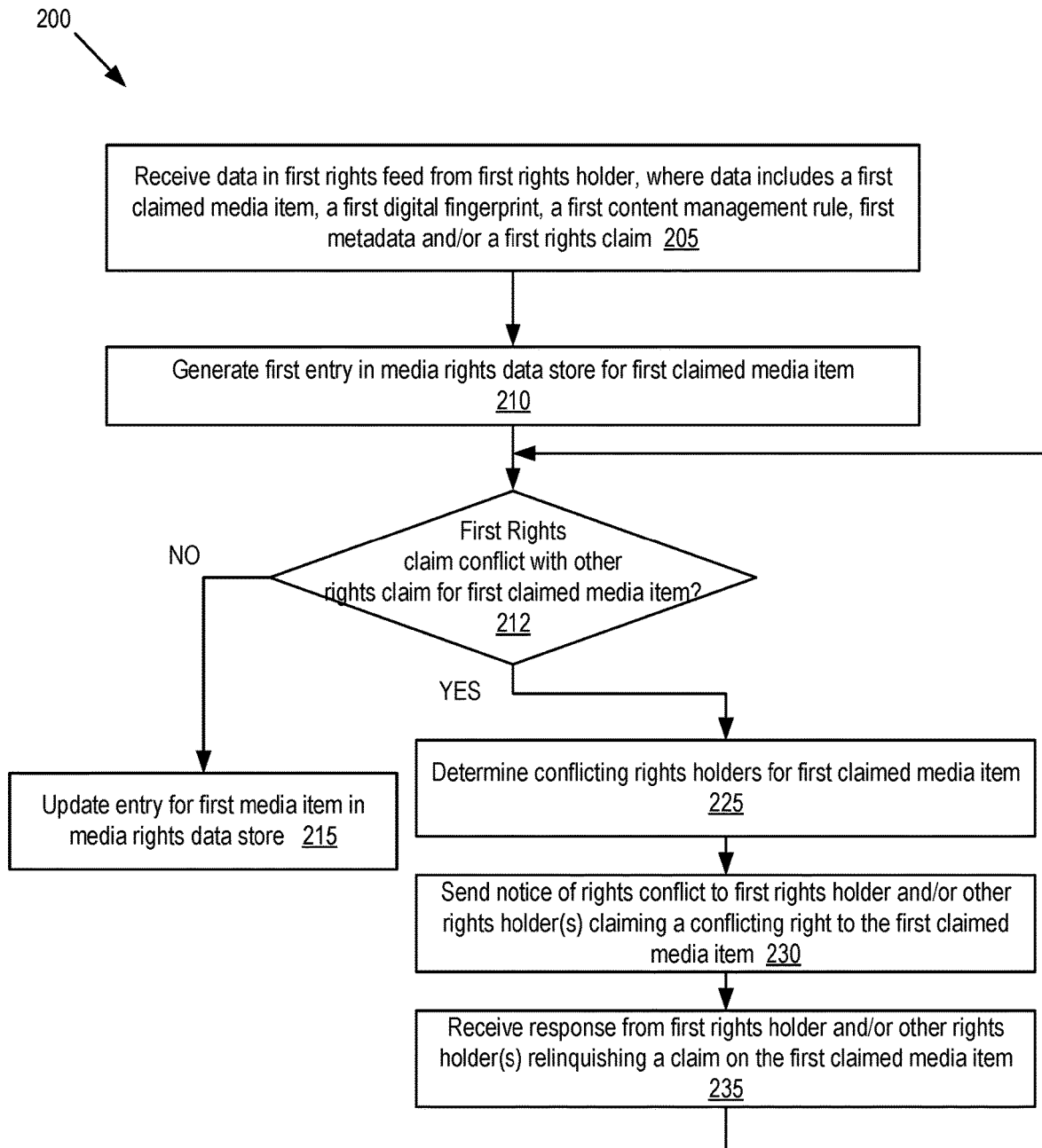
FIG. 2 is a flow diagram illustrating a method for identifying and resolving a rights conflict between rights holders to a claimed media item, according to an embodiment.

FIG. 2 is a flow diagram illustrating a method 200 for identifying and resolving a rights conflict between rights holders to a claimed media item, according to an embodiment. In some embodiments, the claimed media item is an audio media item, such as a recording of a song. In some embodiments, the claimed media item is a visual media item, such as a still image or a video. At block 205 of method 200, processing logic receives data in a rights feed from a first rights holder. The received data may include a first claimed media item, a first digital fingerprint of the first claimed media item, a first content management rule that governs actions that can be performed with reference to the claimed media item, first metadata associated with the first media item and/or a first rights claim to the first claimed media item.

In some instances, the received data includes the claimed media item. Processing logic may then generate a digital fingerprint of the claimed media item. A first digital fingerprint generating algorithm may be used to generate digital fingerprints of audio media items, while a second digital fingerprint generating algorithm may be used to generate digital fingerprints of videos and/or images. In some instances, the received data includes a digital fingerprint of the claimed media item rather than the claimed media item itself. A rights holder may generate the digital fingerprint and send the digital fingerprint rather than the claimed media item to reduce an amount of network bandwidth that is used.

The first content management rule may specify one or more rules for use of the claimed media item. The one or more rules may include rules specific to one or more territories, rules specific to one or more media sharing platforms, rules specific to one or more time periods, and so on as discussed above. The first rights claim may specify one or more particular rights to the claimed media item (e.g., publishing rights for one or more territories and/or one or more media sharing platforms, performance rights for one or more territories and/or one or more media sharing platforms, and so on). The metadata may describe one or more attributes of the claimed media item and may include descriptive text about the claimed media item, such as an artist name, an album name, a song name, cover information (if the claimed media item is a cover of another media item), and so on. The metadata may also include the content management rule and/or rights claim.

At block 210, processing logic may generate a first entry in a media rights data store for the first claimed media item. The first entry may be generated for the claimed media item and the rights holder in some embodiments. In some embodiments, processing logic determines if an entry in the media rights data store already exists for the claimed media item. If so, then processing logic may either a) generate an additional entry for the claimed media item and link the new entry to the existing entry for the claimed media item or b) add additional data to the already existing entry for the claimed media item in the media data store.

In one embodiment, processing logic compares the digital fingerprint for the claimed media item to digital fingerprints of other claimed media items in the media rights data store to determine if the claimed media item matches any media item for which rights have already been claimed by another rights holder. If a match is found between the digital fingerprint of the claimed media item and a digital fingerprint of a claimed media item already represented in the media rights data store, then processing logic may determine that they are for the same claimed media item, and may update the one or more entries for that claimed media item in the media rights data store accordingly. For example, if there are two separate entries, then these entries may be linked or combined. If there is a single entry, then the entry may be updated to indicate the rights claims of each of the rights holders who have claimed rights to the claimed media item.

At block 212, processing logic determines whether the first rights claim conflicts with any other rights claims for the first claimed media item. Processing logic may identify rights conflicts by comparing the rights claims of each rights holder who has asserted a rights claim to the first claimed media item to each other rights claim that has also been asserted to the first claimed media item. A conflict occurs if two or more rights holders claim at least one overlapping right to the claimed media item. For example, a conflict may occur if two rights holders each claim 100% of the publishing rights to the first claimed media item in France. If a rights conflict is identified at block 212, then the method proceeds to block 225. If no rights claim is identified, then the method proceeds to block 215.

At block 215, processing logic may update the entry for the first media item in the media rights data store. In some embodiments, the first entry for the first claimed media item initially has an "uncleared" or "not for production" flag set. Alternatively, the first rights claim in the first entry may have an "uncleared" or "not for production" flag set. Once a determination has been made that there is no conflict between the first rights claim and any preexisting rights claim to the first claimed media item, then processing logic may unset the "uncleared" or "not for production" flag. Once the flag is unset, then the first rights claim will apply to the claimed media item for hosted media items that incorporate the claimed media item. Additionally, the first content management rule associated with the first rights claim will become active, meaning that it will apply to hosted media items on media sharing platforms that incorporate at least portions of the claimed media item.

At block 225, processing logic determines the conflicting rights holders for the first claimed media item. The conflicting rights holders include the first rights holder and a second rights holder that also asserted the same rights claim to the first media item as the first rights holder. Processing logic may initiate a conflict management process between the first and second rights holders. At block 230, processing logic may then send a notice of the rights conflict to the first rights holder and/or to one or more other rights holders that claim a conflicting right to the first claimed media item (e.g., the aforementioned second rights holder). The notice sent to a rights holder may identify the claimed media item (e.g., may include metadata about the claimed media item), may include a unique ID assigned by the aggregated media rights platform, may include a unique ID assigned by the rights holder to the claimed media item, and/or may identify the rights conflict. The notice may include a request for verification that the rights holder does indeed own the claimed rights to the claimed media item. The notice may be sent to just the first rights holder, to just the second rights holder, or to both the first and second rights holders (and/or other rights holders) in embodiments.

At block 235, processing logic receives a response from the first rights holder and/or the one or more other rights holders (e.g., the second rights holder) relinquishing their claim on the first claimed media item. In an example, the second rights holder may have initially owned first rights to the claimed media item, but may have sold the first rights to the first rights holder and failed to inform the aggregated media rights platform of the rights transfer. Responsive to receiving the note at block 230, the second rights holder may acknowledge that they gave up the first rights. In another example, first rights holder may have erroneously claimed the first rights, and after receiving the notice at block 230 may identify their error and notice processing logic of the error.

Once the response to the notice is received from one or more rights holders, the method may return to block 212, and processing logic may again determine whether the first rights claim conflicts with any other rights claims. Alternatively, the method may proceed to block 215.

Figure 3:
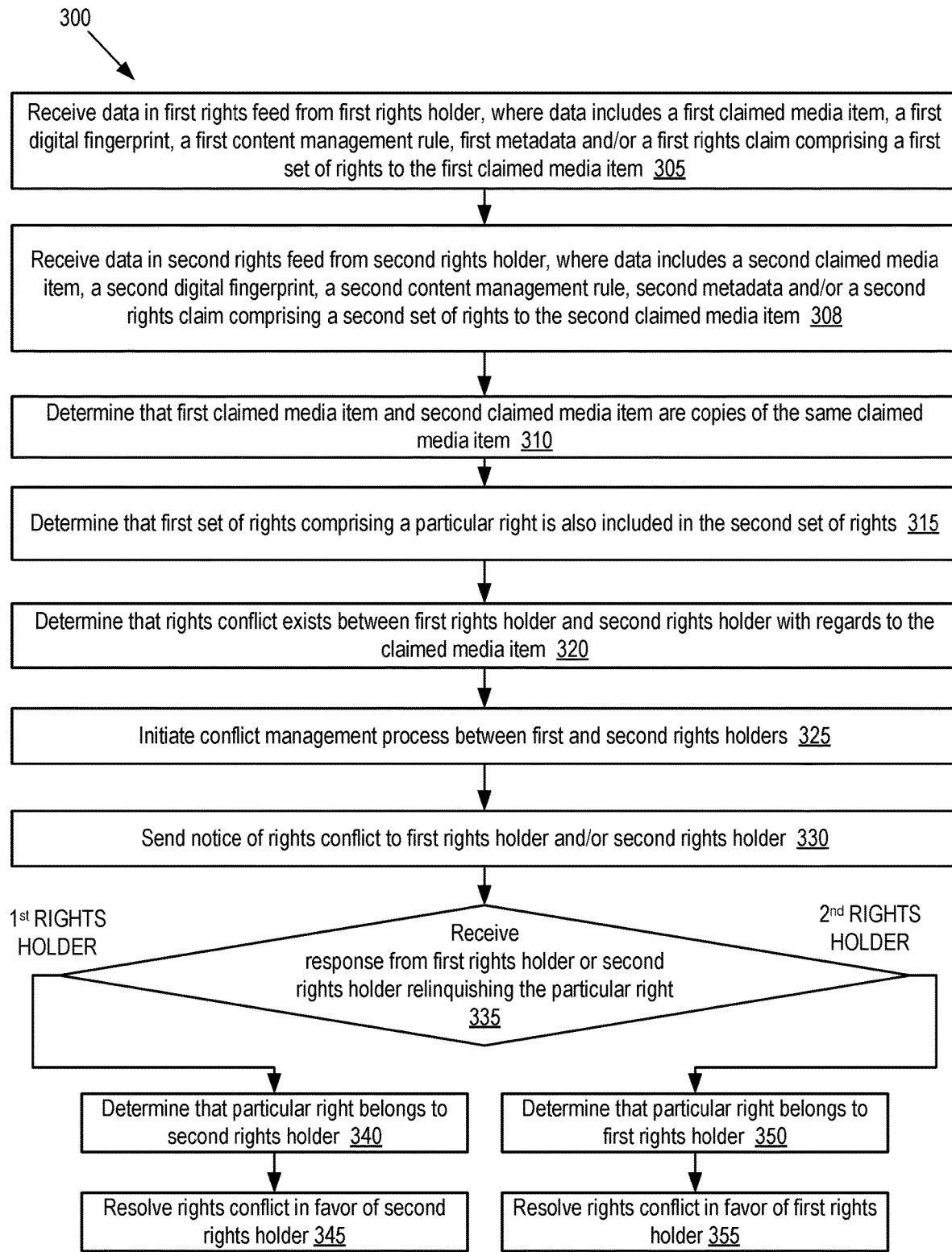
FIG. 3 is a flow diagram illustrating another method for identifying and resolving a rights conflict between rights holders to a claimed media item, according to an embodiment.

FIG. 3 is a flow diagram illustrating another method 300 for identifying and resolving a rights conflict between rights holders to a claimed media item, according to an embodiment. In some embodiments, the claimed media item is an audio media item, such as a recording of a song. In some embodiments, the claimed media item is a visual media item, such as a still image or a video. At block 305 of method 300, processing logic receives data in a first rights feed from a first rights holder. The received data may include a first claimed media item, a first digital fingerprint of the first claimed media item, a first content management rule that governs actions that can be performed with reference to the claimed media item, first metadata associated with the first media item and/or a first rights claim to the first claimed media item. The first rights claim may include a first set of rights to the first claimed media item (e.g., publishing rights for one or more territories and/or one or more media sharing platforms, performance rights for one or more territories and/or one or more media sharing platforms, and so on). For example, the first set of rights may include publishing rights to one or more territories (e.g., one or more countries), publishing rights for one or more time periods and/or publishing rights on one or more media sharing platforms. For example, a particular right in the set of rights may be a publishing right to the claimed media item in Germany, on Facebook, for the period starting January 2012 and ending January 2020.

In some instances, the received data includes the first claimed media item. Processing logic may then generate a digital fingerprint of the first claimed media item. In some instances, the received data includes a digital fingerprint of the first claimed media item rather than the first claimed media item itself.

At block 308, processing logic receives data in a second rights feed from a second rights holder. The received data may include a second claimed media item, a second digital fingerprint of the second claimed media item, a second content management rule that governs actions that can be performed with reference to the second claimed media item, second metadata associated with the second claimed media item and/or a second rights claim to the second claimed media item. The second rights claim may include a second set of rights to the first claimed media item.

In some instances, the received data includes the second claimed media item. Processing logic may then generate a digital fingerprint of the second claimed media item. In some instances, the received data includes a digital fingerprint of the second claimed media item rather than the first claimed media item itself.

At block 310, processing logic determines that the first claimed media item and the second claimed media item are copies of the same claimed media item. This determination may be made by comparing the first digital fingerprint to the second digital fingerprint and determining that the first digital fingerprint matches the second digital fingerprint. A match between the two digital fingerprints may be determined by determining a similarity value representing a similarity between the first digital fingerprint and the second digital fingerprint, and then determining that the similarity value exceeds a similarity threshold. Any entry for the first claimed media item may have been generated at block 305 responsive to receiving the data for the first claimed media item. The second digital fingerprint may then be compared to the digital fingerprints in each of the entries for claimed media items to identify any matches.

In one embodiment, processing logic first compares the first metadata associated with the first claimed media item to the second metadata associated with the second claimed media item. If a match is found between the first and second metadata, then the first digital fingerprint of the first claimed media item may be compared to the second digital fingerprint of the second claimed media item. Matching metadata may be determined by determining a similarity between the first metadata and the second metadata, and determining that the similarity exceeds a metadata similarity threshold. For example, processing logic may determine that the first metadata identifies "Single Ladies by Beyoncé", and that the second metadata identifies, "Artist: Beyoncé; Song: Single Ladies." These metadata may be sufficiently similar for a metadata match.

At block 315, processing logic determines that the first set of rights includes a particular right that is also included in the second set of rights. For example, processing logic may determine that the first set of rights and the second set of rights both include a rights claim to performance rights in India for "Single Ladies". At block 320, processing logic determines that a rights conflict exists between the first rights holder and the second rights holder with regards to the claimed media item (e.g., for the particular right claimed by both parties). At block 325, processing logic initiates a conflict management process between the first rights holder and the second rights holder.

At block 330, processing logic may then send a notice of the rights conflict to the first rights holder and/or to the second rights holder. The notice sent to a rights holder may identify the claimed media item (e.g., may include metadata about the claimed media item), may include a unique ID assigned by the aggregated media rights platform, may include a unique ID assigned by the rights holder to the claimed media item, and/or may identify the rights conflict. The notice may include a request for verification that the rights holder does indeed own the claimed rights to the claimed media item. The notice may be sent to just the first rights holder, to just the second rights holder, or to both the first and second rights holders in embodiments.

At block 335, processing logic receives a response from the first rights holder or the second rights holder relinquishing their claim on the first claimed media item. If a response relinquishing the particular right is received from the first rights holder, then the method continues to block 340. If a response relinquishing the right is received from the second rights holder, then the method continues to block 350.

At block 340, processing logic determines that the particular rights belongs to the second rights holder. At block 345, processing logic then resolves the rights conflict in favor of the second rights holder. Processing logic may then update an entry for the first media item in the media rights data store. In some embodiments, the entry for the first claimed media item initially has an "uncleared" or "not for production" flag set. Alternatively, the second rights claim in the entry may have an "uncleared" or "not for production" flag set. Once the conflict is resolved, then processing logic may unset the "uncleared" or "not for production" flag. Once the flag is unset, then the claim for the particular right in the second set of rights will apply to the claimed media item for hosted media items that incorporate the claimed media item. Additionally, the second content management rule associated with the second rights claim will become active, meaning that it will apply to hosted media items on media sharing platforms that incorporate at least portions of the first claimed media item.

At block 350, processing logic determines that the particular rights belongs to the first rights holder. At block 355, processing logic then resolves the rights conflict in favor of the first rights holder. Processing logic may then update an entry for the first media item in the media rights data store. In some embodiments, the entry for the first claimed media item initially has an "uncleared" or "not for production" flag set. Alternatively, the first rights claim in the entry may have an "uncleared" or "not for production" flag set, Once the conflict is resolved, then processing logic may unset the "uncleared" or "not for production" flag. Once the flag is unset, then the claim for the particular right in the first set of rights will apply to the claimed media item for hosted media items that incorporate the claimed media item. Additionally, the first content management rule associated with the first rights claim will become active, meaning that it will apply to hosted media items on media sharing platforms that incorporate at least portions of the first claimed media item.

Methods 200 and 300 describe two methods for determining and resolving a rights conflict with regards to a claimed media item. Methods 200 and 300 may be performed separately and/or one or more operations from method 200 may be implemented in conjunction with one or more operations from method 300. The resolution of a rights conflict may be recorded along with the specific attributes of the rights conflict. The resolution to the rights conflict and the attributes may be used to facilitate automatic conflict resolution for further rights conflicts (e.g., between the same two rights holders). Additionally, other data such as data credibility ratings may be used to facilitate automatic resolution of rights conflicts.

Figure 4A:
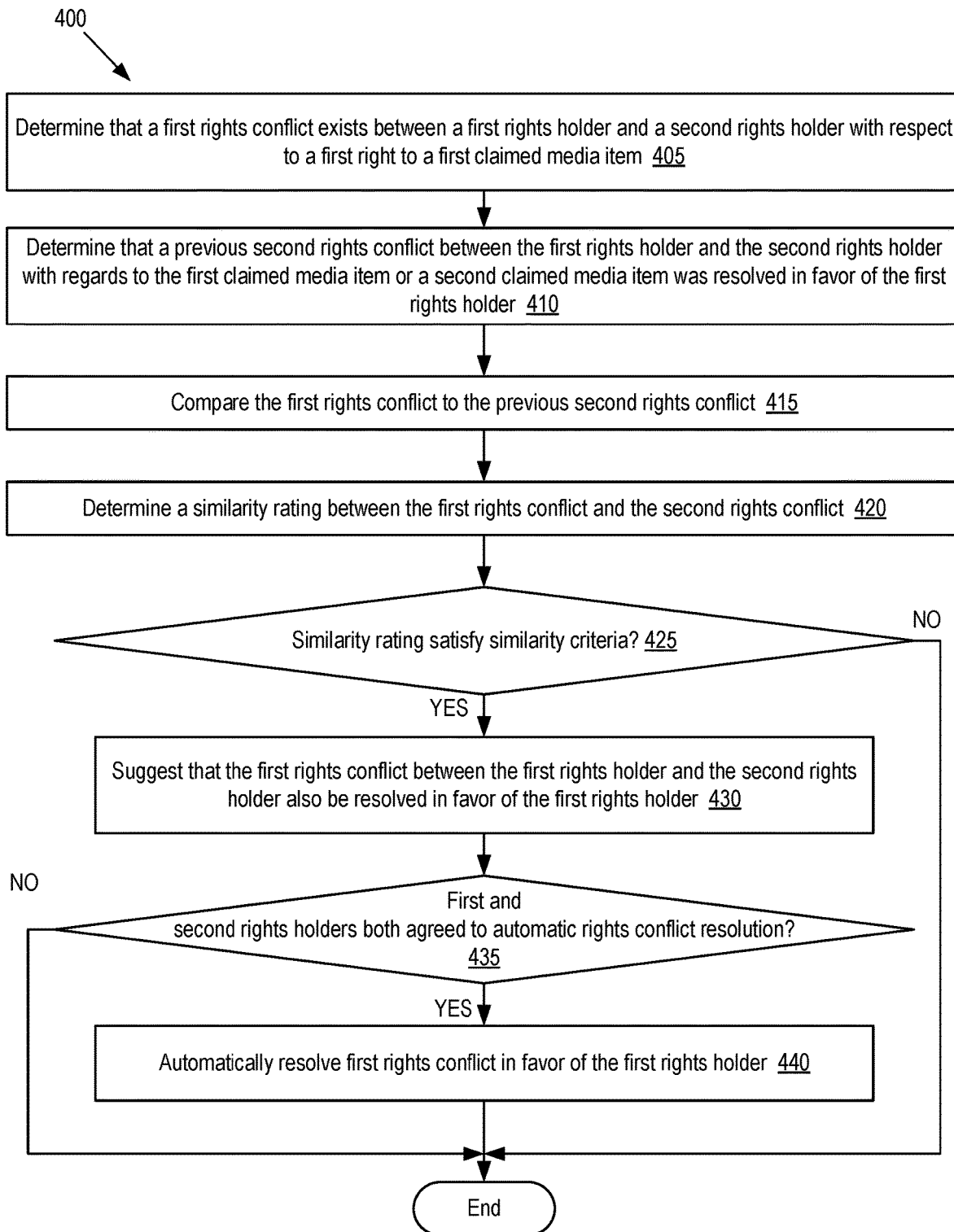
FIG. 4A is a flow diagram illustrating a method for automatically resolving a rights conflict between rights holders to a claimed media item, according to an embodiment.

FIG. 4A is a flow diagram illustrating a method 400 for automatically resolving a rights conflict between rights holders to a claimed media item, according to an embodiment. At block 405 of method 400, processing logic determines that a first rights conflict exists between a first rights holder and a second rights holder with respect to a first right to a first claimed media item. At block 410, processing logic determines that a previous second rights conflict between the first rights holder and the second rights holder with regards to the first claimed media item or a second claimed media item was resolved in favor of the first rights holder (e.g via execution of method 200 and/or method 300).

At block 415, processing logic compares the first rights conflict with the previous rights conflict. The first rights conflict may include a first set of attributes such as an identity of the rights holders claiming the conflicting rights, an identity of the claimed media item to which rights are claimed (e.g., album, song, performer, etc.), an indication of the type of rights in conflict (e.g., publication rights, performance rights, lyrics rights, etc.), an indication of one or more territories for which the rights claims were in conflict, an indication of a time period for which the rights claimed were in conflict and/or an indication of a media sharing platform (or multiple media sharing platforms) for which the rights claims were in conflict. Similarly, the previous second rights conflict may include a second set of attributes. The comparison between the first rights conflict and the second rights conflict may include a comparison of the attributes associated with these two rights conflicts.

At block 420, processing logic may determine a similarity rating between the first rights conflict and the second rights conflict based on the comparison. The similarity rating may be computed based on a degree of overlap or similarity between the attributes of the first rights conflict and the attributes of the second rights conflict. For example, if the first rights conflict and second rights conflict were both to the same claimed media item, between the same parties, for the same set of media sharing platforms and for the same time period, but for different territories, then the first rights conflict and second rights conflict may have a high similarity rating. However, if the first rights conflict and second rights conflict were both to different claimed media items with no overlapping artist, album or song, then the first rights conflict and second rights conflict may have a low similarity rating.

At block 425, processing logic determines whether the similarity rating satisfies one or more similarity criteria (e.g., meets or exceeds a similarity threshold). If the similarity rating does not satisfy the similarity criteria (e.g., is below the similarity threshold), then the method ends, and no automatic rights conflict resolution is performed. If the similarity rating does satisfy the similarity criteria (e.g., meets or exceeds the similarity threshold), then the method continues to block 430.

At block 430, processing logic suggests that the first rights conflict between the first rights holder and the second rights holder also be resolved in favor of the first rights holder in view of the previous resolution of the second rights conflict in favor of the first rights holder and the similarity value between the first rights conflict and the second rights conflict satisfying the similarity criteria. The suggestion may be sent as a message to the first rights holder and the second rights holder.

In some instances, the first rights holder and second rights holder may agree to automatic rights conflict resolution. This means that the first rights holder and second rights holder has agreed to permit processing logic to automatically resolve a rights conflict in favor of one of the conflicting rights holders without input from either rights holder. Accordingly, at block 435, processing logic determines whether the first and second rights holders both agreed to automatic rights conflict resolution. If at least one of the first rights holder or the second rights holder did not agree to automatic rights conflict resolution, then the method ends and manual rights conflict resolution is performed. However, if both the first rights holder and second rights holder previously agreed to automatic rights conflict resolution, then the method continues to block 440.

At block 440, processing logic automatically resolves the first rights conflict in favor of the first rights holder. For example, if a rights conflict between the first rights holder and the second rights holder for a publishing right to the first claimed media item in France was resolved in favor of the first rights holder, then there is a high probability that a similar rights conflict between the same first rights holder and second rights holder for the publishing right to the first claimed media item in England should also be resolved in favor of the first right holder. Automatic rights conflict resolution makes rights conflict resolution a quick and easy process. Rights holders with groups of similar rights conflicts can manually resolve a first rights conflict, and processing logic may automatically resolve similar other rights conflicts based on the resolution to the first rights conflict. This reduces a degree of user intervention with regards to rights conflict resolution.

Figure 4B:
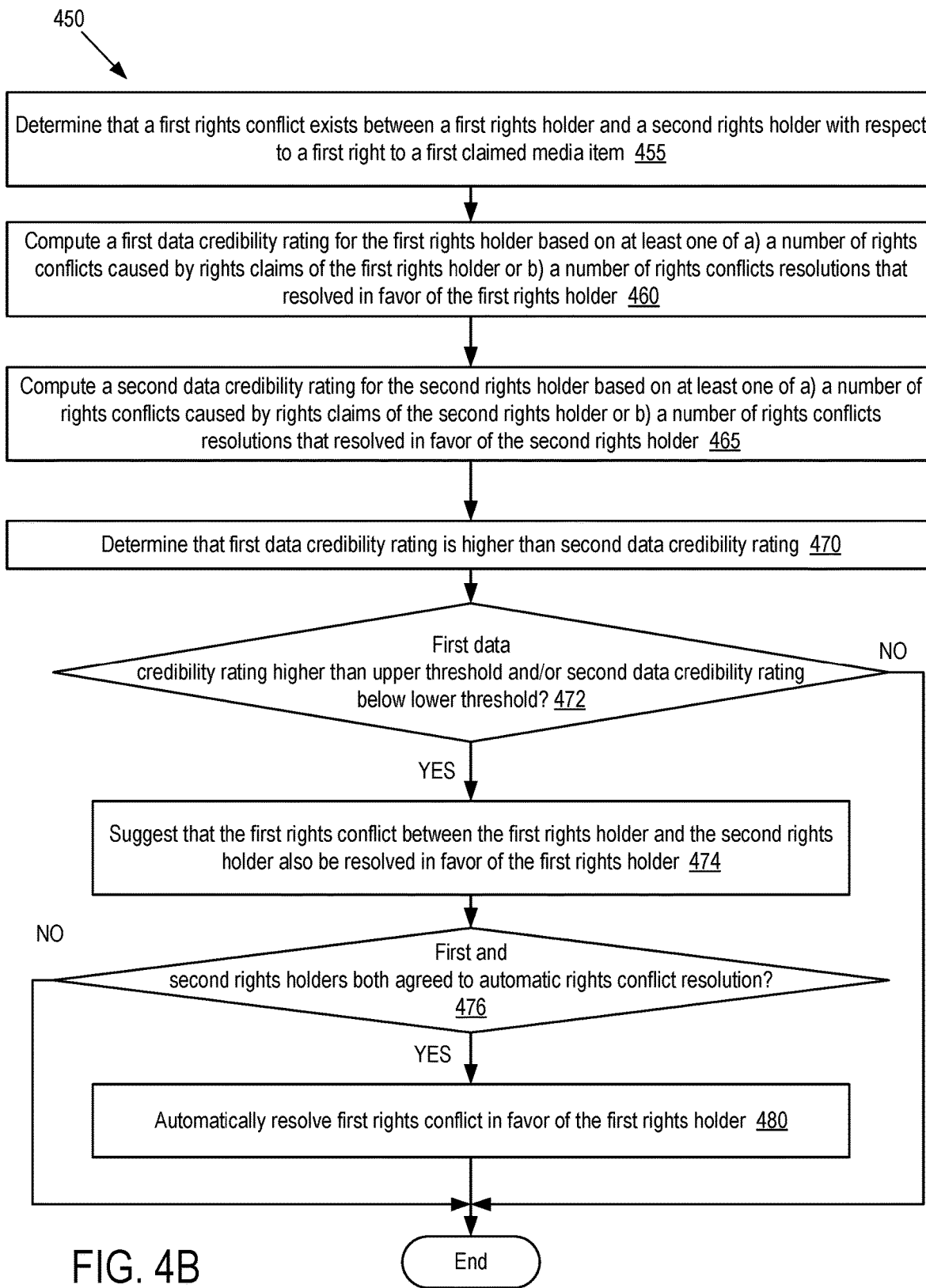
FIG. 4B is another flow diagram illustrating a method for automatically resolving a rights conflict between rights holders to a claimed media item, according to an embodiment.

FIG. 4B is another flow diagram illustrating a method 450 for automatically resolving a rights conflict between rights holders to a claimed media item, according to art embodiment. At block 455 of method 450, processing logic determines that a first rights conflict exists between a first rights holder and a second rights holder with respect to a first right to a first claimed media item. At block 460, processing logic computes a first data credibility rating for the first rights holder based on at least one of a) a number of rights conflicts caused by rights claims of the first rights holder or b) a number of rights conflicts resolutions that resolved in favor of the first rights holder. In one embodiment, the first data credibility rating is a ratio of the number of rights conflicts resolutions that resolved in favor of the first rights holder to the number of rights conflicts caused by rights claims of the first rights holder. For example, if the first rights holder caused 10 rights conflicts and 1 of those rights conflicts was resolved in favor of the first rights holder, then the first data credibility rating may be a value of 10%. In another example, if the first rights holder caused 10 rights conflicts and 9 of those rights conflicts was resolved in favor of the first rights holder, then the first data credibility rating may be a value of 90%.

At block 465, processing logic computes a second data credibility rating for the second rights holder based on at least one of a) a number of rights conflicts caused by rights claims of the second rights holder or b) a number of rights conflicts resolutions that resolved in favor of the second rights holder. In one embodiment, the second data credibility rating is a ratio of the number of rights conflicts resolutions that resolved in favor of the second rights holder to the number of rights conflicts caused by rights claims of the second rights holder.

At block 470, processing logic determines that the first data credibility rating is higher than the second data credibility rating. In one embodiment, processing logic then automatically resolves the rights conflict in favor of the first rights holder in view of the higher data credibility rating of the first rights holder.

In other embodiments, a more complex set of rules are used to determine whether a rights conflict can automatically be resolved based on the data credibility ratings. In one embodiment, at block 472 processing logic may determine whether the first data credibility rating is higher than an upper credibility threshold and/or whether the second data credibility rating is below a lower credibility threshold. The upper credibility threshold may be, for example, a 70% or 60% ratio of favorable rights conflict resolutions to total number of rights conflicts. The lower credibility threshold may be, for example, a 30% or 40% ratio of favorable rights conflict resolutions to total number of rights conflicts. Alternatively, a single credibility threshold (e.g., of 50%) may be used in some embodiments. In one embodiment, if both the first data credibility rating and the second data credibility rating are above the lower threshold or both the first data credibility rating and second data credibility rating are above the upper threshold, for example, then processing logic may determine that data credibility ratings are not sufficient to automatically resolve the rights conflict, and the method may end (e.g., triggering manual rights conflict resolution). If the first data credibility rating is above the upper threshold and the second data credibility rating is under the upper threshold, then the method may continue to block 474. Similarly, if the second data credibility rating is below the lower threshold and the first data credibility rating is above the lower threshold, then the method may continue to block 474 in an embodiment.

At block 474, processing logic suggests that the first rights conflict between the first rights holder and the second rights holder also be resolved in favor of the first rights holder. The suggestion may be sent as a message to the first rights holder and the second rights holder.

In some instances, the first rights holder and second rights holder may agree to automatic rights conflict resolution. Accordingly, at block 478, processing logic determines whether the first and second rights holders both agreed to automatic rights conflict resolution. If at least one of the first rights holder or the second rights holder did not agree to automatic rights conflict resolution, then the method ends and manual rights conflict resolution is performed. However, if both the first rights holder and second rights holder previously agreed to automatic rights conflict resolution, then the method continues to block 480.

At block 480, processing logic automatically resolves the first rights conflict in favor of the first rights holder. The method then ends.

In some embodiments, the operations of method 400 and method 450 are combined to determine whether to automatically resolve a rights conflict. For example, processing logic may determine the similarity between two different rights conflicts and may also determine the data credibility ratings for a first rights holder and a second rights holder. A first rights conflict resolution may be determined in accordance with method 400 and a second rights conflict resolution may be determined in accordance with method 450. A function may then be used to combine the first rights conflict resolution and the second rights conflict resolution. In some embodiments, the function may be a weighted combination of the first rights conflict resolution and the second rights conflict resolution. In one embodiment, a confidence value is determined for each of the rights conflict resolutions. The confidence values may then be used to determine the weights for the weighted combination. In one embodiment, the confidence values are normalized so that the first confidence value plus the second confidence value equals 100%. In one embodiment, the confidence value for the rights conflicts resolution determined from method 400 is based on the similarity between the current rights conflict and the past rights conflict (or multiple past rights conflicts) to which it is compared. In one embodiment, the confidence value for the rights conflicts resolution determined from method 450 is based on the credibility ratings of the first and second rights holders.

FIG. 5 is a flow diagram illustrating a method 500 for determining a set of actions permitted for hosted media items that comprise a claimed media item, according to an embodiment. In some embodiments, the claimed media item is an audio media item, such as a recording of a song. In some embodiments, the claimed media item is a visual media item, such as a still image or a video. At block 505 of method 500, processing logic receives data in a first rights feed from a first rights holder. The received data may include a first claimed media item, a first digital fingerprint of the first claimed media item, a first content management rule that governs actions that can be performed with reference to the claimed media item, first metadata associated with the first media item and/or a first rights claim to the first claimed media item. The first rights claim may include a first set of rights to the first claimed media item (e.g., publishing rights for one or more territories and/or one or more media sharing platforms, performance rights for one or more territories and/or one or more media sharing platforms, and so on). For example, the first set of rights may include publishing rights to one or more territories (e.g., one or more countries), publishing rights for one or more time periods and/or publishing rights on one or more media sharing platforms. For example, a particular right in the set of rights may be a publishing right to the claimed media item in Germany, on Facebook, for the period starting January 2012 and ending January 2020.

In some instances, the received data includes the first claimed media item. Processing logic may then generate a digital fingerprint of the first claimed media item. In some instances, the received data includes a digital fingerprint of the first claimed media item rather than the first claimed media item itself.

At block 508, processing logic receives data in a second rights feed from a second rights holder. The received data may include a second claimed media item, a second digital fingerprint of the second claimed media item, a second content management rule that governs actions that can be performed with reference to the second claimed media item, second metadata associated with the second claimed media item and/or a second rights claim to the second claimed media item. The second rights claim may include a second set of rights to the first claimed media item.

In some instances, the received data includes the second claimed media item. Processing logic may then generate a digital fingerprint of the second claimed media item. In some instances, the received data includes a digital fingerprint of the second claimed media item rather than the first claimed media item itself.

At block 510, processing logic determines that the first claimed media item and the second claimed media item are copies of the same claimed media item. This determination may be made by comparing the first digital fingerprint to the second digital fingerprint and determining that the first digital fingerprint matches the second digital fingerprint. A match between the two digital fingerprints may be determined by determining a similarity value representing a similarity between the first digital fingerprint and the second digital fingerprint, and then determining that the similarity value exceeds a similarity threshold. Any entry for the first claimed media item may have been generated at block 305 responsive to receiving the data for the first claimed media item. The second digital fingerprint may then be compared to the digital fingerprints in each of the entries for claimed media items to identify any matches.

In one embodiment, processing logic first compares the first metadata associated with the first claimed media item to the second metadata associated with the second claimed media item. If a match is found between the first and second metadata, then the first digital fingerprint of the first claimed media item may be compared to the second digital fingerprint of the second claimed media item. Matching metadata may be determined by determining a similarity between the first metadata and the second metadata, and determining that the similarity exceeds a metadata similarity threshold. For example, processing logic may determine that the first metadata identifies "Single Ladies by Beyoncé", and that the second metadata identifies, "Artist: Beyoncé; Song: Single Ladies." These metadata may be sufficiently similar for a metadata match.

At block 515, processing logic determines whether all rights to the claimed media item are accounted for. For example, the rights to the claimed media item may include publishing rights, composition rights, sound recording rights and performance rights. Processing logic may determine whether each of the publishing rights, composition rights, sound recording rights and performance rights have each been claimed for one or more territories and/or for one or more media sharing platforms. If all of the rights to the claimed media item have been claimed for at least one territory and/or for at least one media sharing platform, then the method proceeds to block 520. If not all of the rights to the claimed media item have been claimed for any territory and/or for any media sharing platform, then the method proceeds to block 530.

At block 520, processing logic determines whether the first rights management rule or the second rights management rule (or any other rights management rule of any other rights holder that holds a right to the claimed media item) prohibits hosting of the claimed media item. This determination may be made for each territory and/or each media sharing platform for which 100% of rights to the claimed media item have been claimed. If any of the content management rules associated with the claimed media item prohibits hosting of the claimed media item for each territory and/or for each media sharing platform for which 100% of rights to the claimed media item have been claimed, then the method proceeds to block 530. If all of the content management rules associated with the claimed media item (of rights holders that hold a right to the claimed media item) permit hosting of the claimed media item for at least one territory and/or for at least one media sharing platform, then the method continues to block 525.

At block 525, processing logic determines a set of actions permitted by the first rights management rule and the second rights management rule (and the rights management rules of all other rights holders for the claimed media item). The set of actions may include a specific permitted action for each territory and/or for each media sharing platform. Different actions may be permitted for different territories and/or for different media sharing platforms. Additionally, for any territories and/or media sharing platforms for which 100% of rights ownership has not been determined, the default action may be to prohibit hosting of hosted media items that incorporate the claimed media item.

The permitted action for a territory may be determined by combining the permitted actions for that territory in each content management rule of a rights holder that claimed a right to the claimed media item in that territory. The most restrictive content management rule may govern what is permitted for the claimed media item in that territory. For example, if 3 rights holders specified that the claimed media item may be hosted and 1 rights holder specified that the claimed media item may not be hosted, then the action for that territory could be to not permit viewing of hosted media items incorporating the claimed media item by viewers in the territory. If all of the content management rules for the claimed media item in the particular territory are in agreement, then the agreed upon action for that territory may be included in the set of actions. This determination may be made for each territory and/or for each media sharing platform.

At block 530, processing logic determines that hosted media items comprising the claimed media item (or a portion of the claimed media item) are not to be viewed on media sharing platforms. This may include instructing media sharing platforms to remove hosted media items comprising the claimed media item (or a portion of the claimed media item) from the media sharing platforms. Alternatively, media sharing platforms may simply not permit viewing of the hosted media items until such a time as all rights have been claimed to the claimed media item. Alternatively, media sharing platforms may mute hosted media items that comprise the claimed media item (if the claimed media item is an audio media item) or media sharing platforms may replace the claimed media item in such hosted media items with other media items (e.g., replace a song in a hosted media item with another song).

In some embodiments, different default actions are determined at block 530 when not all rights claims are determined. For example, in some instances a default action may be to permit hosting of hosted media items incorporating a claimed media item if not all rights to the claimed media item are determined. In some instances, different default actions may be determined for different territories and/or for different media sharing platforms. For example, a default action of permitting hosting may be determined in European countries and a default action of prohibiting hosting may be determined for the United States.

FIG. 6 is a flow diagram illustrating a method 600 for determining matches between claimed media items, according to an embodiment. At block 606 of method 600, processing logic receives a message comprising a) a claimed media item or a first digital fingerprint of the claimed media item and b) first metadata of the claimed media item. The message may be a message from a rights holder data feed. The message may also include other information, such as an identifier of the rights holder, a content management rule associated with the claimed media item, a rights claim to the claimed media item, and so on.

At block 610, processing logic may compare the first metadata of the first claimed media item to metadata of other claimed media items in a media rights data store. In embodiments, the first metadata may be compared to the other metadata until it has been compared to the other metadata of all claimed media items in the media rights data store or until a match is found.

At block 612, processing logic determines whether the first metadata has a threshold similarity with the metadata of an additional claimed media item. If a threshold similarity value is determined, the method may continue to block 616. If the determined similarity is below a similarity threshold, then the method may proceed to block 620.

At block 616, processing logic may determine a possible match between the first claimed media item and the additional claimed media item based on the similarity between the first metadata and the metadata of the additional claimed media item. If multiple additional claimed media items had similar metadata to the first claimed media item, then possible matches may be determined to each of these additional claimed media items.

At block 620, processing logic may generate a first digital fingerprint of the claimed media item. This process may be omitted if the first digital fingerprint was received in the message.

At block 626, processing logic may compare the first digital fingerprint to additional digital fingerprints of the additional claimed media item (or additional claimed media items) for which possible matches were identified.

At block 630, processing logic determines whether the first digital fingerprint has a threshold similarity to an additional digital fingerprint of any of the additional claimed media items for which a possible match was identified. If no match is found between the first digital fingerprint and the additional digital fingerprint of one of the additional claimed media items for which a possible match was identified, then processing logic may further compare the first digital fingerprint to additional digital fingerprints of a remainder of claimed media items in the media rights data store until a match is found (threshold level of similarity determined) or a comparison has been made to the digital fingerprints of all claimed media items. If no match is found to any claimed media item, the method continues to block 636 and a determination is made that the first claimed media item is new. A new entry may then be added to the media rights data store for the first claimed media item. If a match between the first digital fingerprint and an additional digital fingerprint of an additional claimed media item is determined, then the method continue to block 640, and processing logic determines that the first claimed media item and the other claimed media item associated with the additional digital fingerprint are copies of the same claimed media item. Processing logic may then update an entry for the additional claimed media item in the media rights data store in include the rights claim, metadata, content management rule, etc. included in the message received at block 606.

In some embodiments, the operations of blocks 610-616 may be omitted. In such embodiments, the first digital fingerprint may be compared to the digital fingerprints of claimed media items in the media rights data store until a match is found or comparisons have been made to the digital fingerprints of all claimed media items in the media rights data store.

Figure 7:
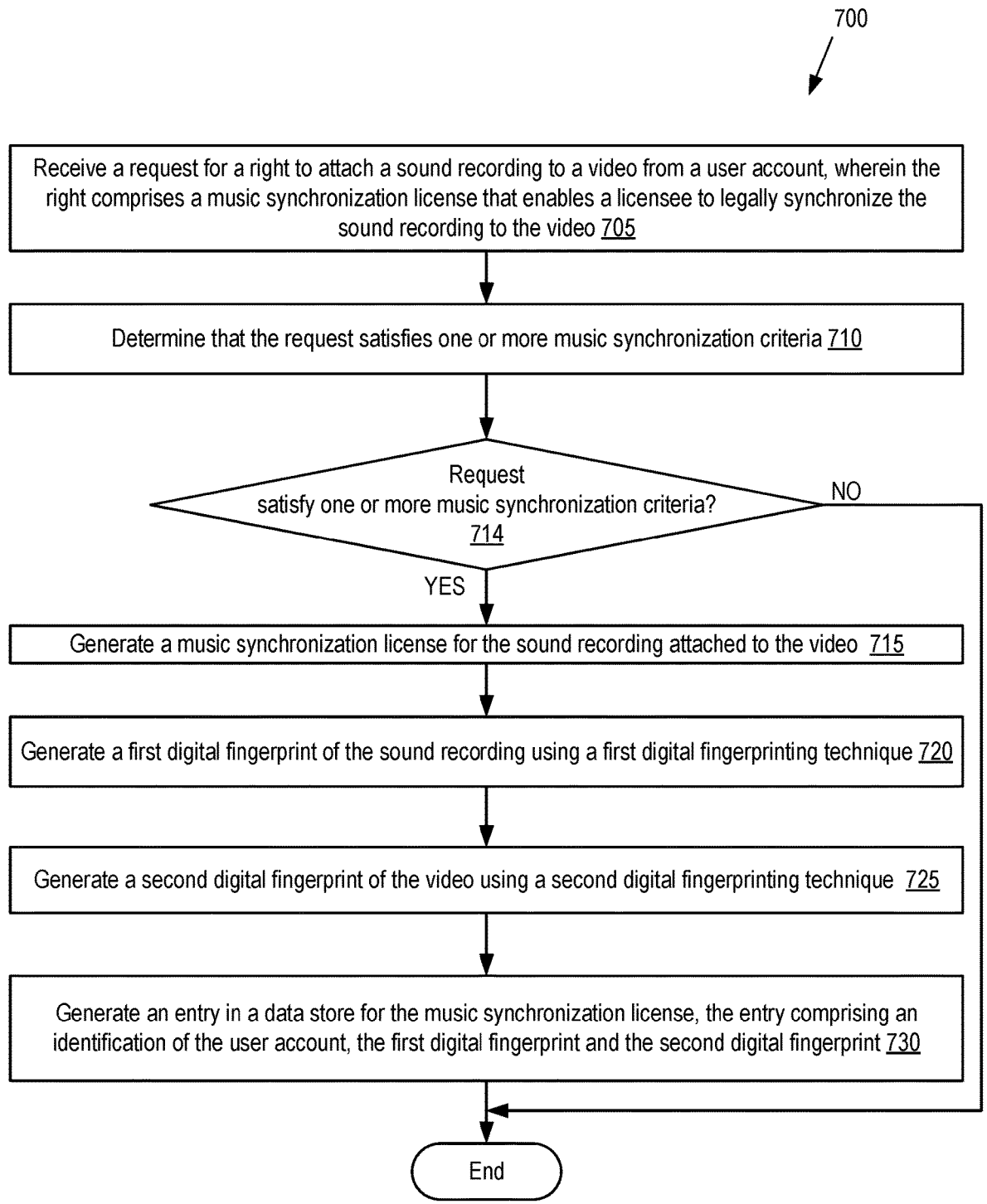
FIG. 7 is a flow diagram illustrating a method for generating a music synchronization license, according to an embodiment.

FIG. 7 is a flow diagram illustrating a method 700 for generating a music synchronization license, according to an embodiment. At block 705 of method 700, processing logic receives a request for a right to attach a sound recording to a video from a user account. The right comprises a music synchronization license that enables a licensee to legally synchronize the sound recording to the video.

At block 710, processing logic determines that the request satisfies one or more music synchronization criteria. Example of music synchronization criteria are.

At block 714, processing logic determines whether the request satisfies the one or more music synchronization criteria. If the criteria are satisfied, the method continues to block 715. Otherwise, the method ends and no music synchronization license is granted.

At block 715, processing logic generate a music synchronization license for the sound recording attached to the video. At block 720, processing logic generates a first digital fingerprint of the sound recording using a first digital fingerprinting technique that applies to audio data. At block 725, processing logic generates a second digital fingerprint of the video using a second digital fingerprinting technique that applies to video data. At block 730, processing logic generates an entry in a data store for the music synchronization license. The entry includes an identification of the user account, the first digital fingerprint and the second digital fingerprint. The user account may be linked to user accounts of the user on one or more media sharing platforms. The user may then generate a hosted media item that includes a combination of the video and the sound recording and upload that hosted media item to any media sharing platform. The media sharing platform may permit the user to upload the hosted media item in view of the music synchronization license.

Figure 8A:
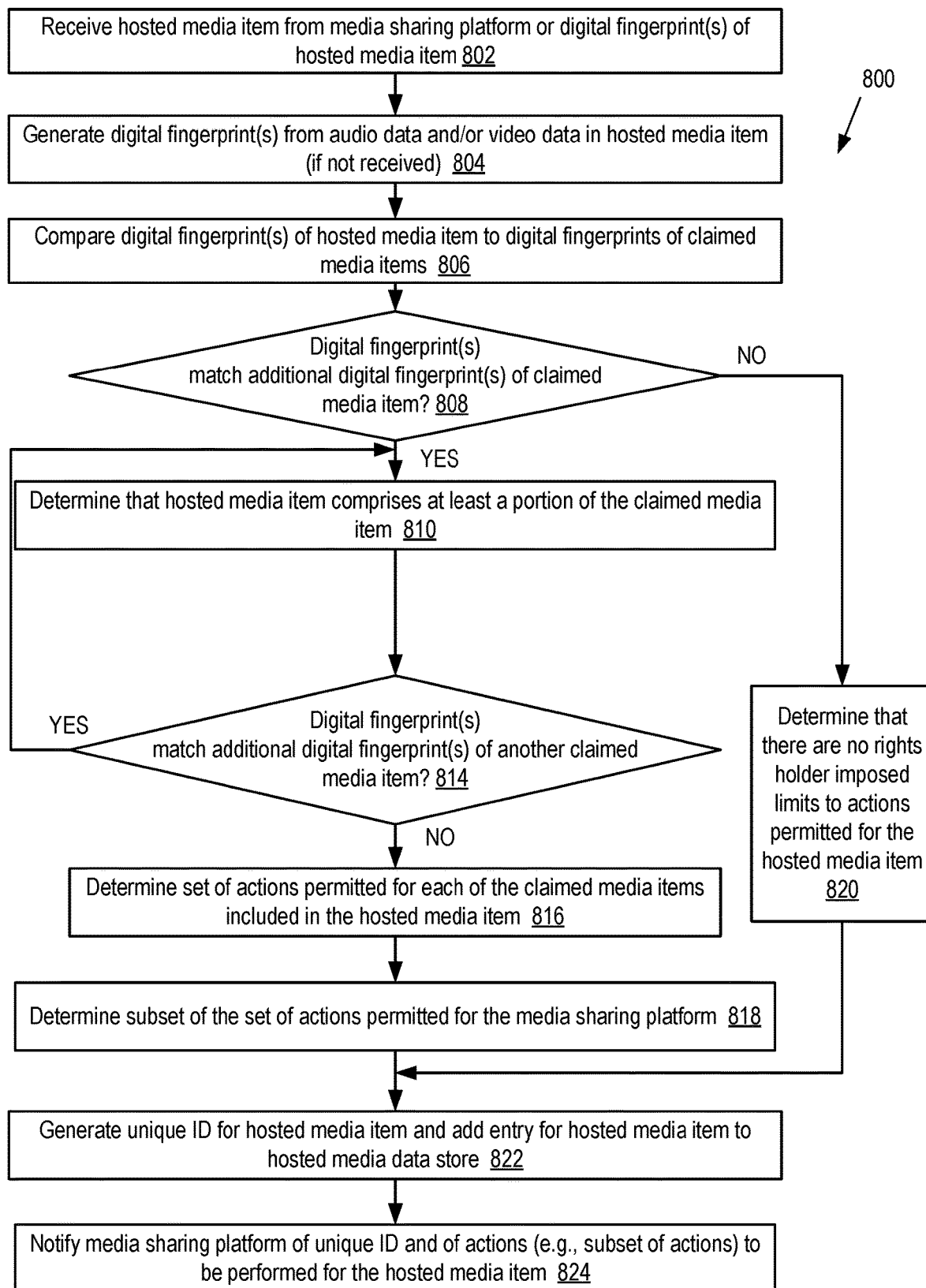
FIG. 8A is a flow diagram illustrating a method for determining sets of actions permitted for hosted media items, according to an embodiment.

FIG. 8A is a flow diagram illustrating a method 800 for determining sets of actions permitted for hosted media items, according to an embodiment. At block 802 of method 800, processing logic receives a hosted media item from a media sharing platform. Alternatively, processing logic may receive one or more digital fingerprints of the hosted media item. For example, processing logic may receive a single digital fingerprint of an audio portion of the hosted media item, a single digital fingerprint of a video portion of the hosted media item, a single digital fingerprint that includes first sets of features associated with the audio portion of the hosted media item and second sets of features associated with the video portion of the hosted media item, or a pair of digital fingerprints including a first digital fingerprint of the audio portion of the hosted media item and a second digital fingerprint of the video portion of the hosted media item. The hosted media item may have been uploaded to the media sharing platform by a user of the media sharing platform and may be associated with a user account of the user. The hosted media item and/or digital fingerprint(s) may be received in a feed of hosted media items from the media sharing platform. The hosted media item and/or digital fingerprint(s) may be received in a message that may also include a unique ID assigned to the hosted media item by the media sharing platform, metadata describing the hosted media item, an upload date and/or time of the hosted media item, and so on.

At block 804, processing logic may generate one or more digital fingerprints of the hosted media item (e.g., a digital fingerprint of the audio portion of the hosted media item, a digital fingerprint of the video portion of the hosted media item and/or a digital fingerprint that includes features of the audio portion and features of the video portion of the hosted media item).

At block 806, processing logic compares the digital fingerprint (or multiple digital fingerprints) of the hosted media item to digital fingerprints of claimed media items. For example, processing logic may compare a digital fingerprint of the audio portion of the hosted media item to digital fingerprints of claimed audio media items until a match is found between the digital fingerprint of the audio portion of the hosted media item and a digital fingerprint of a claimed media item or the digital fingerprint of the audio portion of the hosted media item has been compared to the digital fingerprints of all claimed audio media items. Similarly, in some embodiments processing logic may compare a digital fingerprint of the video portion of the hosted media item to digital fingerprints of claimed video media items until a match is found between the digital fingerprint of the video portion of the hosted media item and a digital fingerprint of a claimed media item or the digital fingerprint of the video portion of the hosted media item has been compared to the digital fingerprints of all claimed video media items. At block 808, processing logic determines whether the digital fingerprint of the hosted media item (or one of the digital fingerprints of the hosted media item) matches an additional digital fingerprint of a claimed media item. If no matches are found, the method proceeds to block 820. If a match is found, the method continues to block 810.

At block 820, processing logic determines that there are no rights holder imposed limits to actions permitted for the hosted media item. The method then continues to block 822.

At block 810, processing logic determines that the hosted media item comprises at least a portion of the claimed media item whose digital fingerprint matched a digital fingerprint of the hosted media item. Processing logic may also determine the portion or portions of the claimed media item that are included in the hosted media item in some embodiments.

At block 814, processing logic determines whether a digital fingerprint of the hosted media item matched a digital fingerprint of another claimed media item. If so, the method returns to block 810, and processing logic determines that the other claimed media item is also incorporated into the hosted media item. If no digital fingerprint of the hosted media item matched a digital fingerprint of another claimed media item, the method continues to block 816.

At block 816, processing logic determines a set of actions permitted for each of the claimed media items included in the hosted media item. Each of the claimed media items may have a previously determined set of actions that are permitted for hosted media items incorporating those claimed media items. The previously determined set of actions for a claimed media item may have been determined based on an aggregate of the content management rules associated with each of the rights holders holding a right to the claimed media item. The sets of permitted actions for each of the claimed media items in the hosted media item may be combined to form an aggregated set of actions that takes into account the sets of actions permitted for each of the claimed media items. For example, processing logic may compare a first set of actions permitted for a first claimed media item in the hosted media item to a second set of actions permitted for a second claimed media item in the hosted media item and to a third set of actions permitted for a third claimed media item in the hosted media item. Processing logic may determine overlapping permitted actions between each of the sets of actions and may determine an aggregated set of actions for the hosted media item based on the overlapping permitted actions. Where there are no overlapping permitted actions for a particular territory and/or media sharing platform, then the default action for the particular territory and/or media sharing platform may be to prohibit viewing of the hosted media item for that territory.

At block 818, processing logic may determine a subset of the set of actions that are permitted for the media sharing platform. Different actions may be permitted for different media sharing platforms. For example, the media sharing platform may have an exclusivity agreement with the rights holders for a claimed media item incorporated into the hosted media item. In that case, the subset of the claimed set of actions permitted for the media sharing platform may include hosting or sharing permissions (e.g., a permission to stream the hosted media item to viewers in one or more territories). In another example, another media sharing platform may include an exclusivity agreement for showing the claimed media item. In that case, the subset of the claimed set of actions permitted for the media sharing platform may be a null set (e.g., there are no permitted actions with respect to the media sharing platform).

At block 822, processing logic may generate a unique identifier (ID) for the hosted media item and add an entry for the hosted media item to a hosted media data store. The entry may include the one or more digital fingerprints of the hosted media item, the unique ID assigned to the hosted media item by processing logic (e.g., by aggregated media rights platform 170), an indicator of one or more claimed media items incorporated into the hosted media item, an indicator of the media sharing platform hosting the hosted media item, metadata describing the hosted media item, the unique ID assigned to the hosted media item by the media sharing platform, the metadata describing the hosted media item, the upload date and/or time of the hosted media item, and so on.

At block 824, processing logic notifies the media sharing platform of actions that are permitted to be performed for the hosted media item (e.g., the subset of the set of actions that are permitted for the hosted media item). Processing logic may additionally notify the media sharing platform of the unique ID assigned to the hosted media item by processing logic.

Figure 8B:
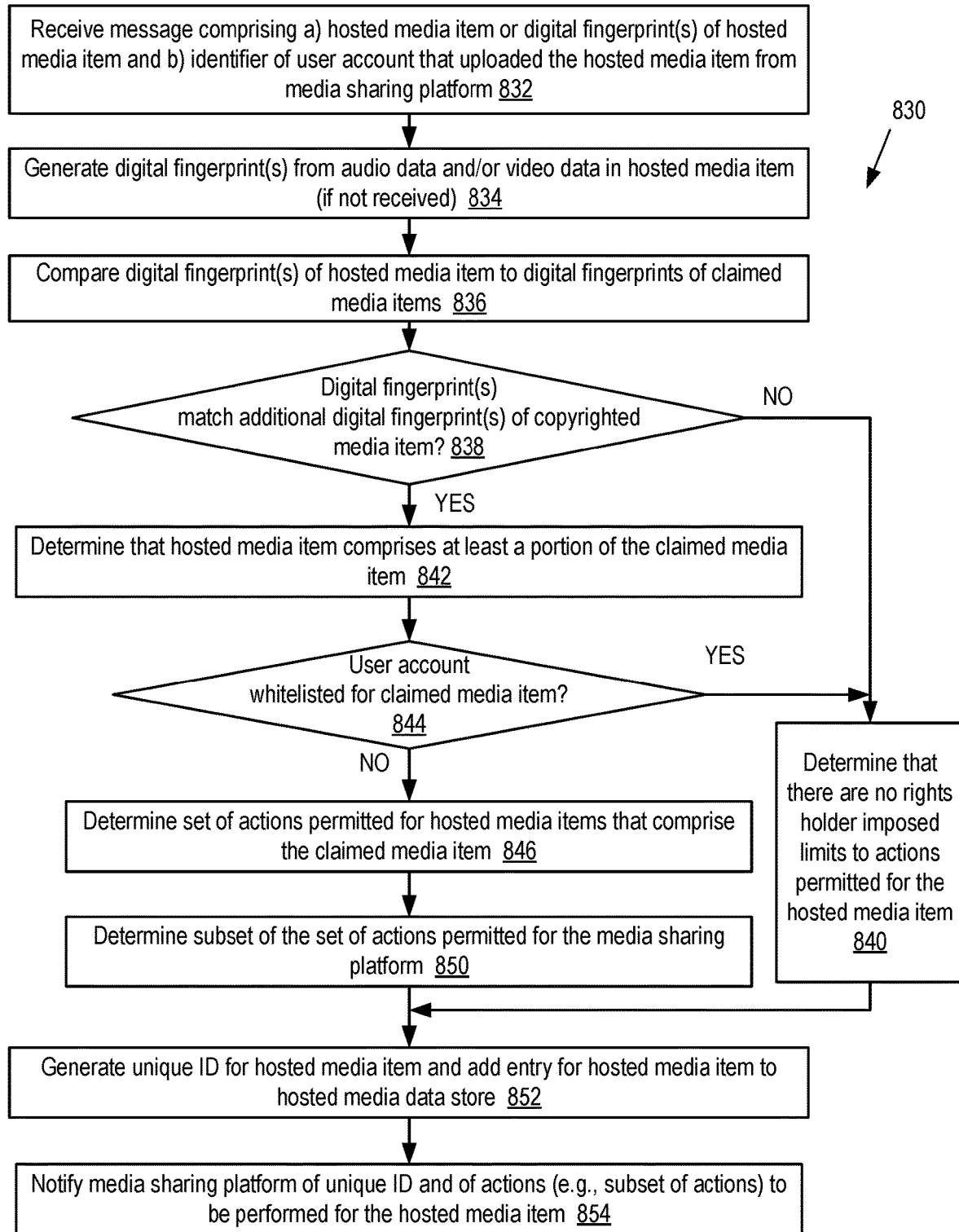
FIG. 8B is a flow diagram illustrating another method for determining sets of actions permitted for hosted media items, according to an embodiment.

FIG. 8B is a flow diagram illustrating another method 830 for determining sets of actions permitted for hosted media items, according to an embodiment. At block 832 of method 830, processing logic receives, from a media sharing platform, a message comprising a) a hosted media item or one or more digital fingerprints of the hosted media item and b) an identifier of a user account that uploaded the hosted media item to the media sharing platform. The message may be received in a feed of hosted media items from the media sharing platform. The message may also include a unique ID assigned to the hosted media item by the media sharing platform, metadata describing the hosted media item, an upload date and/or time of the hosted media item, and so on.

At block 834, processing logic may generate one or more digital fingerprints of the hosted media item (e.g., a digital fingerprint of the audio portion of the hosted media item, a digital fingerprint of the video portion of the hosted media item and/or a digital fingerprint that includes features of the audio portion and features of the video portion of the hosted media item). The operations of block 834 may be omitted if one or more digital fingerprints of the hosted media item were received.

At block 836, processing logic compares the digital fingerprint (or multiple digital fingerprints) of the hosted media item to digital fingerprints of claimed media items. At block 838, processing logic determines whether the digital fingerprint of the hosted media item (or one of the digital fingerprints of the hosted media item) matches an additional digital fingerprint of a claimed media item. If no matches are found, the method proceeds to block 840. If a match is found, the method continues to block 842.

At block 840, processing logic determines that there are no rights holder imposed limits to actions permitted for the hosted media item. The method then continues to block 852.

At block 842, processing logic determines that the hosted media item comprises at least a portion of the claimed media item whose digital fingerprint matched a digital fingerprint of the hosted media item. Processing logic may also determine the portion or portions of the claimed media item that are included in the hosted media item in some embodiments.

At block 844, processing logic determines whether the user account that is associated with the hosted media item (e.g., that was used to upload the hosted media item) is whitelisted for the claimed media item. If so, then all hosted media items uploaded by the user account that incorporate the claimed media item (or that are simply copies of the claimed media item) may have no rights holder imposed limits to actions permitted for those hosted media items. Accordingly, if the user account is whitelisted for the claimed media item, then the method proceeds to block 840. In one embodiment, processing logic determines whether there are other claimed media items incorporated into the hosted media item. If there are, then the method may proceed to block 846 even if the claimed media item is whitelisted in order to comply with content management rules associated with the other claimed media item incorporated into the hosted media item. If the user account is not whitelisted for the claimed media item (and there are no other claimed media items incorporated into the hosted media item that are not whitelisted for the user account), then the method continues to block 846.

At block 846, processing logic determines a set of actions permitted for the claimed media item included in the hosted media item. The set of actions for the claimed media item may be determined based on an aggregate of the content management rules associated with each of the rights holders holding a right to the claimed media item. At block 850, processing logic may determine a subset of the set of actions that are permitted for the media sharing platform. At block 852, processing logic may generate a unique identifier (ID) for the hosted media item and add an entry for the hosted media item to a hosted media data store. The entry may include the one or more digital fingerprints of the hosted media item, the unique ID assigned to the hosted media item by processing logic (e.g., by aggregated media rights platform 170), an indicator of one or more claimed media items incorporated into the hosted media item, an indicator of the media sharing platform hosting the hosted media item, metadata describing the hosted media item, the unique ID assigned to the hosted media item by the media sharing platform, the metadata describing the hosted media item, the upload date and/or time of the hosted media item, and so on.

At block 854, processing logic notifies the media sharing platform of actions that are permitted to be performed for the hosted media item (e.g., the subset of the set of actions that are permitted for the hosted media item). Processing logic may additionally notify the media sharing platform of the unique ID assigned to the hosted media item by processing logic.

Figure 8C:
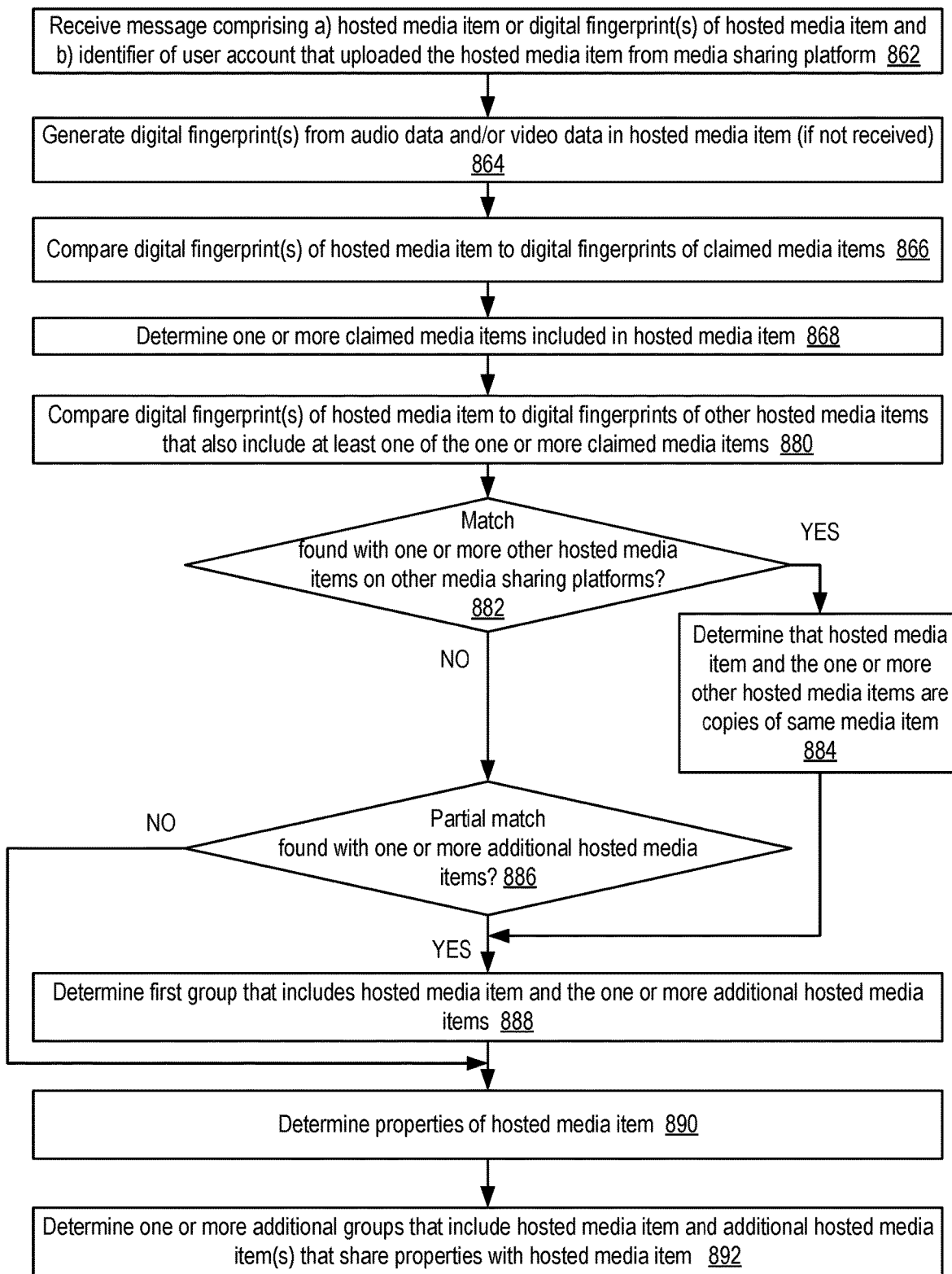
FIG. 8C is a flow diagram illustrating a method for grouping hosted media items, according to an embodiment.

FIG. 8C is a flow diagram illustrating a method 860 for grouping hosted media items, according to an embodiment. Method 860 may be performed after a request is received to perform an action on a hosted media item and/or other similar hosted media items (e.g., other copies of the same hosted media item or other hosted media items grouped with the hosted media item). Method 860 may alternatively be performed for a hosted media item when it is added to a hosted media data store (e.g., when a media sharing platform first provides information on the hosted media item to aggregated media rights platform 170).

At block 862 of method 860, processing logic receives, from a media sharing platform, a message comprising a) a hosted media item or one or more digital fingerprints of the hosted media item and b) an identifier of a user account that uploaded the hosted media item to the media sharing platform. Alternatively, the message may simply include a unique ID assigned to the hosted media item. The message may be received in a feed of hosted media items from the media sharing platform. Alternatively, the message may be received via a rights holder interface or platform interface. In one embodiment, the message includes a either a digital fingerprint that is based on both audio and video portions of the hosted media item or includes a separate digital fingerprint of the audio portion of the hosted media item and digital fingerprint of the video portion of the hosted media item. The message may also include a unique ID assigned to the hosted media item by the media sharing platform, metadata describing the hosted media item, an upload date and/or time of the hosted media item, and so on.

At block 864, processing logic may generate one or more digital fingerprints of the hosted media item (e.g., a digital fingerprint of the audio portion of the hosted media item, a digital fingerprint of the video portion of the hosted media item and/or a digital fingerprint that includes features of the audio portion and features of the video portion of the hosted media item). The operations of block 864 may be omitted if one or more digital fingerprints of the hosted media item were received or if an entry for the hosted media item already exists and includes one or more digital fingerprints of the hosted media item.

At block 866, processing logic compares the digital fingerprint (or multiple digital fingerprints) of the hosted media item to digital fingerprints of claimed media items. At block 868, processing logic determines one or more claimed media items included in the hosted media item (e.g., based on a match between a digital fingerprint of the hosted media item and a digital fingerprint of the claimed media item). Alternatively, claimed media items incorporated into the hosted media item may have already been determined and noted in an entry for the hosted media item.

At block 880, processing logic determines other hosted media items on the media sharing platform and/or on other media sharing platforms that comprise the same one or more claimed media items that are included in the hosted media item. Processing logic may then compare digital fingerprints of the hosted media item to digital fingerprints of the other hosted media items that also include at least one of the one or more claimed media items that are incorporated into the hosted media item. At block 882, processing logic determines whether a match is found between the hosted media item and one or more other hosted media items hosted on other media sharing platforms (or on the same media sharing platform). A match between hosted media items may be found by identifying a) a first match between a first digital fingerprint of the audio portion of the hosted media item and a second digital fingerprint of the audio portion of another hosted media item and b) a second match between a third digital fingerprint of the video portion of the hosted media item and a fourth digital fingerprint of the video portion of the other hosted media item. Alternatively, a match between hosted media items may be found by identifying a match between a first digital fingerprint of the hosted media item that is based on both the audio and video portions of the hosted media item and a second digital fingerprint of the additional hosted media item that is based on both the audio and video portions of the other hosted media item. A match between hosted media items may be identified if the digital fingerprints of those two hosted media items match for at least a first threshold percentage of the two hosted media items. For example, if the audio and video portions of the two hosted media items match for 90% of the two hosted media items, then those two hosted media items may be determined to match. If no matches are found, the method proceeds to block 886. If a match is found, the method continues to block 888.

At block 884, processing logic determines that the hosted media item and the one or more other hosted media items (which may be hosted by other media sharing platforms) are copies of a same media item. The method may then continue to block 888.

At block 886, processing logic may determine whether there is a partial match between the hosted media item and one or more additional hosted media items. A partial match between hosted media items may be identified if the digital fingerprints of those two hosted media items match for at least a second threshold percentage of the two hosted media items, where the second threshold percentage is lower than the first threshold percentage. For example, if the audio and video portions of the two hosted media items match for 50% of the two hosted media items (determined based on comparison of the digital fingerprints of the two hosed media items), then those two hosted media items may be determined to be a partial match. If no partial matches are found, the method proceeds to block 890. If a partial match is found, the method may continue to block 888.

At block 888, processing logic determines a first group that includes the hosted media item and the one or more other hosted media items that are either partial matches with the hosted media item or full matches with the partial media item. Each media item in the group may include an indicator of which other hosted media items in the group are full matches with the media item and which other hosted media items in the group are partial matches with the media item. In one embodiment, a group is generated that contains hosted media items that are full matches with one another. In one embodiment, another group is generated that contains hosted media items that are partial matches with one another.

At block 890, processing logic may determine properties of the hosted media item. Examples of properties include claimed media items incorporated into the hosted media item, a genre or class of the hosted media item, demographics of viewers of the hosted media item, and so on. At block 892, processing logic determines one or more additional groups that include the hosted media item and one or more additional hosted media items that share one or more properties with the hosted media item. For example, a group may include the hosted media item (which may include a first portion of a particular song synced with a first portion of a particular video) and a second hosted media item that may include a second portion of the particular song synced with the first portion of the particular video or a second portion of the particular video. Even through the hosted media item and the second hosted media item don't include any portions that have both matching audio and matching video, these two hosted media items may still be grouped together since they each contain the same video and the same song.

Figure 9A:
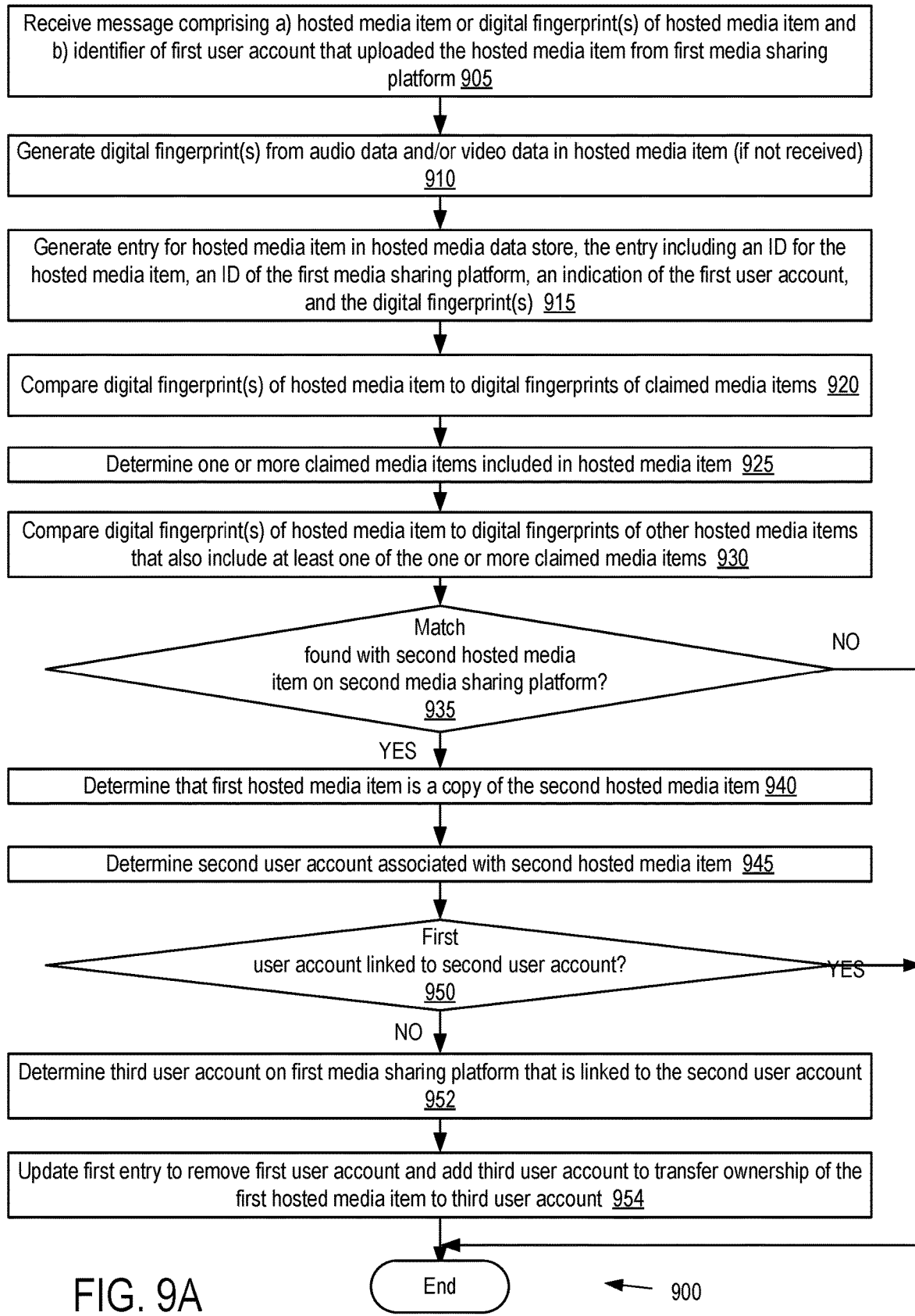
FIG. 9A is a flow diagram illustrating a method for determining rightful ownership of hosted media items, according to an embodiment.

FIG. 9A is a flow diagram illustrating a method 900 for determining rightful ownership of hosted media items, according to an embodiment. Method 900 may be performed after a request is received to perform an action on a hosted media item and/or other similar hosted media items (e.g., other copies of the same hosted media item or other hosted media items grouped with the hosted media item). Method 900 may alternatively be performed for a hosted media item when it is added to a hosted media data store (e.g., when a media sharing platform first provides information on the hosted media item to aggregated media rights platform 170).

At block 905 of method 900, processing logic receives, from a media sharing platform, a message comprising a) a hosted media item or one or more digital fingerprints of the hosted media item and b) an identifier of a user account that uploaded the hosted media item to the media sharing platform. Alternatively, the message may simply include a unique ID assigned to the hosted media item. The message may be received in a feed of hosted media items from the media sharing platform. Alternatively, the message may be received via a rights holder interface or platform interface. The message may also include a unique ID assigned to the hosted media item by the media sharing platform, metadata describing the hosted media item, an upload date and/or time of the hosted media item, and so on.

At block 910, processing logic may generate one or more digital fingerprints of the hosted media item (e.g., a digital fingerprint of the audio portion of the hosted media item, a digital fingerprint of the video portion of the hosted media item and/or a digital fingerprint that includes features of the audio portion and features of the video portion of the hosted media item). The operations of block 834 may be omitted if one or more digital fingerprints of the hosted media item were received or if an entry for the hosted media item already exists and includes one or more digital fingerprints of the hosted media item.

At block 915, processing logic generates an entry for the hosted media item in a hosted media data store. The entry may include in ID for the hosted media item assigned by the processing logic, an ID for the media sharing platform, another ID for the hosted media item that was assigned by the media sharing platform, an indication of the first user account, the one or more digital fingerprints, and so on.

At block 920, processing logic compares the digital fingerprint (or multiple digital fingerprints) of the hosted media item to digital fingerprints of claimed media items. At block 925, processing logic determines one or more claimed media items that are included in the hosted media item based on the comparison of the digital fingerprint(s) of the hosted media item to digital fingerprints of the claimed media items. Alternatively, claimed media items incorporated into the hosted media item may have already been determined and noted in an entry for the hosted media item.

At block 930, processing logic compares the digital fingerprint (or multiple digital fingerprints) of the hosted media item to digital fingerprints of other hosted media items that also include at least one of the one or more claimed media items incorporated into the hosted media item. For example, processing logic may compare a first digital fingerprint of the audio portion of the hosted media item to a second digital fingerprint of the audio portion of a second hosted media item and may further compare a third digital fingerprint of the video portion of the hosted media item to a fourth digital fingerprint of the video portion of the second hosted media item. At block 935, processing logic determines whether the digital fingerprints of the hosted media item matches the additional digital fingerprints of another hosted media item. If no matches are found, the method ends. If a match is found between the first hosted media item and a second hosted media item (e.g., a full match between the two hosted media items), the method continues to block 940.

At block 940, processing logic determines that the first hosted media item is a copy of the second hosted media item. At block 945, processing logic determines a second user account associated with the second hosted media item. The second hosted media item may have its own entry in the hosted media data store, and that entry may include the digital fingerprint(s) of the second hosted media item, an identifier of the media sharing platform hosting the second hosted media item, an indicator of the second user account that uploaded the second hosted media item, a unique ID of the second hosted media item assigned by the media sharing platform hosting it, a unique ID of the second hosted media item generated by the aggregated media rights platform, and so on. Accordingly, the second user account may be determined from the entry for the second hosted media item.

At block 950, processing logic determines whether the first user account is linked to the second user account. Aggregated media rights platform may maintain a data store of linked user accounts between different media sharing platforms. Processing logic may query the data store to determine any user accounts linked to the first user account. If the query returns an answer that includes the second user account, then it may be determined that these two user accounts are linked and are owned by the same entity. If the query returns an answer that does not include the second user account, then it may be determined that these two user accounts are not linked. Alternatively, the query to the data store may be an inquiry as to whether the second user account is linked to the first user account rather than an open ended query. In such an embodiment, the response may be a binary response (e.g., a yes or no answer). If the two user accounts are linked, the method ends. If the two user accounts are not linked, the method continues to block 952.

At block 952, processing logic may determine a third user account on the first media sharing platform that is linked to the second user account. This determination may have been made based on the response returned from the query to the data store at block 950. Alternatively, a separate query may be made to the data store to determine the third user account that is lined to the second user account. At block 954, processing logic may update the entry for the first hosted media item by removing the first user account from the entry and adding the second user account to the entry. This may effectively automatically transfer ownership of the first hosted media item to the third user account. Processing logic may additionally send a notice to the first media sharing platform notifying it that the ownership of the first hosted media item should be transferred from the first user account to the third user account.

Figure 9B:
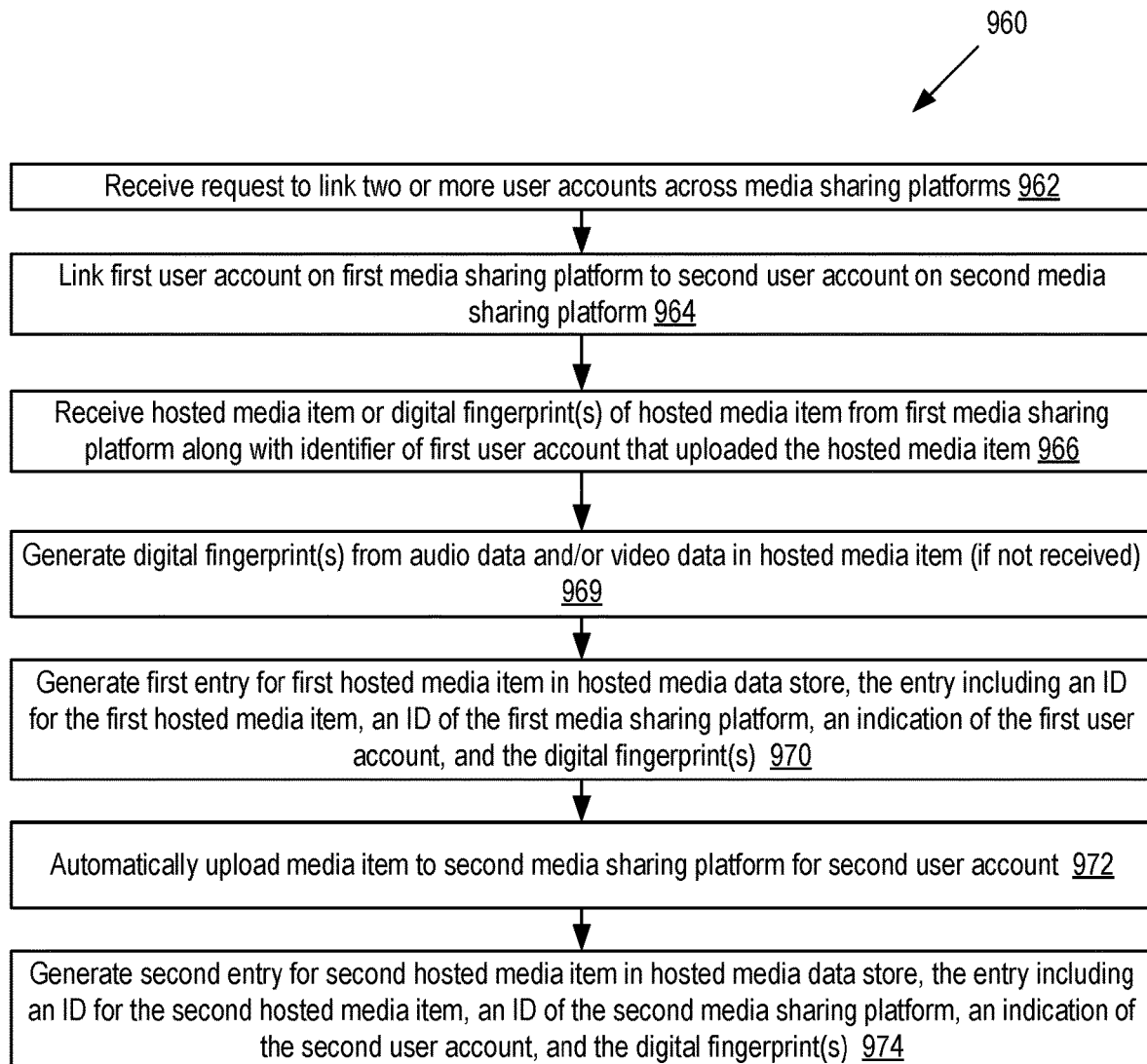
FIG. 9B is a flow diagram illustrating a method for automatically uploading content to media sharing platforms, according to an embodiment.

FIG. 9B is a flow diagram illustrating a method 960 for automatically uploading content to media sharing platforms, according to an embodiment. At block 960 of method 900, processing logic receives a request to link two or more user accounts across media sharing platforms. Each user account may be associated with a different entry in a data store. The request may indicate each of the user accounts to link (e.g., a first user account on a first media sharing platform and a second user account on a second media sharing platform). Additionally, the request may include login, password and/or other credentials for each of the user accounts to link. At block 964, processing logic links the first user account on the first media sharing platform to the second user account on the second media sharing platform (e.g., by adding references between the user accounts in a database).

At block 966, processing logic receives a hosted media item or one or more digital fingerprints of the hosted media item from the first media sharing platform. The hosted media item or digital fingerprint(s) may be received along with other information such as a unique ID assigned to the hosted media item by the first media sharing platform and/or an identifier of a first user account that uploaded the hosted media item to the first media sharing platform.

At block 969, processing logic may generate one or more digital fingerprints from audio data and/or video data in the hosted media item. The operations of block 969 may be omitted if the one or more digital fingerprints were received.

At block 970, processing logic generates a first entry for the first hosted media item in a hosted media data store. The entry may include an ID of the first hosted media item assigned by the media sharing platform, an ID of the first hosted media item assigned by the aggregated media rights platform, an ID of the first media sharing platform, an indication of the first user account, the one or more digital fingerprints, and/or other data.

At block 972, processing logic automatically uploads the media item to the second media sharing platform using the second user account. The second media sharing platform may then return a unique ID assigned to the second hosted media item by the second media sharing platform. At block 974, processing logic generates a second entry for the second hosted media item in the hosted media data store. The second entry may include the ID for the second hosted media item generated by the second media sharing platform, an ID generated for the second hosted media item generated by the aggregated media rights platform, an ID of the second media sharing platform, an indication of the second user account, the one or more digital fingerprints, and/or other data.

Method 960 enables a user to upload a media item to a single media sharing platform to trigger the automatic upload of that media item to multiple other media sharing platforms. This can reduce the time and complexity associated with posting media items to multiple media sharing platforms. Additionally, the hosted media items uploaded to each of the media sharing platforms may all be associated with user accounts that are linked together. A user interface of the aggregated media rights platform may enable an owner of the linked user accounts to view aggregated information about their uploaded content on multiple different media sharing platforms.

Figure 10:
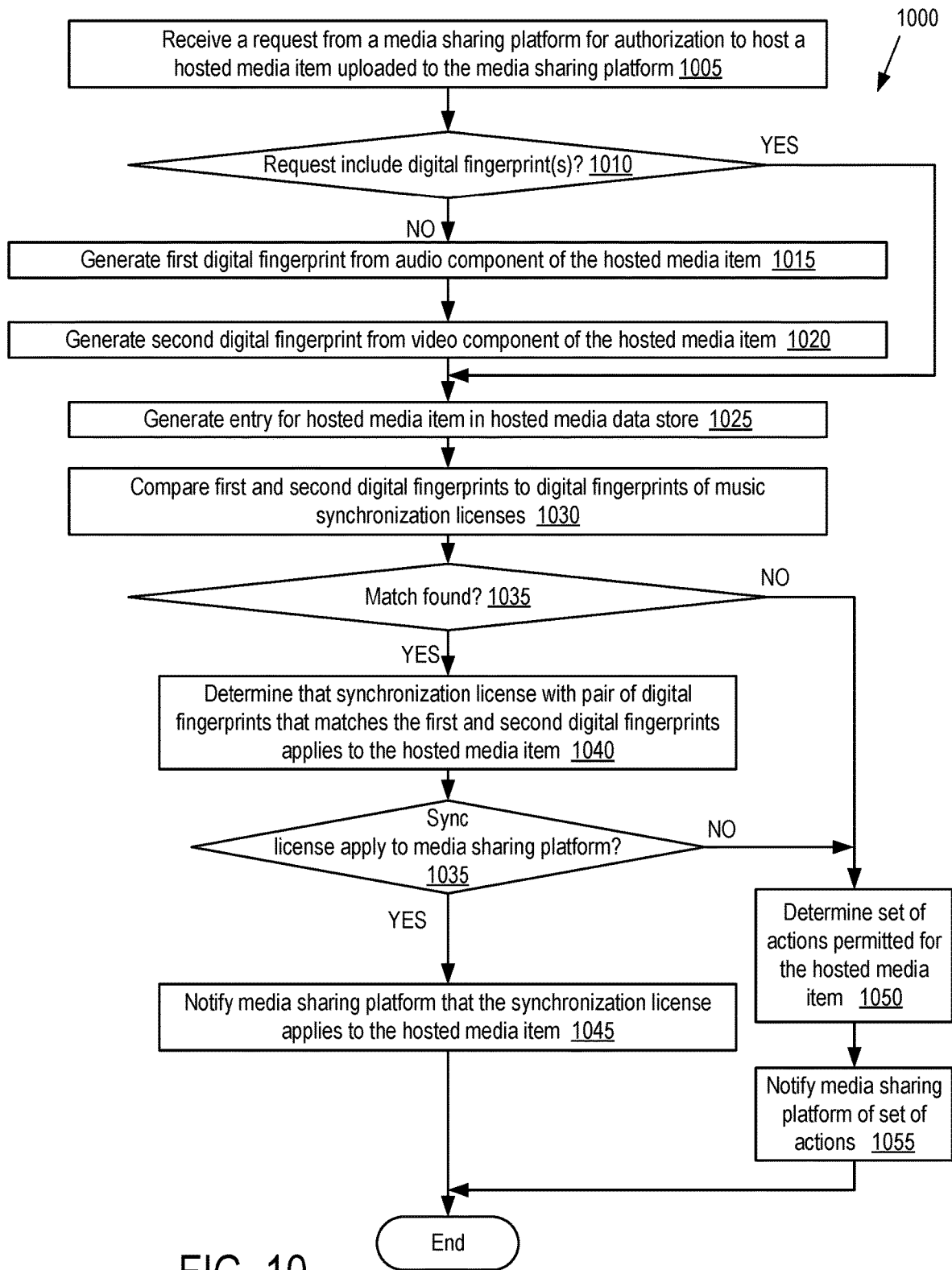
FIG. 10 is a flow diagram illustrating a method for determining sets of actions permissible for hosted media items, according to an embodiment.

FIG. 10 is a flow diagram illustrating a method 1000 for determining sets of actions permissible for hosted media items, according to an embodiment. At block 1005 of method 1000, processing logic receives a request from a media sharing platform for authorization to host a hosted media item uploaded to the media sharing platform. The request may include a copy of the hosted media item and/or one or more digital fingerprints of the hosted media item. The request may additionally include metadata describing the hosted media item, an ID of the media sharing platform, a user account associated with the hosted media item, a unique ID assigned to the hosted media item by the media sharing platform, and/or other information.

At block 1010, processing logic determines whether the request includes one or more digital fingerprints. If the request does not include any digital fingerprints (but included the hosted media item), the method continues to block 1015. If the request included one or more digital fingerprints (and not the hosted media item), then the method proceeds to block 1025.

At block 1015, processing logic may generate a first digital fingerprint from an audio component of the hosted media item using a first digital fingerprinting algorithm. At block 1020, processing logic may generate a second digital fingerprint from a video component of the hosted media item using a second digital fingerprinting algorithm. Alternatively, a single digital fingerprint may be generated of the hosted media item, where the single digital fingerprint includes first features from the audio component and second features from the video component.

At block 1025, processing logic generates an entry for the hosted media item in the hosted media data store. At block 1030, processing logic may compare the first and second digital fingerprints to digital fingerprints of music synchronization licenses. At block 1035, processing logic may determine whether a match is found based on a result of the comparing. If a match is found between the first digital fingerprint and a third digital fingerprint associated with a music synchronization license and between the second digital fingerprints and a fourth digital associated with the music synchronization license, then the method continues to block 1040. An owner of the synchronization license may have generated a sync between audio data and video data, and the third digital fingerprint may be of the audio data and the fourth digital fingerprint may be of the video data. If no match is identified, the method proceeds to block 1050.

At block 1040, processing logic determines that a music synchronization license with a pair of digital fingerprints that matches the first and second digital fingerprints applies to the hosted media item. At block 1035, processing logic determines whether the music synchronization license (sync license) applies to the media sharing platform. The sync license may apply to all media sharing platforms or only to particular media sharing platforms. If the sync license applies to the media sharing platform, the method continues to block 1045. Otherwise the method proceeds to block 1050.

At block 1045, processing logic notifies the media sharing platform that the synchronization license applies to the hosted media item.

At block 1050, processing logic determines a set of actions permitted for the hosted media item as described earlier in this disclosure. At block 1055, processing logic notifies the media sharing platform of the set of actions.

Figure 11A:
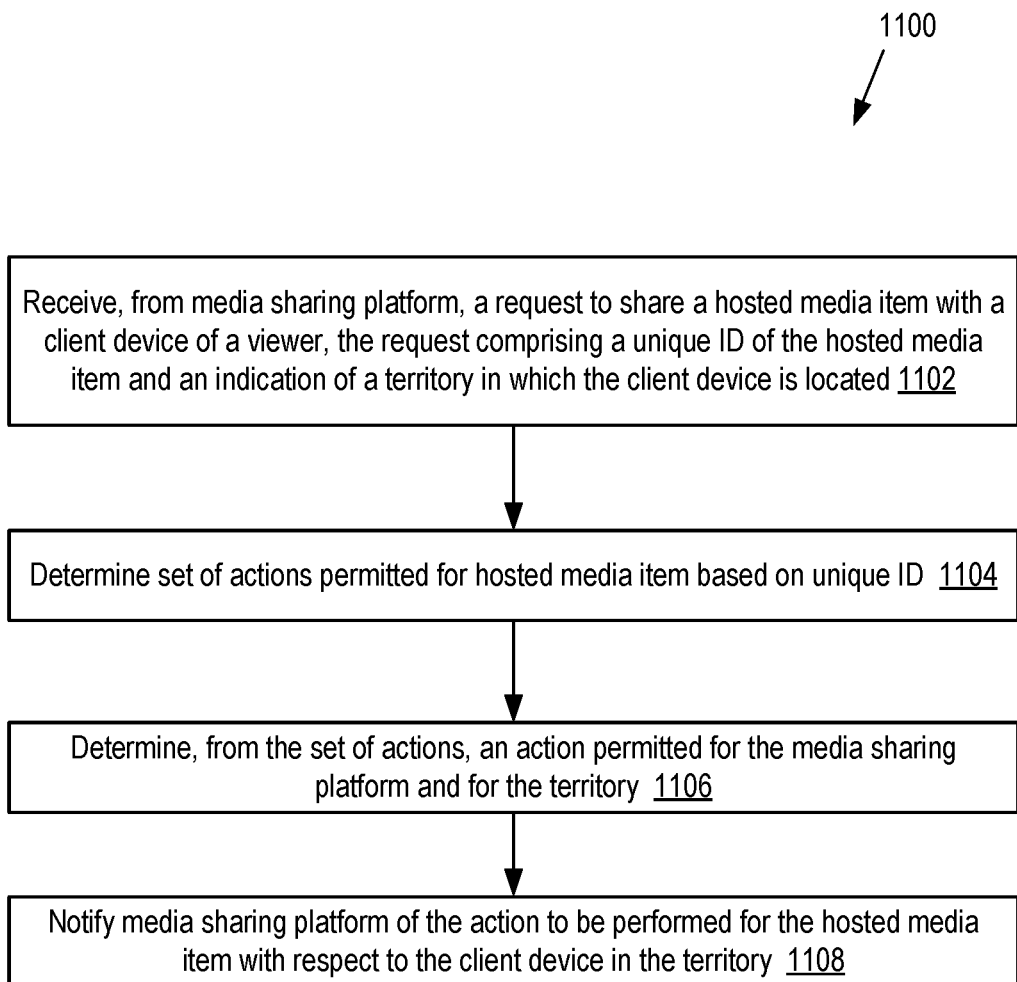
FIG. 11A is a flow diagram illustrating a method for determining an action to be performed for a hosted media item to be viewed by a viewer, according to an embodiment.

FIG. 11A is a flow diagram illustrating a method 1100 for determining an action to be performed for a hosted media item to be viewed by a viewer, according to an embodiment. At block 1102 of method 1100, processing logic receives, from a media sharing platform, a request to share a hosted media item that is hosted by that media sharing platform. The request may be a request to share the hosted media item with a client device of a viewer in a particular territory. The request may include a unique ID of the hosted media item assigned by the media sharing platform, a unique ID of the hosted media item assigned by the aggregated media rights platform, an ID of the media sharing platform, an indication of a territory in which the client device is located, an indication of a user account associated with the hosted media item, and so on.

At block 1104, processing logic determines a set of actions permitted for the hosted media item based on the unique ID. The hosted media item may have previously been analyzed by the aggregated media rights platform shortly after the hosted media item was uploaded to the media sharing platform. Based on this analysis, the aggregated media rights platform may have determined a set of actions permissible for the hosted media item based on the claimed media item or items incorporated into the hosted media item and the content management rules associated with those claimed media items. Processing logic may again perform this analysis at block 1104 by reviewing the content management rules of the claimed media item or items incorporated into the hosted media item. Content management rules may be chanted by rights holders at any time. Accordingly, it can be beneficial to recheck the content management rules and re-determine the set of permitted actions for the hosted media item on a periodic basis (e.g., daily, weekly, each time the hosted media item is to be viewed, or on some other basis).

At block 1106, processing logic determines, from the set of actions, an action permitted for the media sharing platform and the territory. The action may be "do not share/show" or "share/show," or some other action. At block 1108, processing logic notifies the media sharing platform of the action to be performed for the hosted media item with respect to the client device in the territory. Responsive to receiving the notice, the media sharing platform may stream or otherwise provide the hosted media item to the client device (e.g., if the action was share/show). Alternatively, the media sharing platform may not provide the hosted media item to the client device if the action was "do not share/show." Another possible operation that the media sharing platform may perform if the action was "do not share/show" are remove one or more claimed media items from the hosted media item and then show the hosted media item, where the one or more claimed media items were those with content management rules prohibiting the sharing of the hosted media item. Another possible operation that the media sharing platform if the action was "do not share/show" is to overwrite or dub over the claimed media items prohibiting the sharing or muting the hosted media item (assuming that the claimed media items incorporated into the hosted media item are audio media items).

Figure 11B:
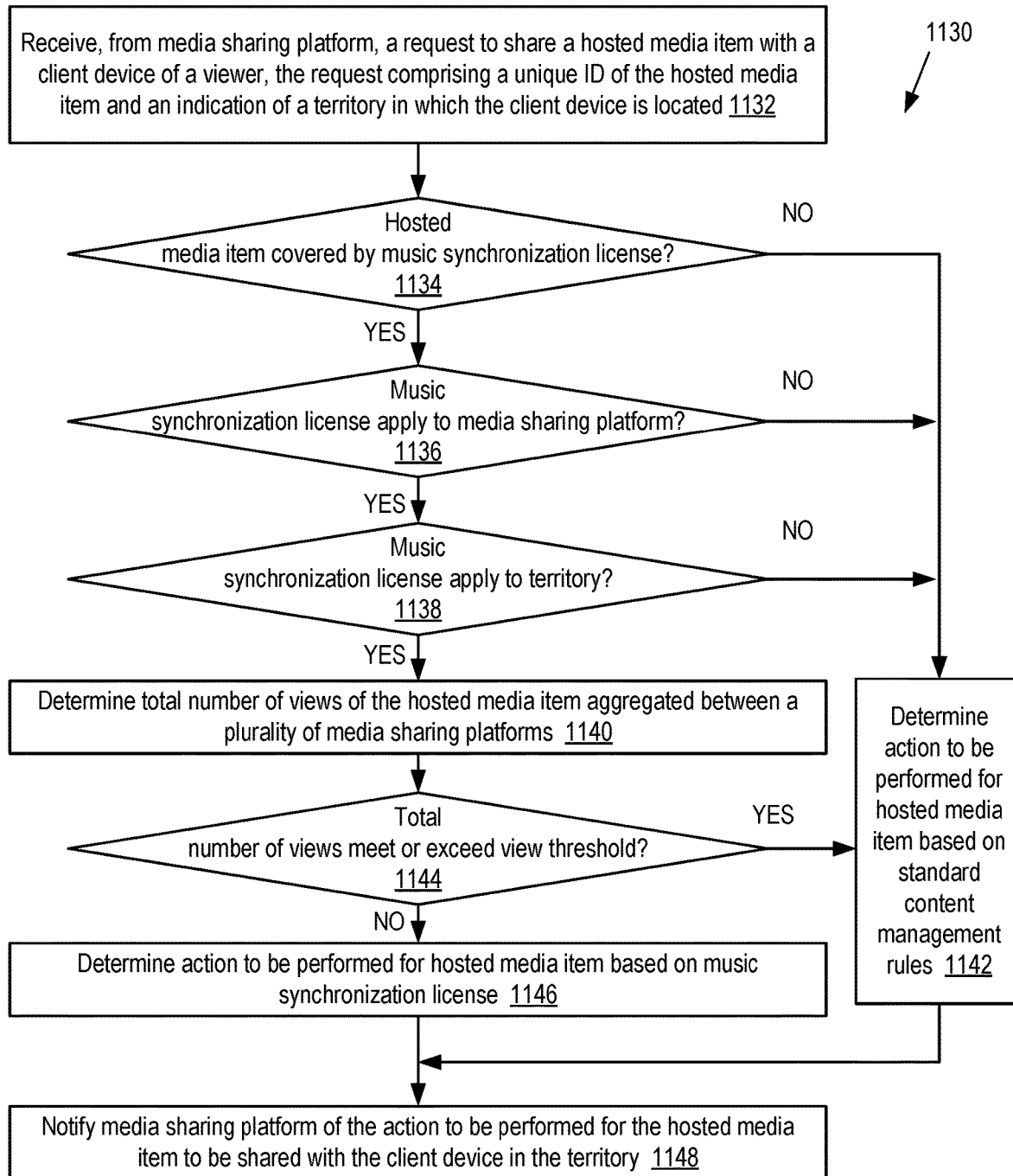
FIG. 11B is a flow diagram illustrating another method for determining an action to be performed for a hosted media item to be viewed by a viewer, according to an embodiment.

FIG. 11B is a flow diagram illustrating another method 1130 for determining an action to be performed for a hosted media item to be viewed by a viewer, according to an embodiment. At block 1132 of method 1130, processing logic receives, from a media sharing platform, a request to share a hosted media item that is hosted by that media sharing platform. The request may be a request to share the hosted media item with a client device of a viewer in a particular territory. The request may include a unique ID of the hosted media item assigned by the media sharing platform, a unique ID of the hosted media item assigned by the aggregated media rights platform, an ID of the media sharing platform, an indication of a territory in which the client device is located, an indication of a user account associated with the hosted media item, and so on.

At block 1134, processing logic determines whether the hosted media item is covered by a music synchronization license. If the hosted media item is not covered by a music synchronization license, the method proceeds to block 1142. If the hosted media item is covered by a music synchronization license, then the method continues to block 1136.

At block 1136, processing logic determines whether the music synchronization license applies to the media sharing platform. If the music synchronization license does not apply to the media sharing platform, the method proceeds to block 1142. If the music synchronization license does apply to the media sharing platform, then the method continues to block 1138.

At block 1138, processing logic determines whether the music synchronization license applies to the particular territory of the viewer. If the music synchronization license does not apply to the particular territory, the method proceeds to block 1142. If the music synchronization license does apply to the particular territory, then the method continues to block 1140.

A music synchronization license may be associated with a permitted total number of views of the hosted media item aggregated between multiple media sharing platforms (view threshold). Accordingly, at block 1140, processing logic may determine the total number of views of the hosted media item aggregated between the multiple media sharing platforms. At block 1144, processing logic determines whether the total number of views meets or exceeds the view threshold. If the total number of views meets or exceeds the view threshold, then the method proceeds to block 1142. If the total number of views is below the view threshold, then the method continues to block 1146.

At block 1142, processing logic determines an action to be performed for the hosted media item based on standard content management rules (e.g., by the content management rules of claimed media items incorporated into the claimed media item).

At block 1146, processing logic determines an action to be performed for the hosted media item based on the music synchronization license. The music synchronization license may permit sharing/viewing of the hosted media item without payment of any royalties to rights holders that hold one or more rights to claimed media items in the hosted media item.

At block 1148, processing logic notifies the media sharing platform of the action to be performed with regards to the hosted media item. The action may be to provide the hosted media item to the client device in the territory or not to provide the hosted media item to the client device, for example.

Figure 12A:
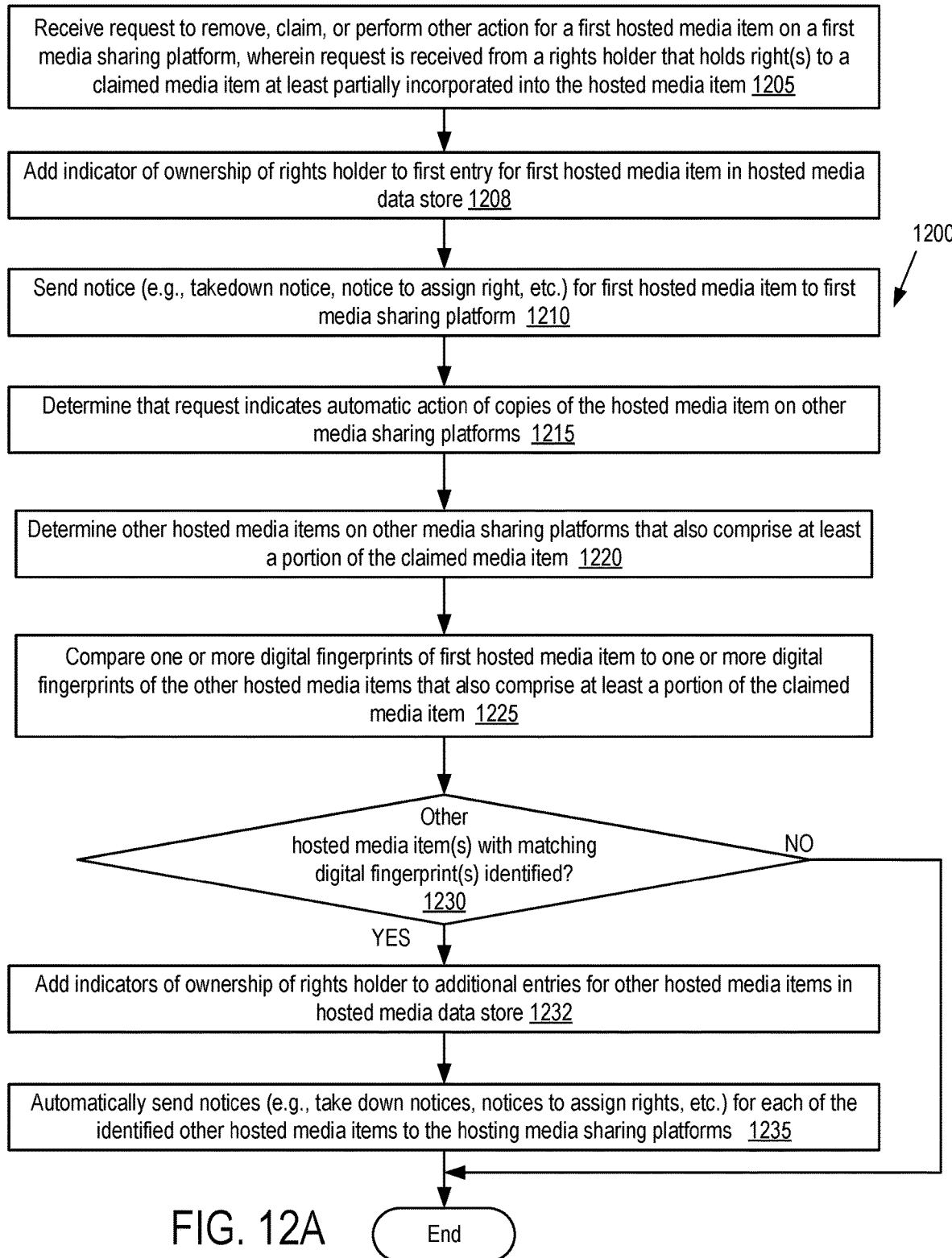
FIG. 12A is a flow diagram illustrating a method for performing actions to hosted media items across multiple media sharing platforms, according to an embodiment.

FIG. 12A is a flow diagram illustrating a method 1200 for performing actions for hosted media items across multiple media sharing platforms, according to an embodiment. At block 1205 of method 1200, processing logic receives a request to remove, claim or perform another action for a first hosted media item on a first media sharing platform. The request may be received from a rights holder that holds one or more rights to a claimed media item at least partially incorporated into the hosted media item. In an example, the rights holder may see the first hosted media item on the media sharing platform, and in response may generate a request to claim a claimed media item incorporated into that hosted media item and/or to take down or remove the hosted media item from the media sharing platform.

At block 1208, processing logic adds an indicator of ownership of the rights holder to a first entry for the first hosted media item in a hosted media data store. Processing logic may additionally generate a content management rule that reflects the requested action. For example, if the requested action was to remove the hosted media item, then a generated content management rule may be to not permit hosting of hosted media items that contain the claimed media item. At block 1210, processing logic may send a notice for the first hosted media item to the first media sharing platform. The notice may be based on the action or actions specified in the request received at block 1205. For example, if the request was a request to remove the hosted media item, then the notice may be a takedown notice. If the request was a request to claim a right to the hosted media item, then the notice may be a notice of rights assignment. Alternatively, no notice may be sent to the media sharing platform if the request was a request to claim ownership of a claimed media item in the hosted media item.

At block 1215, processing logic determines that the request indicates that automatic actions should be taken of any copies of the hosted media item on other media sharing platforms. At block 1220, processing logic may determine other hosted media items on other media sharing platforms that also comprise at least a portion of the claimed media item. Such a determination may be made, for example, by running a query on a hosted media data store, where the query is a search for entries with an indicator that they contain the claimed media item. Such an indicator may be a field in one or more entries for hosted media items in the data store that indicate the claimed media item (e.g., that include a value corresponding to a unique ID of the claimed media item).

At block 1225, processing logic may compare one or more digital fingerprints of the first hosted media item to one or more digital fingerprints of other hosted media items that also include at least a portion of the claimed media item. Alternatively, the operations of block 1220 may be omitted, and at block 1225 the processing logic may compare the one or more digital fingerprints of the first hosted media item to one or more digital fingerprints of each other hosted media item in the hosted media data store.

At block 1230, processing logic determines whether other hosted media items with a matching digital fingerprint (if only one digital fingerprint is used) or two matching digital fingerprints (if two digital fingerprints are used, where one is based on audio features of the hosted media item and the other is based on video features of the hosted media item) are identified. If such hosted media items are identified, the method continues to block 1232. Otherwise the method ends.

At block 1232, processing logic may add indicators of ownership of the rights holder to additional entries for the other hosted media items in the hosted media data store. At block 1235, processing logic may automatically send notices for each of the identified other hosted media items to the media sharing platforms hosting those other hosted media items. The actions may be the same action that was indicated for the specified hosted media item at block 1210.

Figure 12B:
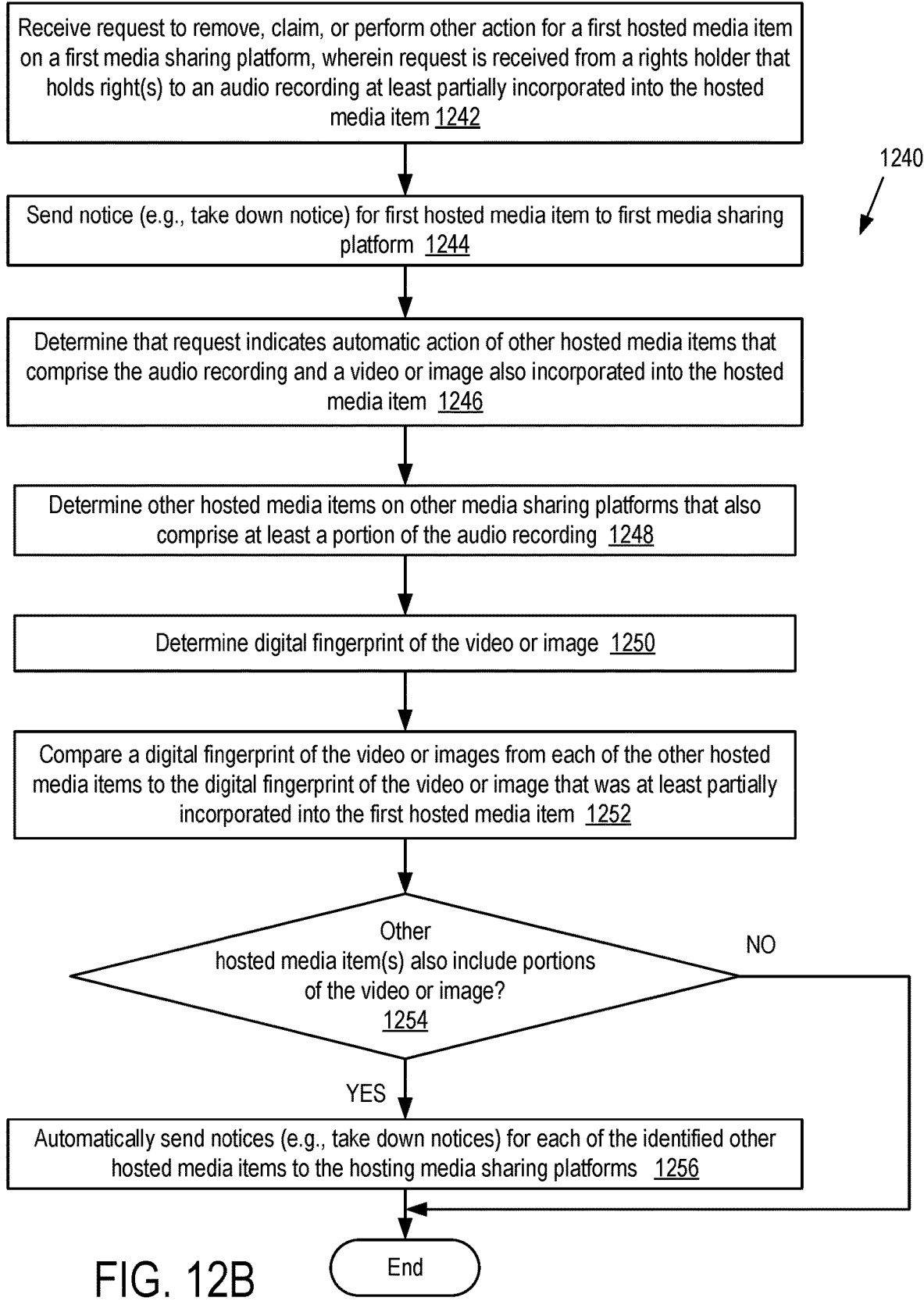
FIG. 12B is a flow diagram illustrating another method for performing actions to hosted media items across multiple media sharing platforms, according to an embodiment.

FIG. 12B is a flow diagram illustrating another method 1240 for performing actions to hosted media items across multiple media sharing platforms, according to an embodiment. At block 1242 of method 1240, processing logic receives a request to remove, claim or perform another action for a first hosted media item on a first media sharing platform. The request may be received from a rights holder that holds one or more rights to a claimed audio recording at least partially incorporated into the hosted media item. In an example, the rights holder may see the first hosted media item on the media sharing platform, and in response may generate a request to claim the audio recording incorporated into that hosted media item and/or to take down or remove the hosted media item from the media sharing platform.

At block 1244, processing logic may send a notice for the first hosted media item to the first media sharing platform. The notice may be based on the action or actions specified in the request received at block 1242. For example, if the request was a request to remove the hosted media item, then the notice may be a takedown notice. If the request was a request to claim a right to the hosted media item, then the notice may be a notice of rights assignment. Alternatively, no notice may be sent to the media sharing platform if the request was a request to claim ownership of a claimed media item in the hosted media item.

At block 1246, processing logic determines that the request indicates that automatic actions should be taken of other hosted media items that comprise the audio recording and a video or image also incorporated into the hosted media item. At block 1248, processing logic may determine other hosted media items on other media sharing platforms that also comprise at least a portion of the claimed media item. At block 1250, processing logic may determine a digital fingerprint of the video or image included in the hosted media item. At block 1252, processing logic compares a digital fingerprint of the video or images of other hosted media items to the digital fingerprint of the video or image that was at least partially incorporated into the first hosted media item.

At block 1254, processing logic determines whether other hosted media items also include portions of the video or image. If none of the other hosted media items includes a portion of the video or image, the method ends. If another hosted media item also includes a portion of the video or image, the method continues to block 1256, and notices may automatically be sent for each of the identified other hosted media items to the media sharing platforms hosting those other hosted media items.

Figure 13A:
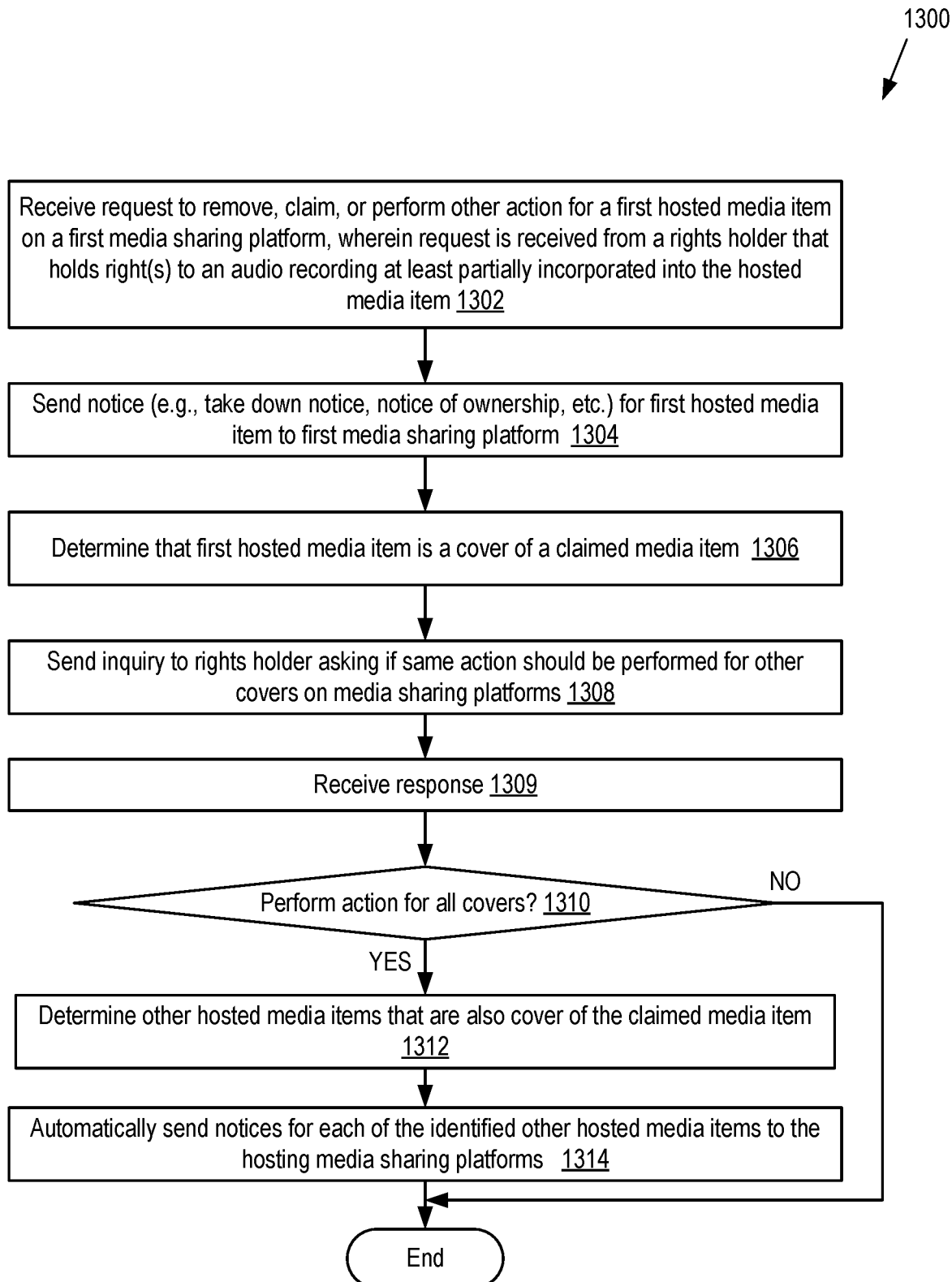
FIG. 13A is a flow diagram illustrating a method for performing actions to covers of claimed media items across multiple media sharing platforms, according to an embodiment.

FIG. 13A is a flow diagram illustrating a method 1300 for performing actions to covers of claimed media items across multiple media sharing platforms, according to an embodiment. At block 1302 of method 1300, processing logic receives a request to perform an action with respect to a first hosed media item on a first media sharing platform. The request may be a request to remove the hosted media item from the media sharing platform, to claim a right to the hosted media item (e.g., to a claimed media item incorporated into the hosted media item), to monetize the hosted media item, and so on. The request may be received from a rights holder that holds one or more rights to an audio recording at least partially incorporated into the hosted media item.

At block 1304, processing logic sends an appropriate notice (e.g., a takedown notice, a notice of ownership, etc.) for the first hosted media item to the first media sharing platform.

At block 1306, processing logic determines that the first hosted media item is a cover of a claimed media item. In an embodiment, processing logic may determine features of one or more segments of the hosted media item that is to be identified. Features may include digital fingerprints, which may be beat-synchronized digital fingerprints. Beat-synchronized digital fingerprints may capture features such as pitch, timbre, and rhythm that have been normalized to be tempo-invariant. The benefit to identifying features and generating beat-synchronized digital fingerprints is that comparisons may be made between cover works and original works even when the tempo, instrumentation, and vocals type vary significantly between the two works. Beat identification may be used to identify one or more segments within an unidentified hosted media item. Normalization may include down-scaling features to an individual beat.

A segment of the unidentified hosted item may be received and may be analyzed with respect to a set of features including loudness, pitch, beat, timbre, rhythm, brightness, spectral bandwidth, energy in one or more spectral bands, spectral steadiness, Mel-frequency cepstral coefficients (MFCCs), and so on. Processing logic may determine values for some or all of these features, and may generate a feature vector for the segment that includes the determined feature values. The feature vector may be a digital fingerprint of one or more segments of the hosted media item.

The set of features (e.g., the feature vector(s) or digital fingerprint(s)) determined by the processing logic may be used to determine whether the set of features of the unidentified hosted media item is similar to a defined set of features for a known claimed media item. For example, the set of features of the unidentified hosted media item may be compared to sets of defined features (digital fingerprints) of multiple known claimed media items. The claimed media items may have been fingerprinted using a same fingerprinting algorithm used to generate the digital fingerprint of the hosted media item. The fingerprinting algorithm may be one that generates beat-synchronized digital fingerprints in an embodiment.

In one implementation, a comparison between a digital fingerprint/feature vector of the unknown hosted media item and a digital fingerprint/feature vector of a known claimed media item may be performed by computing self-similarity matrices for each of the feature types for the unidentified hosted media item and the known claimed media item. Self-similarity matrices may be used to determine similarities of features within a media item. In an embodiment, self-similarity matrices may be generated by calculating Euclidean distances between feature vectors within the media item. Additionally, cross-similarity matrices may be computed for each feature type between the unidentified hosted item and the known claimed media item. Cross-similarity matrices may be used to measure the similarities between the two different media items. In an embodiment, cross-similarity matrices may be generated by calculating Euclidean distances between possible pairs of feature vectors from each media item. In other embodiments, cross-similarity matrices may be calculated differently depending on the feature vectors. Generation of cross-similarity matrices and self-similarity matrices are further described herein.

The cross-similarity matrices and the set of self-similarity matrices may then be fused using Similarity Network Fusion (SNF) techniques. SNF is a computational method for data integration by constructing a sample similarity network for each of the data types and then iteratively integrating the networks using network fusion. The resulting matrices may then be transformed into a binary cross-recurrence plot, which is a plot showing, at a given moment of time, the instances an occurrence of where a feature occurs. In one implementation, the binary cross-recurrence plot may then be scored using a Smith-Waterman algorithm to determine a similarity score between the unidentified media content item and the known media content item. In other implementations, the processing logic may implement other matching algorithms to determine the similarity between the features/digital fingerprints of the hosted media item and the features/digital fingerprints of the known claimed media item.

In one embodiment, for each comparison of the feature vector(s)/digital fingerprint(s) of an unknown hosted media item to the feature vector(s)/digital fingerprint(s) of a known claimed media item, a feature similarity score is computed. The feature similarity score may indicate a level of similarity between the audio features of the unknown hosted media item and the audio features of the known claimed media item.

In an embodiment, the processing logic may identify descriptive text stored in metadata of the unidentified hosted media item. The descriptive text may be normalized and processed using one or more word matching algorithms and/or trigram matching algorithms. Text normalization is a process of transforming text into a canonical form. For instance, different ways of writing the term "two hundred dollars" may include "$200", "200 bucks", and "2 Benjamins." Text normalization may process the inputting text, such as the examples described, and transform each of them into the canonical form of "two hundred dollars." Normalized descriptive information associated with an unknown hosted media item may be compared to normalized descriptive information associated with known claimed media items to determine whether the unidentified hosted media item is a cover of a known claimed media item and/or to narrow identification of a hosted media item as a cover to a subset of the known claimed media items. For example, the unidentified hosted media item may be associated with metadata comprising the description of "Rolling Stones." This metadata may be used to determine a subset of known media content items that match the artist Rolling Stones. Processing resources may be conserved when identifying an unidentified media content item if the pool of known claimed media items to compare against is narrowed to a subset of known claimed media items.

In an embodiment, processing logic may identify descriptive text from metadata of the hosted media item. The Processing logic may compare the metadata associated with the hosted media item to additional metadata associated with a known claimed media item. Using the previous example of metadata containing "Rolling Stones," the processing logic may compare the unidentified media content item metadata to the index of known claimed media items in order to determine a subset of similar known claimed media items that have associated metadata that is similar to the metadata of the unidentified media content item, "Rolling Stones."

In one embodiment, for each comparison of the metadata of a hosted media item to the metadata of a known claimed media item, a metadata similarity score is computed. The metadata similarity score may indicate a level of similarity between the metadata of the hosted media item and the metadata of the known claimed media item. In an embodiment, processing logic may be invoked to determine whether the unidentified hosted item is a cover of a known claimed media item. The processing logic may use either or both of the similarity determinations (e.g., the feature similarity score and/or the metadata similarity score) and the metadata matching logic.

At block 1308, processing logic sends an inquiry to the rights holder asking if the same action (e.g., rights claim or takedown) that was applied to the first hosted media item should also be applied for other covers of the claimed media item on media sharing platforms. At block 1309, processing logic receives a response. At block 1310, processing logic determines whether the response indicated to perform the same action for all covers. If the response included an instruction not to apply the action to all covers, the method ends. If the response included an instruction to apply the action to all covers, the method proceeds to block 1312.

At block 1312, processing logic determines other hosted media items that are also covers of the claimed media item. The other covers may be determined in the same manner as described above. Each of the covers may be determined on-the-fly or may have been determined beforehand, and entries in a hosted media item data store may mark the associated hosted media items as being covers of the particular claimed media item. Accordingly, processing logic may determine which hosted media items were flagged as being covers of the claimed media item. Each entry further includes a unique hosted media item ID and an indicator of a media sharing platform hosting the associated hosted media item. At block 1314, processing logic automatically sends notices to each of the media sharing platforms hosting the identified hosted media items regarding actions to perform for the hosted media items. The notices may include unique IDs used by the media sharing platforms to identify the hosted media items. The media sharing platforms may then take appropriate action. For example, processing logic may send takedown notices to the media sharing platforms hosting each of the other covers of the claimed media item.

Figure 13B:
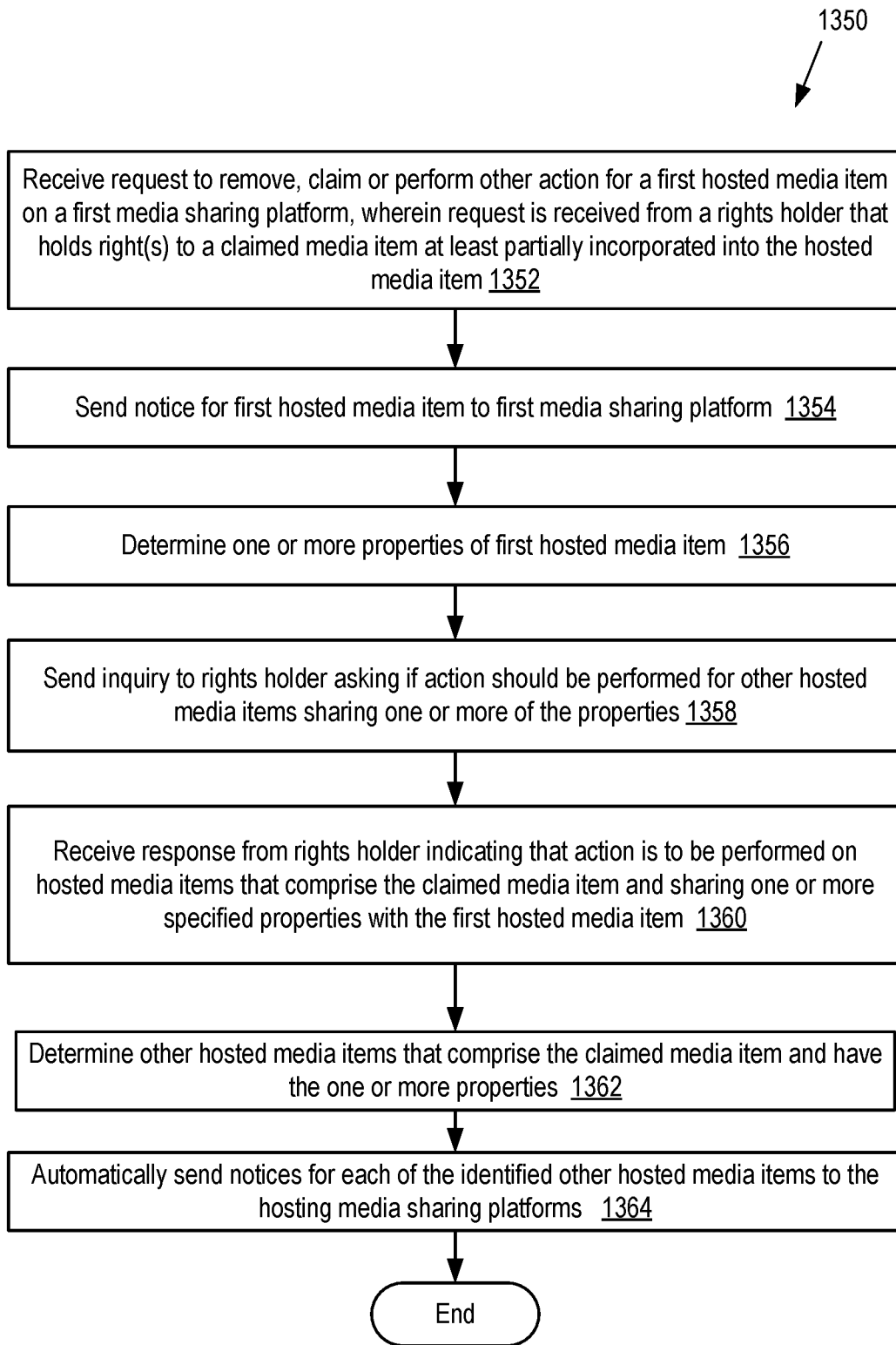
FIG. 13B is a flow diagram illustrating a method for performing actions to media items sharing properties across multiple media sharing platforms, according to an embodiment.

FIG. 13B is a flow diagram illustrating a method 1350 for performing actions to media items sharing properties across multiple media sharing platforms, according to an embodiment. At block 1352 of method 1350, processing logic receives a request to perform an action with respect to a first hosed media item on a first media sharing platform. The request may be a request to remove the hosted media item from the media sharing platform, to claim a right to the hosted media item (e.g., to a claimed media item incorporated into the hosted media item), to monetize the hosted media item, and so on. The request may be received from a rights holder that holds one or more rights to an audio recording at least partially incorporated into the hosted media item.

At block 1354, processing logic may send an appropriate notice (e.g., a takedown notice, a notice of ownership, etc.) for the first hosted media item to the first media sharing platform. Processing logic may additionally update an entry for a claimed media item in the hosted media item according to the request. This may include updating a content management rule of the claimed media item.

At block 1356, processing logic determines one or more properties of the first hosted media item. In one embodiment, processing logic determines whether the hosted media item contains music. In one embodiment, processing logic determines a classification for the hosted media item. In one embodiment, a set of features of the hosted media item is determined. In one embodiment, the set of features that are extracted are the set of features which optimally determine the likelihood that a media item belongs to a classification. For example, the features that are extracted from the media item may include the loudness envelope of the audio component of the media item to determine the loudness at each moment in time. Features representative of the brightness of the audio (e.g., bass and treble component of the audio) may also be extracted. A derivative of the loudness envelope may be taken to identify the change in the loudness at each time. An FFT algorithm identifying other characteristics and an MFCC algorithm may be applied to identify the frequency domain characteristics and the clustered features of the media content item. Features may be extracted at an interval (e.g., 1 second interval, 0.5 second interval, 0.10 second interval). In another example, fifty two features may be extracted at multiple time intervals and used to generate a feature vector. Alternatively, more or fewer features may be extracted and used to generate a feature vector.

Processing logic may analyze the set of features using machine learning profiles for a first and second class of media content items. In one embodiment, a single machine learning profile (also referred to herein as a media classification profile or media alteration profile) may contain models for multiple different classifications of media content items. Alternatively, a separate machine learning profile may be used for each model. In one embodiment, the machine learning profiles comprise a machine learning model and other associated metadata. The extracted features of the media item are supplied to the machine learning model(s) (e.g., as a feature vector) and an output may be generated indicating the likelihood that the media item matches the classification of the machine learning profile. For example, a media classification profile may identify a first percentage chance that a media item comprises audio features representative of music and a second percentage change that the media item comprises audio features representative of a lack of music.

If it is determined that the media content item belongs to the first class of media content items (i.e., containing music), processing logic may process the features of the hosted media item using one or more further machine learning models to determine sub classifications for the hosted media item (e.g., rock, heavy metal, classical, etc.).

Other properties may also be determined for a hosted media item. Such properties may include properties of an uploader of the hosted media item, properties of viewership of the hosted media item, and/or other information.

In one embodiment, the claimed media item is a song, and the hosted media item includes the song and a video. One of the properties of the hosted media item is data about the video. For example, the video may be identified, and may be of a nature that is disagreeable to the rights holder of the claimed media item. In one example, the hosted media item may be a political advertisement that the song has been attached to.

In one embodiment, a machine learning model processes the audio portion of the hosted media item (e.g., a feature vector of the audio portions of the hosted media item) to transcribe the audio portion of the hosted media item. The transcription may then be compared to a data store (e.g., a database) of lyrics of claimed media items to determine if the lyrics in the hosted media item correspond to lyrics in the claimed media item.

At block 1358, processing logic sends an inquiry to the rights holder asking if the same action (e.g., rights claim or takedown) that was applied to the first hosted media item should also be applied for other hosted media items that incorporate the claimed media item and that share similar properties to the first hosted media item. At block 1360, processing logic receives a response indicating that the action is to be performed on hosted media items that comprise the claimed media item and sharing one or more specified properties with the hosted media item. The rights holder may indicate the specific properties that they dislike.

At block 1310, processing logic determines other hosted media items that also incorporate the claimed media item and that also include the one or more specified properties. The other hosted media items may have their properties identified in the same manner as described above for the first hosted media item. Each of the properties of the other hosted media items may have been determined beforehand, and entries in a hosted media item data store may indicate the various properties of the hosted media item. Accordingly, processing logic may determine which hosted media items incorporate the claimed media item and share the one or more specified properties. Each entry further includes a unique hosted media item ID and an indicator of a media sharing platform hosting the associated hosted media item.

At block 1364, processing logic automatically sends notices to each of the media sharing platforms hosting the identified hosted media items regarding actions to perform for the hosted media items. The notices may include unique IDs used by the media sharing platforms to identify the hosted media items. The media sharing platforms may then take appropriate action. For example, processing logic may send takedown notices to the media sharing platforms hosting each of the other covers of the claimed media item.

FIG. 14 is a flow diagram illustrating a method 1400 for reporting tailored information to different OSPs and rights holders, according to an embodiment. At block 1452 of method 1400, processing logic gathers first information on first views of a first plurality of hosted media items hosted by a first media sharing platform. The first information may additionally include information on additional content shown with the first plurality of hosted media items (e.g., advertisements shown with the plurality of hosted media items) and/or resources (e.g., revenues) generated in association with each of the first plurality of hosted media items. The resources (e.g., revenues) may be from advertisements, from subscriptions, from pay per view models, and so on. At block 1454, processing logic gathers second information on second views of a second plurality of hosted media items hosted by a second media sharing platform. The first information may additionally include information on additional content shown with the first plurality of hosted media items (e.g., advertisements shown with the plurality of hosted media items) and/or resources (e.g., revenues) generated in association with each of the first plurality of hosted media items. The resources (e.g., revenues) may be from advertisements, from subscriptions, from pay per view models, and so on. Processing logic may additionally receive first information on additional views of additional pluralities of hosted media items hosted by other media sharing platforms. At block 1456, processing logic aggregates the first and second information (and possibly further information from other media sharing platforms) into aggregated information.

At block 1458, processing logic determines a first subset of the aggregated information from the first and second information (and possibly additional information) for the first rights holder. Each of the hosted media items on each of the media sharing platforms may be associated with entries in a hosted media data store. Each hosted media item may have been analyzed to determine claimed media items incorporated into those hosted media items. Each claimed media item is associated with one or more rights holders. Accordingly, for each rights holder, processing logic may determine which of the hosted media items incorporates a claimed media item to which that rights holder has a rights claim. Processing logic may then determine the number of views of each of those hosted media items as well as resources (e.g., revenues) generated by each of the hosted media items that are allocable to that rights holder based on their rights claim. All of this information may be combined into the first subset of the aggregated information.

At block 1460, processing logic generates a first aggregated report for the first rights holder based on the first subset of the aggregated information. The first aggregated report may identify the views of hosted media items comprising claimed media items belonging to the first rights holder on each of the media sharing platforms, the revenues due to the first rights holder from each of the media sharing platforms, and so on. The aggregated report is advantageous for the rights holder in that it provides a single interface that may show the statistics of claimed media items associated with hosted media items on many different media sharing platforms. The data associated with each media sharing platform may have a same format as the data associated with each of the other media sharing platforms. This may make it much easier for a rights holder to compare the performance of their claimed media items portfolio on each of the media sharing platforms.

At block 1462, processing logic determines a second subset of the aggregated information from the first and second information (and possibly additional information) for the second rights holder. At block 1464, processing logic generates a second aggregated report for the second rights holder based on the second subset of the aggregated information. The second aggregated report may identify the views of hosted media items comprising claimed media items belonging to the second rights holder on each of the media sharing platforms, the revenues due to the second rights holder from each of the media sharing platforms, and so on.

At block 1470, processing logic generates a third report for the first media sharing platform based on the first information. The third report may show a breakdown of the revenues due to each of the rights holders that hold rights to claimed media items incorporated into the hosted media items that are hosted by the first media sharing platform.

At block 1475, processing logic generates a fourth report for the second media sharing platform based on the second information. The fourth report may show a breakdown of the revenues due to each of the rights holders that hold rights to claimed media items incorporated into the hosted media items that are hosted by the second media sharing platform.

At block 1480, processing logic may determine a third subset of the aggregated information for an owner of a music synchronization license. An owner of a music synchronization license may collect the royalties of revenues generated by views of the hosted media items to which the music synchronization license applies rather than the rights holders of the various rights to the claimed media item incorporated into the hosted media item because the owner of the music synchronization license purchased all of the rights for the combination of the claimed media item with another media item (which together constitute the hosted media item). At block 1485, processing logic may generate a fifth report for the owner of the music synchronization license.

Figure 15:
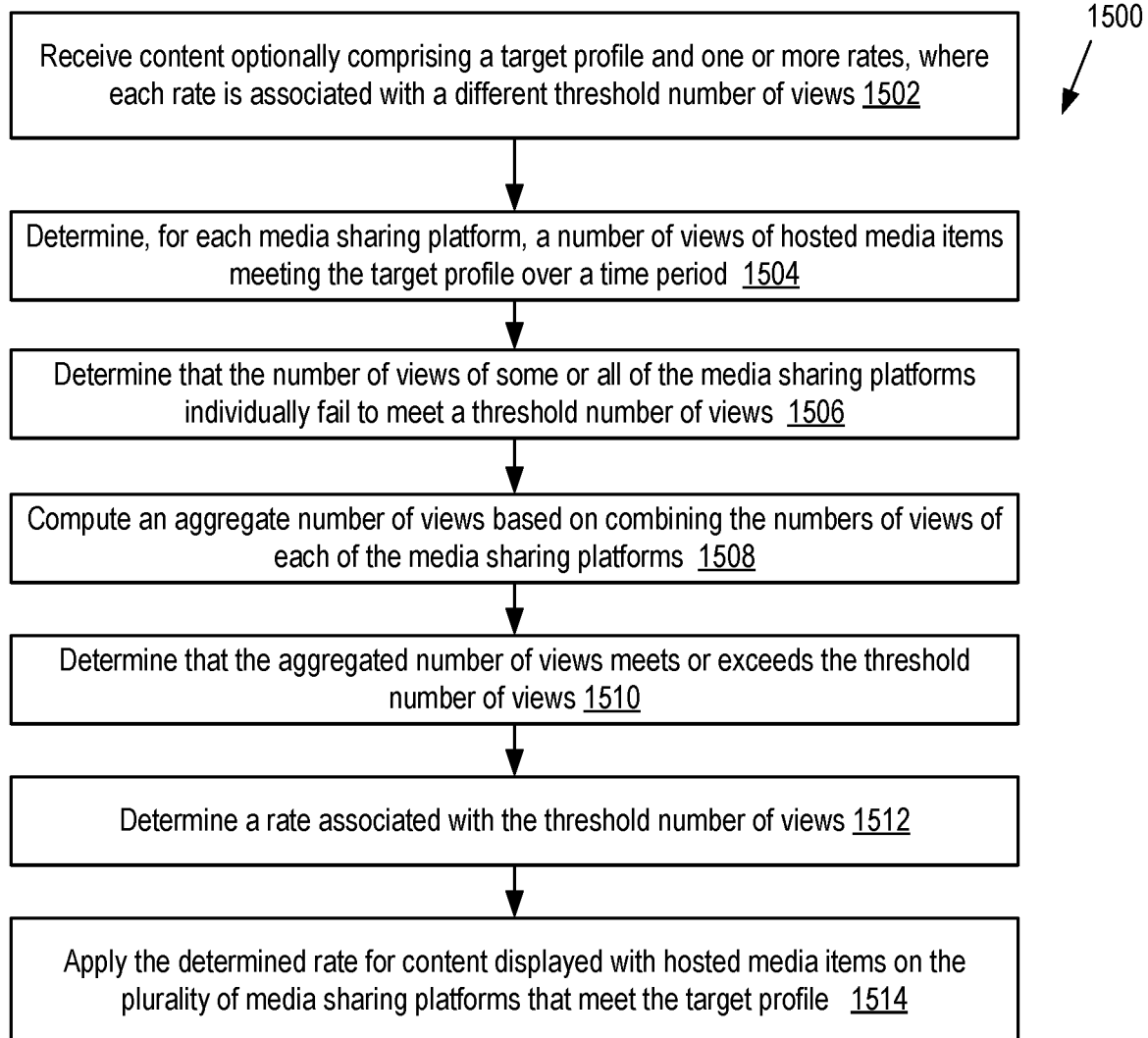
FIG. 15 is a flow diagram illustrating a method for delivering content to media sharing platforms, according to an embodiment.

FIG. 15 is a flow diagram illustrating a method 1500 for delivering content to media sharing platforms, according to an embodiment. At block 1502 of method 1500, processing logic receives content optionally comprising a target profile and one or more rates, where each rate is associated with a different threshold number of views. For example, processing logic may receive content along with with a first rate of $0.01 per view associated with a 1000 view threshold, a second rate of $0.02 per view associated with a 10,000 view threshold and a third rate of $0.05 per view associated with a 100,000 view threshold.

At block 1504, processing logic determines, for each media sharing platform, a number of views of hosted media items meeting the target profile over a time period. At block 1506, processing logic determines that the number of views of some or all of the media sharing platforms individually fail to meet a threshold number of views. For example, processing logic may determine that the number of views meet a first view threshold, but not a higher second or third view threshold. At block 1508, processing logic computes an aggregate number of views based on combining the numbers of views of each of the media sharing platforms. At block 1510, processing logic determines that the aggregate number of views meets or exceeds the threshold number of views. For example, processing logic may determine that in the aggregate the views on a first media sharing platform, a second media sharing platform and a third media sharing platform meet or exceed a highest view threshold that is associated with a highest revenue rate. At block 1512, processing logic determines a rate associated with the threshold number of views. At block 1514, processing logic then applies the determined rate for content displayed with hosted media items on the plurality of media sharing platforms that meet the target profile. Alternatively, method 1500 may be performed based on total number of views generally rather than total number of views that meet a target profile.

Figure 16:
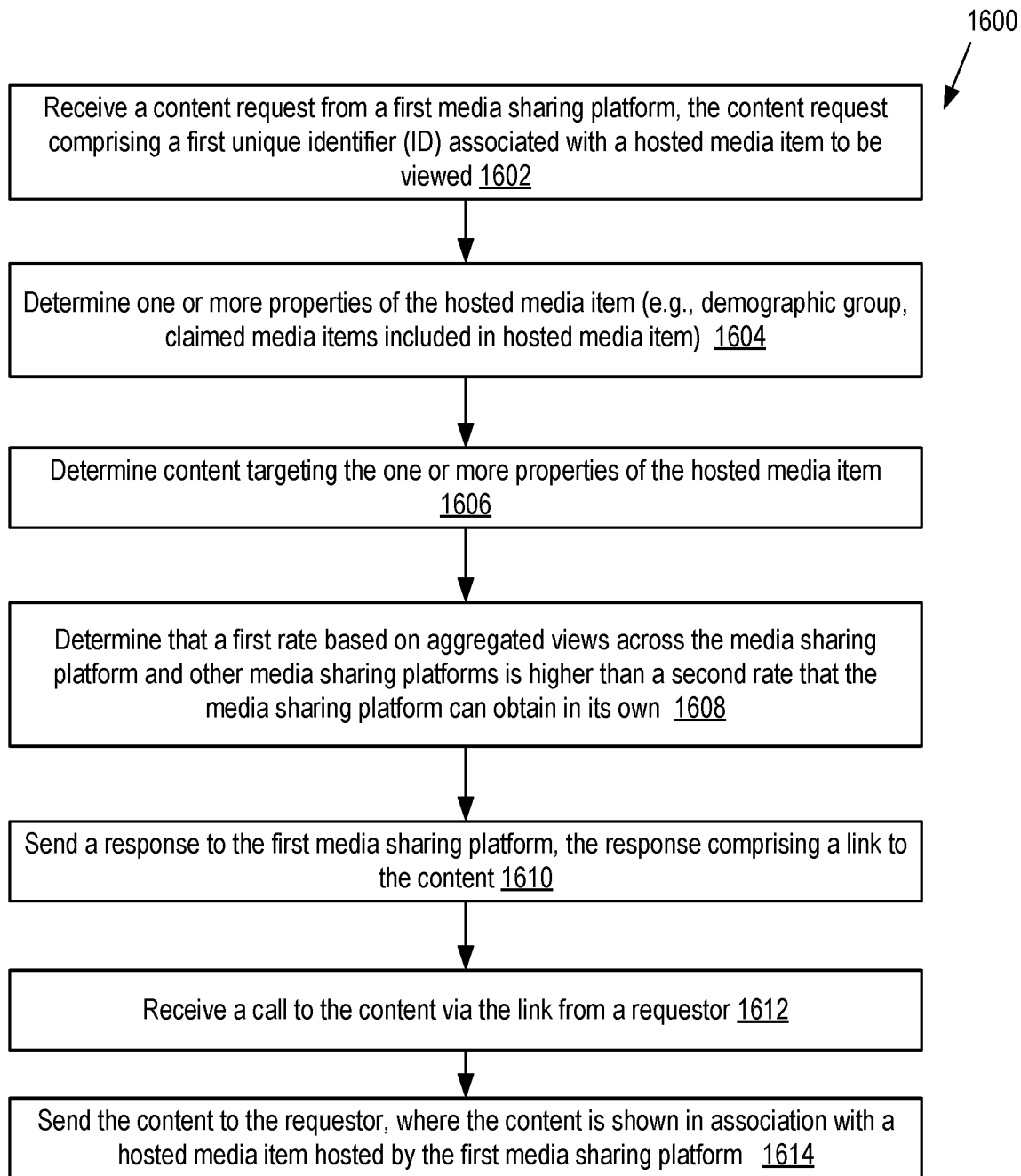
FIG. 16 is a flow diagram illustrating another method for delivering content to media sharing platforms, according to an embodiment.

FIG. 16 is a flow diagram illustrating another method 1600 for delivering content to media sharing platforms, according to an embodiment. At block 1602 of method 1600, processing logic receives a content request from a first media sharing platform. The content request includes a first unique ID associated with a hosted media item to be viewed. At block 1604, processing logic determines one or more properties of the hosted media item. Example properties of the hosted media item include a demographic group associated with the hosted media item (e.g., a demographic group of viewers of the hosted media item), one or more claimed media items included in the hosted media item, a category of the hosted media item, and so on. At block 1606, processing logic determines content targeting the one or more properties of the hosted media item. At block 1608, processing logic determines that a first rate (e.g., a first revenue per view) based on aggregated views across the media sharing platform and other media sharing platforms is higher than a second rate that the media sharing platform can obtain on its own.

At block 1610, processing logic sends a response to the first media sharing platform, the response comprising a link to the content. Alternatively, processing logic may send the content itself to the first media sharing platform. At block 1612, processing logic may receive a call to the content via the link from a requestor. The call may be received from the media sharing platform or may come directly from a computing device of an individual that has requested to view the hosted media item. At block 1614, processing logic sends the content to the requestor, where the content is shown in association with a hosted media item hosted by the first media sharing platform.

Figure 17:
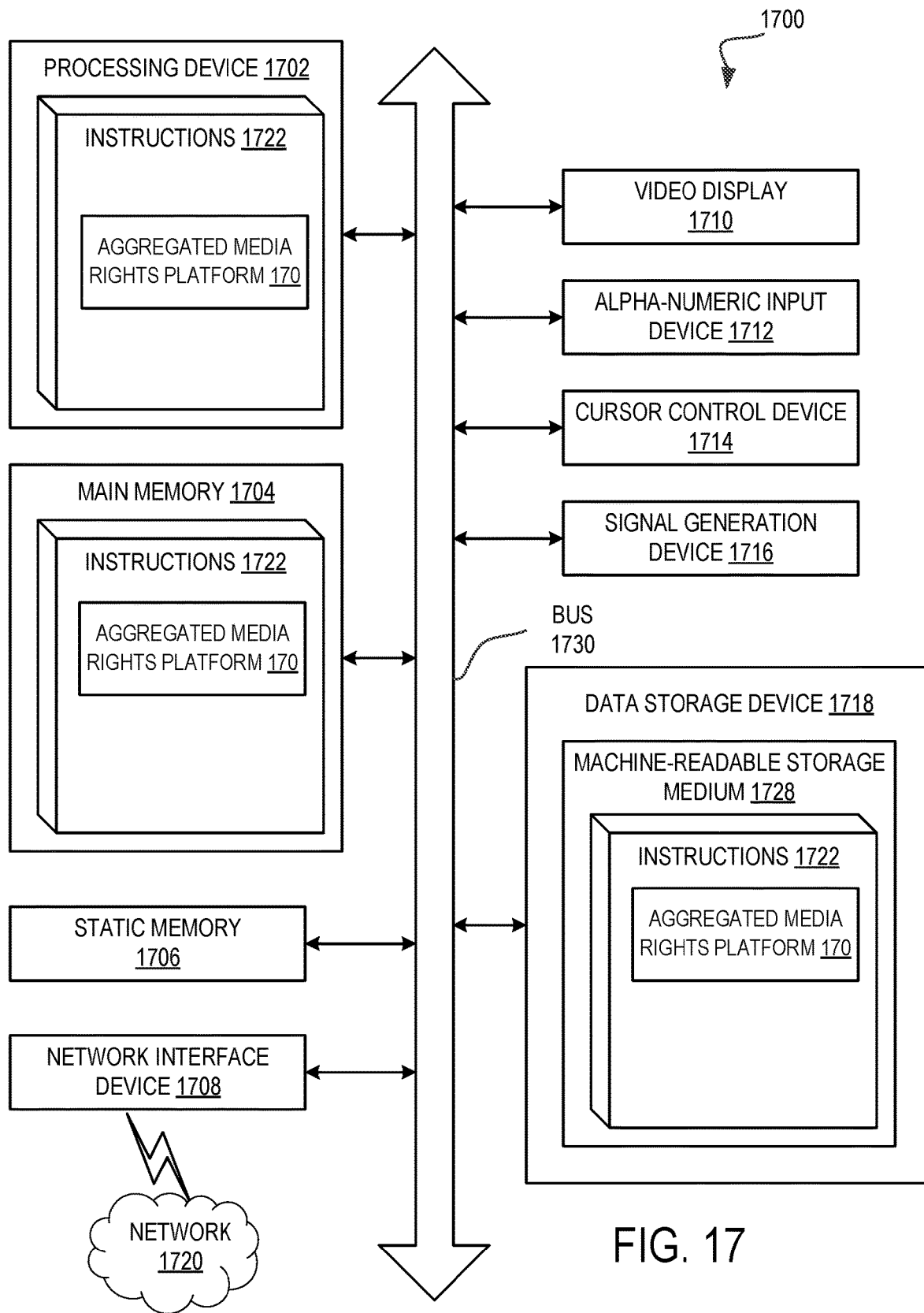
FIG. 17 is a block diagram illustrating an exemplary computer system that hosts an aggregated media rights platform, according to an embodiment.

FIG. 17 illustrates a diagrammatic representation of a machine in the exemplary form of a computing device 1700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computing device 1700 may represent server computing device 150, as shown in FIG. 1.

The computing device 1700 includes a processing device (processor) 1702, a main memory 1704 (e.g., read-only memory (ROM), flash memory, dynamic random access memory (DRAM) such as synchronous DRAM (SDRAM)), a static memory 1706 (e.g., flash memory, static random access memory (SRAM)), and a data storage device 1718, which communicate with each other via a bus 1730.

Processing device 1702 represents one or more general-purpose processing devices such as a microprocessor, central processing unit, or the like. More particularly, the processing device 1702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1702 may also be one or more special-purpose processing devices such as an application specific integrated circuit (ASIC), a field programmable gate array (FPGA), a digital signal processor (DSP), network processor, or the like. The processing device 1702 is configured to execute the aggregated media rights platform 170 for performing the operations and steps discussed herein.

The computing device 1700 may further include a network interface device 1708. The computing device 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse), and a signal generation device 1716 (e.g., a speaker).

The data storage device 1718 may include a computer-readable medium 1728 on which is stored one or more sets of instructions 1722 (e.g., instructions of cover identification controller 200) embodying any one or more of the methodologies or functions described herein. The instructions 1722 may also reside, completely or at least partially, within the main memory 1704 and/or within processing logic 1726 of the processing device 1702 during execution thereof by the computer system 1700, the main memory 1704 and the processing device 1702 also constituting computer-readable media.

While the computer-readable storage medium 1728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "receiving", "generating", "comparing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. In addition, embodiments of the present disclosure are not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

receiving, from a first rights holder, a) at least one of a first copy of a claimed media item or a first digital fingerprint of the first copy of the claimed media item and b) a first content management rule associated with the claimed media item, wherein the first rights holder owns a first set of rights to the claimed media item;

receiving, from a second rights holder, a) at least one of a second copy of the claimed media item or second digital fingerprint of the second copy of the claimed media item and b) a second content management rule associated with the claimed media item, wherein the second rights holder owns a second set of rights to the claimed media item;

generating a first digital fingerprint of the first copy of the claimed media item based on at least one of audio data in the first copy or video data in the first copy unless the first digital fingerprint was received;

generating a second digital fingerprint of the second copy of the claimed media item based on at least one of audio data in the second copy or video data in the second copy unless the second digital fingerprint was received;

comparing the first digital fingerprint to the second digital fingerprint;

determining that the first copy and the second copy are copies of the same claimed media item based upon a match between the first digital fingerprint and the second digital fingerprint;

determining whether all rights to the claimed media item have been accounted for; and responsive to determining that all rights to the claimed media item have been accounted for, determining a set of actions to be performed for hosted media items comprising the claimed media item based at least in part upon the first content management rule and the second content management rule, wherein each action in the set of actions is associated with at least one of a territory, a media sharing platform, or a date range, and wherein the set of actions comprises actions for a plurality of media sharing platforms.

2. The method of claim 1, further comprising:

receiving a first request from a first media sharing platform of the plurality of media sharing platforms, the first request comprising at least one of a) a first hosted media item uploaded to the first media sharing platform or b) a third digital fingerprint of the first hosted media item;

generating the third digital fingerprint from at least one of audio data or video data of the first hosted media item unless the third digital fingerprint was included in the first request;

comparing the third digital fingerprint to a plurality of digital fingerprints of know n claimed media items, wherein the plurality of digital fingerprints comprises the first digital fingerprint;

determining that the third digital fingerprint matches the first digital fingerprint;

determining that the first hosted media item comprises at least a portion of the claimed media item;

determining a first subset of the set of actions to be performed for the first hosted media item based at least upon an identify of the first media sharing platform; and notifying the first media sharing platform of the first subset of the set of actions to be performed for the first hosted media item.

3. The method of claim 2, further comprising:
generating a first unique identifier (ID) for the first hosted media item;
notifying the first media sharing platform of the first unique ID for the first hosted media item;
receiving a second request from the first media sharing platform responsive to a user attempting to view the first hosted media item from a first territory, the second request comprising the first unique ID and an identification of the first territory;
determining an action to be performed for the first hosted media item based on the identity of the first media sharing platform, the first unique ID and the first territory; and
notifying the first media sharing platform of the action to be performed for the first hosted media item.

4. The method of claim 2, further comprising:
receiving a second request from a second media sharing platform of the plurality of media sharing platforms, the second request comprising at least one of a second hosted media item uploaded to the second media sharing platform or a fourth digital fingerprint of the second hosted media item;
generating the fourth digital fingerprint from at least one of audio data or video data of the second hosted media item unless the fourth digital fingerprint was included in the second request;
comparing the fourth digital fingerprint to the plurality of digital fingerprints of known claimed media items;
determining that the fourth digital fingerprint matches the first digital fingerprint;
determining that the second hosted media item comprises at least a portion of the claimed media item;
determining a second subset of the set of actions to be performed for the second hosted media item based at least upon an identity of the second media sharing platform, wherein the second subset is different from the first subset; and
notifying the second media sharing platform of the second subset of the set of actions to be performed for the second hosted media item.

5. The method of claim 4, wherein the first media sharing platform has exclusivity to the claimed media item for a specific territory, and wherein the second subset of actions comprises an action to prevent the second hosted media item from being shown in the specific territory.

6. The method of claim 4, wherein the first media sharing platform has exclusivity to the claimed media item, and wherein the second subset of actions comprises an action to a) mute the second hosted media item or b) replace audio of the second hosted media item with different audio during playback of the second hosted media item.

7. The method of claim 4, wherein the first request further comprises an account ID of a first account on the first media sharing platform associated with the first hosted media item, the method further comprising:
determining that the first account is whitelisted for the claimed media item, wherein the first subset of actions includes actions that are not included in a second subset of the set of actions associated with a second account on the first media sharing platform and the second hosted media item that also comprises at least a portion of the claimed media item.

8. The method of claim 1, further comprising:
determining that not all rights to the claimed media item have been accounted for; and
determining that hosted media items comprising the claimed media item are to be removed from or blocked on the plurality of media sharing platforms.

9. The method of claim 1, further comprising:
receiving an instruction from the first rights holder to modify the first content management rule; and
determining an updated set of actions to be performed for hosted media items comprising the claimed media item based at least in part upon a modified first content management rule and the second content management rule, wherein an action for at least one of a media sharing platform or a territory is different between the set of actions and the updated set of actions.

10. A computing device comprising:
a processing device: and
a non-transitory memory containing instructions, when executed by the processing device, cause the processing device to:
receive, from a first rights holder at a claimed media ingestion module of an aggregated media rights platform, a) at least one of a first copy of a claimed media item or a first digital fingerprint of the first copy of the claimed media item and b) a first content management rule associated with the claimed media item, wherein the first rights holder owns a first set of rights to the claimed media item;
receive, from a second rights holder at the claimed media rights ingestion module, a) at least one of a second copy of the claimed media item or a second digital fingerprint of the second copy of the claimed media item and b) a second content management rule associated with the claimed media item, wherein the second rights holder owns a second set of rights to the claimed media item;
generate a first digital fingerprint of the first copy of the claimed media item via the claimed media ingestion module based on at least one of audio data in the first copy or video data in the first copy unless the first digital fingerprint was received from the first rights holder;
generate a second digital fingerprint of the second copy of the claimed media item via the claimed media ingestion module based on at least one of audio data in the second copy or video data in the second copy unless the second digital fingerprint was received from the second rights holder;
compare, via a media rights determiner of the aggregated media rights platform, the first digital fingerprint to the second digital fingerprint;
determine, via the media rights determiner, that the first copy and the second copy are copies of the same claimed media item based upon a match between the first digital fingerprint and the second digital fingerprint;
determine, via the media rights determiner, whether all rights to the claimed media item have been accounted for; and
responsive to determining that all rights to the claimed media item have been accounted for, determine, via a hosted media action determiner of the aggregated media rights platform, a set of actions to be performed for content comprising the claimed media item based at least in part upon the first content management rule and the second content management rule, wherein each action in the set of actions is associated with at least one of a territory, media sharing platform, or a date range, and wherein the set of actions comprises actions for a plurality of media sharing platforms.

11. The computing device of claim 10, wherein the instructions further cause the processing device to:
receive a first request from a first media sharing platform of the plurality of media sharing platforms, the first request comprising at least one of a) a first hosted media item uploaded to the first media sharing platform or b) a third digital fingerprint of the first hosted media item;
generate a third digital fingerprint from at least one of audio data or video data of the first hosted media item unless the third digital fingerprint was included in the first request;
compare the third digital fingerprint to a plurality of digital fingerprints of known claimed media items, wherein the plurality of digital fingerprints comprises the first digital fingerprint;
determine that the third digital fingerprint matches the first digital fingerprint;
determine that the first hosted media item comprises at least a portion of the claimed media item;
determine a first subset of the set of actions to be performed for the first hosted media item based at least upon an identify of the first media sharing platform; and
notify the first media sharing platform of the first subset of actions to be performed for the first hosted media item.

12. The computing device of claim 10, wherein the instructions further cause the processing device to:
receive, from the first rights holder, a first rights claim associated with the first copy of the claimed media item, wherein the first rights claim identifies the first set of rights to the claimed media item;
receive, from the second rights holder, a second rights claim associated with the second copy of the claimed media item, wherein the second rights claim identifies the second set of rights to the claimed media item;
determine that the first set of rights includes a particular right that is also included in the second set of rights;
determine that a rights conflict exists between the first rights holder and the second rights holder with regards to the claimed media item;
initiate a conflict resolution process between the first rights holder and the second rights holder to determine a proper rights holder for the particular right;
send a notice of a conflicting rights claim for the particular right to the first rights holder and the second rights holder;
receive a response from the first rights holder relinquishing their claim to the particular right;
determine that the particular right belongs to the second rights holder; and
resolve the rights conflict in favor of the second rights holder.

* * * * *